US012726957B2

(12) United States Patent
Peng et al.

(10) Patent No.: US 12,726,957 B2
(45) Date of Patent: Sep. 1, 2026

(54) METHOD AND DEVICE FOR CHANGING DATA TRANSMISSION PROCESS, AND PROCESSOR-READABLE STORAGE MEDIUM

(71) Applicant: DATANG MOBILE COMMUNICATIONS EQUIPMENT CO., LTD., Beijing (CN)

(72) Inventors: Ying Peng, Beijing (CN); Yan Wang, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 363 days.

(21) Appl. No.: 18/547,148

(22) PCT Filed: Feb. 17, 2022

(86) PCT No.: PCT/CN2022/076623
§ 371 (c)(1),
(2) Date: Aug. 18, 2023

(87) PCT Pub. No.: WO2022/206205
PCT Pub. Date: Oct. 6, 2022

(65) Prior Publication Data

US 2024/0137917 A1 Apr. 25, 2024
US 2024/0236956 A9 Jul. 11, 2024

(30) Foreign Application Priority Data

Mar. 29, 2021 (CN) ......................... 202110336617.0

(51) Int. Cl.
*H04L 1/00* (2006.01)
*H04L 5/00* (2006.01)
(Continued)

(52) U.S. Cl.
CPC ....... *H04W 72/0446* (2013.01); *H04L 5/0053* (2013.01)

(58) Field of Classification Search
CPC . H04W 72/0446; H04W 72/20; H04W 72/51; H04L 1/0025; H04L 5/0053; H04L 1/00
See application file for complete search history.

(56) References Cited

U.S. PATENT DOCUMENTS

2016/0180663 A1* 6/2016 McMahan .............. G08B 7/062 340/691.6
2016/0381704 A1* 12/2016 Chu .................. H04W 52/0216 370/329
(Continued)

FOREIGN PATENT DOCUMENTS

CN 107889259 A 4/2018
CN 108282879 A 7/2018
(Continued)

OTHER PUBLICATIONS

3GPP TSG-RAN WG2 Meeting#106, R2-1906119 Title:Consideration on Power Saving Signal Association with DRX (Year: 2019).*
(Continued)

*Primary Examiner* — Faruk Hamza
*Assistant Examiner* — Abusayeed M Haque
(74) *Attorney, Agent, or Firm* — Ladas & Parry, LLP

(57) ABSTRACT

The present disclosure provides a method and a device for changing a data transmission process, and a processor-readable storage medium. The method includes transmitting, by a first wireless transceiver device, first information to a second wireless transceiver device through a physical layer. The first information includes indication information indicating a to-be-changed target data transmission process or a triggering factor corresponding to a transmission service.

18 Claims, 6 Drawing Sheets

(51) Int. Cl.
*H04W 52/02* (2009.01)
*H04W 72/0446* (2023.01)

(56) References Cited

U.S. PATENT DOCUMENTS

| | | | |
|---|---|---|---|
| 2018/0103460 A1 | 4/2018 | Sharma et al. | |
| 2018/0376460 A1* | 12/2018 | Atefi | H04W 74/0816 |
| 2019/0357224 A1 | 11/2019 | Li et al. | |
| 2021/0014794 A1 | 1/2021 | Jiang et al. | |
| 2021/0075566 A1 | 3/2021 | Guo | |
| 2021/0235486 A1* | 7/2021 | Atefi | H04W 74/002 |
| 2021/0345157 A1 | 11/2021 | Ke et al. | |
| 2022/0030460 A1 | 1/2022 | Wang | |
| 2022/0264490 A1 | 8/2022 | Sha et al. | |

FOREIGN PATENT DOCUMENTS

| | | | |
|---|---|---|---|
| CN | 110324884 | A | 10/2019 |
| CN | 110505659 | A | 11/2019 |
| CN | 110636547 | A | 12/2019 |
| WO | 2016110241 | A1 | 7/2016 |
| WO | 2018010542 | A1 | 1/2018 |
| WO | 2018027949 | A1 | 2/2018 |
| WO | 2018121177 | A1 | 7/2018 |
| WO | 2019000552 | A1 | 1/2019 |
| WO | 2019223589 | A1 | 11/2019 |
| WO | 2020143659 | A1 | 7/2020 |
| WO | 2021023156 | A1 | 2/2021 |

OTHER PUBLICATIONS

3GPP TSG-RAN WG2 Meeting#112-e, R2-2010615 Title:An indication of reconfiguration with sync type in RFL report (Year: 2020).*

PCT International Search Report and Written Opinion from PCT/CN2022/076623 dated May 26, 2022, and its English translation.

PCT International Preliminary Report on Patentability (Chapter I) with Written Opinion from PCT/CN2022/076623 dated Oct. 3, 2023, and its English translation from WIPO.

First Office Action and search report from CN patent application No. 202110336617.0 mailed Apr. 27, 2025.

Extended European Search Report from EP patent application No. 22778390.9 mailed Feb. 26, 2025.

* cited by examiner transmitting, by a first wireless transceiver device, first information to a second wireless transceiver device through a physical layer, the first information including indication information indicating a to-be-changed target data transmission process or a triggering factor corresponding to a transmission service

21

METHOD AND DEVICE FOR CHANGING DATA TRANSMISSION PROCESS, AND PROCESSOR-READABLE STORAGE MEDIUM

CROSS-REFERENCE TO RELATED APPLICATIONS

This application is the U.S. national phase of PCT Application No. PCT/CN2022/076623 filed on Feb. 17, 2022, which claims a priority to the Chinese patent application No. 202110336617.0 filed on Mar. 29, 2021, the disclosure of which are incorporated herein by reference in their entireties.

TECHNICAL FIELD

The present disclosure relates to the field of communication technology, in particular to a method and a device for changing a data transmission process, and a processor-readable storage medium.

BACKGROUND

In a conventional communication system, user data is transmitted through a user plane protocol stack, and different transmission modes, types or relevant parameter configurations are selected for different service types and different application scenarios. In a data transmission process, a Medium Access Control (MAC) layer calculates a priority level of the user data in accordance with a user service feature parameter, so as to schedule and allocate resources. However, due to such reasons as a large user data volume, a scheduling congestion may occur for service data, resulting in an increase in a queuing delay, even an increase in a packet loss rate. Hence, in the case of a plurality of service processing processes, especially for a new user demand or a new service which is sudden or time-sensitive or which has a very high transmission characteristic or a very high priority level, it is impossible for the service processing process of the protocol stack in a relevant system to meet the transmission demand.

SUMMARY

An object of the present disclosure is to provide a method and a device for changing a data transmission process, and a processor-readable storage medium, so as to solve the problem in the related art where it is impossible for the service processing process of the protocol stack in a communication system to meet the service transmission demand.

In one aspect, the present disclosure provides in some embodiments a method for changing a data transmission process, including transmitting, by a first wireless transceiver device, first information to a second wireless transceiver device through a physical layer. The first information includes indication information indicating a to-be-changed target data transmission process or a triggering factor corresponding to a transmission service.

In a possible embodiment of the present disclosure, the transmitting, by the first wireless transceiver device, the first information to the second wireless transceiver device through the physical layer includes transmitting, by the first wireless transceiver device, a target indication channel or a target signal to the second wireless transceiver device directly through the physical layer, and the target indication channel or target signal carries the first information.

In a possible embodiment of the present disclosure, a time point when the target indication channel or target signal is transmitted by the first wireless transceiver device to the second wireless transceiver device through the physical layer includes one of: a latest subframe corresponding to a time point when the triggering factor is obtained by the first wireless transceiver device; a latest subframe corresponding to a time point when the target data transmission process is determined by the first wireless transceiver device; a latest subframe corresponding to a time point when a data transmission process of the first wireless transceiver device is changed; a first subframe agreed by the first wireless transceiver device with the second wireless transceiver device; an $M^{th}$ symbol within the first subframe agreed by the first wireless transceiver device with the second wireless transceiver device; or $M^{th}$ to $N^{th}$ symbols within the first subframe agreed by the first wireless transceiver device with the second wireless transceiver device, where N is greater than M.

In a possible embodiment of the present disclosure, the first information is carried in different frequency sub-domains of a frequency domain of the $M^{th}$ symbol, or the first information is carried in each of the $M^{th}$ to $N^{th}$ symbols.

In a possible embodiment of the present disclosure, in the case that the first information includes the indication information, prior to transmitting, by the first wireless transceiver device, the first information to the second wireless transceiver device through the physical layer, the method further includes: determining the to-be-changed target data transmission process in accordance with the triggering factor corresponding to the transmission service; and changing the data transmission process into the target data transmission process.

In a possible embodiment of the present disclosure, in the case that the first information includes the indication information, subsequent to transmitting the first information to the second wireless transceiver device through the physical layer, the method further includes: receiving change feedback information from the second wireless transceiver device, the change feedback information including first indication information indicating that the second wireless transceiver device agrees to change the data transmission process into the target data transmission process or second indication information indicating that the second wireless transceiver device rejects to change the data transmission process into the target data transmission process; in the case that the change feedback information includes the first indication information, changing the data transmission process into the target data transmission process; and in the case that the change feedback information includes the second indication information, performing data transmission through a default transmission process. The first wireless transceiver device is a terminal, and the second wireless transceiver device is a network side device.

In a possible embodiment of the present disclosure, in the case that the first information includes the triggering factor, subsequent to transmitting the first information to the second wireless transceiver device through the physical layer, the method further includes: receiving indication information from the second wireless transceiver device, the indication information being generated and transmitted by the second wireless transceiver device after the second wireless transceiver device decodes the first information and obtains the triggering factor; determining the to-be-changed target data transmission process in accordance with the indication information; and changing the data transmission process into the target data transmission process. The first wireless transceiver device is a terminal, and the second wireless transceiver device is a network side device.

In a possible embodiment of the present disclosure, the indication information includes one of: information about the to-be-changed target data transmission process; or the information about the to-be-changed target data transmission process and information about an effective time of the to-be-changed target data transmission process.

In a possible embodiment of the present disclosure, a time window where a process is effective after the target data transmission process takes effect includes one of: a target time window; a time period from a time point when the target data transmission process takes effect to a time point when indication information other than the first information has been received; or a time period from a time point when the target data transmission process takes effect to a time point when a protocol stack de-configuration instruction has been received.

In a possible embodiment of the present disclosure, the triggering factor includes at least one of a user service feature parameter, slice auxiliary identification information, or information about user's customized demand.

In a possible embodiment of the present disclosure, the indication information is indicated through one of a coding sequence formed through coding with an agreed transmission process identifier, or a state information bitmap formed through coding with the agreed transmission process identifier.

In a possible embodiment of the present disclosure, the method further includes determining a transmission resource corresponding to target service data, and the target service data is to be transmitted through the to-be-changed target data transmission process. The transmission resource is determined through one of: selecting a transmission resource that meets a first condition; in the case that the first wireless transceiver device is a network side device and the second wireless transceiver device is a terminal, determining, by the first wireless transceiver device, the transmission resource in accordance with a data transmission volume through the target data transmission process; in the case that the first wireless transceiver device is a terminal, the second wireless transceiver device is a network side device and an effective time of the target data transmission process is equal to zero, determining, by the terminal, the transmission resource through agreement, or reserving, by the network side device, the transmission resource; in the case that the first wireless transceiver device is a terminal, the second wireless transceiver device is a network side device and the effective time of the target data transmission process fails to be configured, determining, by the terminal, the transmission resource through agreement, or reserving, by the network side device, the transmission resource; or in the case that the first wireless transceiver device is a terminal, the second wireless transceiver device is a network side device and the effective time of the target data transmission process is greater than zero, determining, by the second wireless transceiver device, the transmission resource in accordance with the data transmission volume through the target data transmission process.

In a possible embodiment of the present disclosure, the selecting the transmission resource that meets the first condition includes selecting a maximum physical resource that meets a condition on data transmission through the target data transmission process, and/or a physical resource with an optimum channel state.

In a possible embodiment of the present disclosure, the determining, by the terminal, the transmission resource through the agreement includes one of: implicitly indicating the transmission resource through a position of a subframe or symbol where the indication information is located; indicating the transmission resource through information about an agreed physical resource carried in the indication information; or implicitly indicating the transmission resource through information about the target data transmission process carried in the indication information.

In a possible embodiment of the present disclosure, in the case that the first wireless transceiver device is a terminal and the effective time of the target data transmission process is greater than zero, the determining the transmission resource corresponding to the target service data includes: transmitting uplink data request information to the second wireless transceiver device, the uplink data request information including a data transmission volume of the target data transmission process; and receiving feedback information from the second wireless transmission device, the feedback information including information about the transmission resource.

In a possible embodiment of the present disclosure, prior to transmitting, by the first wireless transceiver device, the first information to the second wireless transceiver device through the physical layer, the method further includes determining available data transmission processes in accordance with terminal capability information, and the available data transmission processes include the target data transmission process.

In a possible embodiment of the present disclosure, the determining the available data transmission processes in accordance with the terminal capability information includes: in the case that the first wireless transceiver device is a network side device and the second wireless transceiver device is a terminal, obtaining the terminal capability information about the terminal; and determining the available data transmission processes in accordance with the terminal capability information and data transmission processes supported by the network side device. Subsequent to determining the available data transmission processes in accordance with the terminal capability information, the method further includes transmitting information about the available data transmission processes to the second wireless transceiver device.

In a possible embodiment of the present disclosure, the determining the available data transmission processes in accordance with the terminal capability information includes: in the case that the first wireless transceiver is a terminal and the second wireless transceiver device is a network side device, transmitting the terminal capability information to the second wireless transceiver device; and receiving information about the available data transmission processes from the second wireless transceiver device.

In a possible embodiment of the present disclosure, the available data transmission processes include at least one of a transmission process through which a core network function sinks, a transmission process without any protocol stack layer, a transmission process directly occupied by a physical resource, a transmission process for adding a target function, or a transmission process for protocol stack architecture in a communication system.

In a possible embodiment of the present disclosure, the method further includes: receiving second information from the second wireless transceiver device; and transmitting the first information in accordance with the second information. The second information is used to indicate the first wireless transceiver device to retransmit the first information, or indicate the first wireless transceiver device to perform the data transmission by default.

In another aspect, the present disclosure provides in some embodiments a method for changing a data transmission process, including: obtaining, by a second wireless transceiver device, first information from the first wireless transceiver device through a physical layer, the first information including indication information indicating a to-be-changed target data transmission process or a triggering factor corresponding to a transmission service; and changing the data transmission process in accordance with the first information.

In a possible embodiment of the present disclosure, the obtaining, by the second wireless transceiver device, the first information from the first wireless transceiver device through the physical layer includes detecting a target indication channel or a target signal transmitted by the first wireless transceiver device on the physical layer so as to obtain the first information, and the first information is carried in the target indication channel or target signal.

In a possible embodiment of the present disclosure, the detecting the target indication channel or target signal transmitted by the first wireless transceiver device on the physical layer so as to obtain the first information includes one of: detecting the target indication channel or target signal within each subframe so as to obtain the first information; detecting the target indication channel or target signal within a first subframe agreed by the second wireless transceiver device with the first wireless transceiver device so as to obtain the first information; detecting the target indication channel or target signal on an $M^{th}$ symbol within the first subframe agreed by the second wireless transceiver device with the first wireless transceiver device so as to obtain the first information; or detecting the target indication channel or target signal on $M^{th}$ to $N^{th}$ symbols within the first subframe agreed by the second wireless transceiver device with the first wireless transceiver device so as to obtain the first information.

In a possible embodiment of the present disclosure, the detecting the target indication channel or target signal transmitted by the first wireless transceiver device on the physical layer so as to obtain the first information includes: detecting the target indication channel or target signal in different frequency sub-domains of a frequency domain of the $M^{th}$ symbol so as to obtain the first information, or detecting the target indication channel or target signal on each of the $M^{th}$ to $N^{th}$ symbols so as to obtain the first information.

In a possible embodiment of the present disclosure, the detecting the target indication channel or target signal transmitted by the first wireless transceiver device on the physical layer so as to obtain the first information includes one of: periodically detecting the target indication channel or target signal within a first subframe agreed by the second wireless transceiver device with the first wireless transceiver device so as to obtain the first information; periodically detecting the target indication channel or target signal on an $M^{th}$ symbol within the first subframe agreed by the second wireless transceiver device with the first wireless transceiver device so as to obtain the first information; or periodically detecting the target indication channel or target signal on $M^{th}$ to $N^{th}$ symbols within the first subframe agreed by the second wireless transceiver device with the first wireless transceiver device so as to obtain the first information.

In a possible embodiment of the present disclosure, in the case that the first information includes the triggering factor, subsequent to obtaining the first information from the first wireless transceiver device through the physical layer, the method further includes: decoding the first information so as to obtain the triggering factor; determining the to-be-changed target data transmission process in accordance with the triggering factor, and generating the indication information; and transmitting the indication information to the first wireless transceiver device. The first wireless transceiver device is a terminal, and the second wireless transceiver device is a network side device.

In a possible embodiment of the present disclosure, in the case that the first information includes the indication information, prior to changing the data transmission process in accordance with the first information, the method further includes: determining whether the second wireless transceiver device agrees to change the data transmission process, and generating change feedback information, the change feedback information including first indication information indicating that the second wireless transceiver device agrees to change the data transmission process into the target data transmission process or second indication information indicating that the second wireless transceiver device rejects to change the data transmission process into the target data transmission process; and transmitting the change feedback information to the first wireless transceiver device. The first wireless transceiver device is a terminal, and the second wireless transceiver device is a network side device.

In a possible embodiment of the present disclosure, a time point when the change feedback information is transmitted to the first wireless transceiver device includes one of: a latest subframe corresponding to a time point when the first information is obtained by the second wireless transceiver device; a second subframe agreed by the second wireless transceiver device with the first wireless transceiver device; a $K^{th}$ symbol within the second subframe agreed by the second wireless transceiver device with the first wireless transceiver device; or $K^{th}$ to $L^{th}$ symbols within the second subframe agreed by the second wireless transceiver device with the first wireless transceiver device, where L is greater than K.

In a possible embodiment of the present disclosure, the method further includes, in the case that the data transmission process is rejected to be changed, performing data transmission through a default transmission process.

In a possible embodiment of the present disclosure, the indication information includes at least one of: information about the to-be-changed target data transmission process; or the information about the to-be-changed target data transmission process and information about an effective time of the to-be-changed target data transmission process.

In a possible embodiment of the present disclosure, a time window where a process is effective after the target data transmission process takes effect includes one of: a target time window; a time period from a time point when the target data transmission process takes effect to a time point when indication information other than the first information has been received; or a time period from a time point when the target data transmission process takes effect to a time point when a protocol stack de-configuration instruction has been received.

In a possible embodiment of the present disclosure, the triggering factor includes at least one of a user service feature parameter, slice auxiliary identification information, or information about user's customized demand.

In a possible embodiment of the present disclosure, subsequent to obtain the first information from the first wireless transceiver device through the physical layer, the method further includes determining a transmission resource corresponding to target service data, and the target service data is to be transmitted through the to-be-changed target data transmission process. The transmission resource is determined through one of: selecting a transmission resource that meets a first condition; in the case that the first wireless transceiver device is a network side device and the second wireless transceiver device is a terminal, determining, by the first wireless transceiver device, the transmission resource in accordance with a data transmission volume through the target data transmission process; in the case that the first wireless transceiver device is a terminal, the second wireless transceiver device is a network side device and an effective time of the target data transmission process is equal to zero, determining, by the terminal, the transmission resource through agreement, or reserving, by the network side device, the transmission resource; in the case that the first wireless transceiver device is a terminal, the second wireless transceiver device is a network side device and the effective time of the target data transmission process fails to be configured, determining, by the terminal, the transmission resource through agreement, or reserving, by the network side device, the transmission resource; or in the case that the first wireless transceiver device is a terminal, the second wireless transceiver device is a network side device and the effective time of the target data transmission process is greater than zero, determining, by the second wireless transceiver device, the transmission resource in accordance with the data transmission volume through the target data transmission process.

In a possible embodiment of the present disclosure, the selecting the transmission resource that meets the first condition includes selecting a maximum physical resource that meets a condition on data transmission through the target data transmission process, and/or a physical resource with an optimum channel state.

In a possible embodiment of the present disclosure, the determining, by the terminal, the transmission resource through the agreement includes one of: implicitly indicating the transmission resource through a position of a subframe or symbol where the indication information is located; indicating the transmission resource through information about an agreed physical resource carried in the indication information; or implicitly indicating the transmission resource through information about the target data transmission process carried in the indication information.

In a possible embodiment of the present disclosure, in the case that the first wireless transceiver device is a terminal and the effective time of the target data transmission process is greater than zero, the determining the transmission resource corresponding to the target service data includes: receiving uplink data request information from the first wireless transceiver device, the uplink data request information including a data transmission volume of the target data transmission process; determining the transmission resource corresponding to the target service data in accordance with the data transmission volume; and transmitting feedback information to the first wireless transmission device, the feedback information including information about the transmission resource.

In a possible embodiment of the present disclosure, in the case that the transmission resource is determined by the terminal through agreement, the changing the data transmission process in accordance with the first information includes changing the data transmission process into the target data transmission process in accordance with the first information at a time point when relevant information about the transmission resource is received.

In a possible embodiment of the present disclosure, the method further includes: enabling an interference elimination algorithm function at the time point when the relevant information about the transmission resource has been received; and performing the data transmission through the transmission resource in the target data transmission process.

In a possible embodiment of the present disclosure, the method further includes determining available data transmission processes in accordance with terminal capability information, and the available data transmission processes include the target data transmission process.

In a possible embodiment of the present disclosure, the determining the available data transmission processes in accordance with the terminal capability information includes: in the case that the first wireless transceiver device is a network side device and the second wireless transceiver device is a terminal, transmitting the terminal capability information to the first wireless transceiver device; and receiving information about the available data transmission processes from the first wireless transceiver device.

In a possible embodiment of the present disclosure, the determining the available data transmission processes in accordance with the terminal capability information includes: in the case that the first wireless transceiver is a terminal and the second wireless transceiver device is a network side device, receiving the terminal capability information from the first wireless transceiver device; and determining the available data transmission processes in accordance with the terminal capability information and data transmission processes supported by the network side device. Subsequent to determining the available data transmission processes in accordance with the terminal capability information, the method further includes transmitting information about the available data transmission processes to the first wireless transceiver device.

In a possible embodiment of the present disclosure, the available data transmission processes include at least one of a transmission process through which a core network function sinks, a transmission process without any protocol stack layer, a transmission process directly occupied by a physical resource, a transmission process for adding a target function, or a transmission process for protocol stack architecture in a communication system.

In a possible embodiment of the present disclosure, the method further includes, in the case that the first information fails to be obtained, transmitting second information to the first wireless transceiver device in accordance with the triggering factor corresponding to the transmission service. The second information is used to indicate the first wireless transceiver device to retransmit the first information, or indicate the first wireless transceiver device to perform the data transmission by default.

In yet another aspect, the present disclosure provides in some embodiments a device for changing a data transmission process for a first wireless transceiver device, including a memory, a transceiver and a processor. The memory is configured to store therein a computer program, the transceiver is configured to transmit and receive data under the control of the processor, the processor is configured to read the computer program in the memory, and the transceiver is configured to transmit first information to a second wireless transceiver device through a physical layer. The first information includes indication information indicating a to-be-changed target data transmission process or a triggering factor corresponding to a transmission service.

In a possible embodiment of the present disclosure, the transmitting the first information to the second wireless transceiver device through the physical layer includes transmitting a target indication channel or a target signal to the second wireless transceiver device directly through the physical layer, and the target indication channel or target signal carries the first information.

In a possible embodiment of the present disclosure, a time point when the target indication channel or target signal is transmitted to the second wireless transceiver device through the physical layer includes one of: a latest subframe corresponding to a time point when the triggering factor is obtained by the first wireless transceiver device; a latest subframe corresponding to a time point when the target data transmission process is determined by the first wireless transceiver device; a latest subframe corresponding to a time point when a data transmission process of the first wireless transceiver device is changed; a first subframe agreed by the first wireless transceiver device with the second wireless transceiver device; an $M^{th}$ symbol within the first subframe agreed by the first wireless transceiver device with the second wireless transceiver device; or $M^{th}$ to $N^{th}$ symbols within the first subframe agreed by the first wireless transceiver device with the second wireless transceiver device, where N is greater than M.

In a possible embodiment of the present disclosure, the first information is carried in different frequency sub-domains of a frequency domain of the $M^{th}$ symbol, or the first information is carried in each of the $M^{th}$ to $N^{th}$ symbols.

In a possible embodiment of the present disclosure, in the case that the first information includes the indication information, the processor is further configured to read the computer program in the memory so as to: determine the to-be-changed target data transmission process in accordance with the triggering factor corresponding to the transmission service; and change the data transmission process into the target data transmission process.

In a possible embodiment of the present disclosure, in the case that the first information includes the indication information, the transceiver is further configured to receive change feedback information from the second wireless transceiver device, the change feedback information including first indication information indicating that the second wireless transceiver device agrees to change the data transmission process into the target data transmission process or second indication information indicating that the second wireless transceiver device rejects to change the data transmission process into the target data transmission process. The processor is further configured to read the computer program in the memory, so as to: in the case that the change feedback information includes the first indication information, change the data transmission process into the target data transmission process; and in the case that the change feedback information includes the second indication information, perform data transmission through a default transmission process. The first wireless transceiver device is a terminal, and the second wireless transceiver device is a network side device.

In a possible embodiment of the present disclosure, in the case that the first information includes the triggering factor, the transceiver is further configured to receive indication information from the second wireless transceiver device, and the indication information is generated and transmitted by the second wireless transceiver device after the second wireless transceiver device decodes the first information and obtains the triggering factor. The processor is further configured to read the computer program in the memory, so as to determine the to-be-changed target data transmission process in accordance with the indication information, and change the data transmission process into the target data transmission process. The first wireless transceiver device is a terminal, and the second wireless transceiver device is a network side device.

In a possible embodiment of the present disclosure, the indication information includes one of: information about the to-be-changed target data transmission process; or the information about the to-be-changed target data transmission process and information about an effective time of the to-be-changed target data transmission process.

In a possible embodiment of the present disclosure, a time window where a process is effective after the target data transmission process takes effect includes one of: a target time window; a time period from a time point when the target data transmission process takes effect to a time point when indication information other than the first information has been received; or a time period from a time point when the target data transmission process takes effect to a time point when a protocol stack de-configuration instruction has been received.

In a possible embodiment of the present disclosure, the triggering factor includes at least one of a user service feature parameter, slice auxiliary identification information, or information about user's customized demand.

In a possible embodiment of the present disclosure, the indication information is indicated through one of a coding sequence formed through coding with an agreed transmission process identifier, or a state information bitmap formed through coding with the agreed transmission process identifier.

In a possible embodiment of the present disclosure, the processor is further configured to read the computer program in the memory, so as to determine a transmission resource corresponding to target service data, and the target service data is to be transmitted through the to-be-changed target data transmission process. The transmission resource is determined through one of: selecting a transmission resource that meets a first condition; in the case that the first wireless transceiver device is a network side device and the second wireless transceiver device is a terminal, determining, by the first wireless transceiver device, the transmission resource in accordance with a data transmission volume under the target data transmission process; in the case that the first wireless transceiver device is a terminal, the second wireless transceiver device is a network side device and an effective time of the target data transmission process is equal to zero, determining, by the terminal, the transmission resource through agreement, or reserving, by the network side device, the transmission resource; in the case that the first wireless transceiver device is a terminal, the second wireless transceiver device is a network side device and the effective time of the target data transmission process fails to be configured, determining, by the terminal, the transmission resource through agreement, or reserving, by the network side device, the transmission resource; or in the case that the first wireless transceiver device is a terminal, the second wireless transceiver device is a network side device and the effective time of the target data transmission process is greater than zero, determining, by the second wireless transceiver device, the transmission resource in accordance with the data transmission volume under the target data transmission process.

In a possible embodiment of the present disclosure, the selecting the transmission resource that meets the first condition includes selecting a maximum physical resource that meets a condition on data transmission through the target data transmission process, and/or a physical resource with an optimum channel state.

In a possible embodiment of the present disclosure, the determining, by the terminal, the transmission resource through the agreement includes one of: implicitly indicating the transmission resource through a position of a subframe or symbol where the indication information is located; indicating the transmission resource through information about an agreed physical resource carried in the indication information; or implicitly indicating the transmission resource through information about the target data transmission process carried in the indication information.

In a possible embodiment of the present disclosure, in the case that the first wireless transceiver device is a terminal and the effective time of the target data transmission process is greater than zero, the determining the transmission resource corresponding to the target service data includes: transmitting uplink data request information to the second wireless transceiver device, the uplink data request information including a data transmission volume of the target data transmission process; and receiving feedback information from the second wireless transmission device, the feedback information including information about the transmission resource.

In a possible embodiment of the present disclosure, the processor is further configured to read the computer program in the memory, so as to determine available data transmission processes in accordance with terminal capability information, and the available data transmission processes include the target data transmission process.

In a possible embodiment of the present disclosure, the determining the available data transmission processes in accordance with the terminal capability information includes: in the case that the first wireless transceiver device is a network side device and the second wireless transceiver device is a terminal, obtaining the terminal capability information about the terminal; and determining the available data transmission processes in accordance with the terminal capability information and data transmission processes supported by the network side device. Subsequent to determining the available data transmission processes in accordance with the terminal capability information, the method further includes transmitting information about the available data transmission processes to the second wireless transceiver device.

In a possible embodiment of the present disclosure, the determining the available data transmission processes in accordance with the terminal capability information includes: in the case that the first wireless transceiver is a terminal and the second wireless transceiver device is a network side device, transmitting the terminal capability information to the second wireless transceiver device; and receiving information about the available data transmission processes from the second wireless transceiver device.

In a possible embodiment of the present disclosure, the available data transmission processes include at least one of a transmission process through which a core network function sinks, a transmission process without any protocol stack layer, a transmission process directly occupied by a physical resource, a transmission process for adding a target function, or a transmission process for protocol stack architecture in a communication system.

In a possible embodiment of the present disclosure, the transceiver is further configured to receive second information from the second wireless transceiver device, and transmit the first information in accordance with the second information. The second information is used to indicate the first wireless transceiver device to retransmit the first information, or indicate the first wireless transceiver device to perform the data transmission by default.

In still yet another aspect, the present disclosure provides in some embodiments a device for changing a data transmission process for a second wireless transceiver device, including a memory, a transceiver and a processor. The memory is configured to store therein a computer program, the transceiver is configured to transmit and receive data under the control of the processor, and the processor is configured to read the computer program in the memory. The transceiver is configured to obtain first information from the first wireless transceiver device through a physical layer, the first information includes indication information indicating a to-be-changed target data transmission process or a triggering factor corresponding to a transmission service, and the processor is configured to read the computer program in the memory so as to change the data transmission process in accordance with the first information.

In a possible embodiment of the present disclosure, the obtaining the first information from the first wireless transceiver device through the physical layer includes detecting a target indication channel or a target signal transmitted by the first wireless transceiver device on the physical layer so as to obtain the first information, and the first information is carried in the target indication channel or target signal.

In a possible embodiment of the present disclosure, the detecting the target indication channel or target signal transmitted by the first wireless transceiver device on the physical layer so as to obtain the first information includes one of: detecting the target indication channel or target signal within each subframe so as to obtain the first information; detecting the target indication channel or target signal within a first subframe agreed by the second wireless transceiver device with the first wireless transceiver device so as to obtain the first information; detecting the target indication channel or target signal on an $M^{th}$ symbol within the first subframe agreed by the second wireless transceiver device with the first wireless transceiver device so as to obtain the first information; or detecting the target indication channel or target signal on $M^{th}$ to $N^{th}$ symbols within the first subframe agreed by the second wireless transceiver device with the first wireless transceiver device so as to obtain the first information.

In a possible embodiment of the present disclosure, the detecting the target indication channel or target signal transmitted by the first wireless transceiver device on the physical layer so as to obtain the first information includes: detecting the target indication channel or target signal in different frequency sub-domains of a frequency domain of the $M^{th}$ symbol so as to obtain the first information, or detecting the target indication channel or target signal on each of the $M^{th}$ to $N^{th}$ symbols so as to obtain the first information.

In a possible embodiment of the present disclosure, the detecting the target indication channel or target signal transmitted by the first wireless transceiver device on the physical layer so as to obtain the first information includes one of: periodically detecting the target indication channel or target signal within a first subframe agreed by the second wireless transceiver device with the first wireless transceiver device so as to obtain the first information; periodically detecting the target indication channel or target signal on an $M^{th}$ symbol within the first subframe agreed by the second wireless transceiver device with the first wireless transceiver device so as to obtain the first information; or periodically detecting the target indication channel or target signal on $M^{th}$ to $N^{th}$ symbols within the first subframe agreed by the second wireless transceiver device with the first wireless transceiver device so as to obtain the first information.

In a possible embodiment of the present disclosure, in the case that the first information includes the triggering factor, the processor is further configured to read the computer program in the memory so as to decode the first information to obtain the triggering factor, and determine the to-be-changed target data transmission process in accordance with the triggering factor and generate the indication information, the transceiver is further configured to transmit the indication information to the first wireless transceiver device, the first wireless transceiver device is a terminal, and the second wireless transceiver device is a network side device.

In a possible embodiment of the present disclosure, in the case that the first information includes the indication information, the processor is further configured to read the computer program in the memory, so as to determine whether the second wireless transceiver device agrees to change the data transmission process, and generate change feedback information, the change feedback information includes first indication information indicating that the second wireless transceiver device agrees to change the data transmission process into the target data transmission process or second indication information indicating that the second wireless transceiver device rejects to change the data transmission process into the target data transmission process, the transceiver is configured to transmit the change feedback information to the first wireless transceiver device, the first wireless transceiver device is a terminal, and the second wireless transceiver device is a network side device.

In a possible embodiment of the present disclosure, a time point when the change feedback information is transmitted to the first wireless transceiver device includes one of: a latest subframe corresponding to a time point when the first information is obtained by the second wireless transceiver device; a second subframe agreed by the second wireless transceiver device with the first wireless transceiver device; a $K^{th}$ symbol within the second subframe agreed by the second wireless transceiver device with the first wireless transceiver device; or $K^{th}$ to $L^{th}$ symbols within the second subframe agreed by the second wireless transceiver device with the first wireless transceiver device, where L is greater than K.

In a possible embodiment of the present disclosure, the processor is further configured to read the computer program in the memory so as to, in the case that the data transmission process is rejected to be changed, perform data transmission through a default transmission process.

In a possible embodiment of the present disclosure, the indication information includes at least one of: information about the to-be-changed target data transmission process; or the information about the to-be-changed target data transmission process and information about an effective time of the to-be-changed target data transmission process.

In a possible embodiment of the present disclosure, a time window where a process is effective after the target data transmission process takes effect includes one of: a target time window; a time period from a time point when the target data transmission process takes effect to a time point when indication information other than the first information has been received; or a time period from a time point when the target data transmission process takes effect to a time point when a protocol stack de-configuration instruction has been received.

In a possible embodiment of the present disclosure, the triggering factor includes at least one of a user service feature parameter, slice auxiliary identification information, or information about user's customized demand.

In a possible embodiment of the present disclosure, the processor is further configured to read the computer program in the memory so as to determine a transmission resource corresponding to target service data, and the target service data is to be transmitted through the to-be-changed target data transmission process. The transmission resource is determined through one of: selecting a transmission resource that meets a first condition; in the case that the first wireless transceiver device is a network side device and the second wireless transceiver device is a terminal, determining, by the first wireless transceiver device, the transmission resource in accordance with a data transmission volume under the target data transmission process; in the case that the first wireless transceiver device is a terminal, the second wireless transceiver device is a network side device and an effective time of the target data transmission process is equal to zero, determining, by the terminal, the transmission resource through agreement, or reserving, by the network side device, the transmission resource; in the case that the first wireless transceiver device is a terminal, the second wireless transceiver device is a network side device and the effective time of the target data transmission process fails to be configured, determining, by the terminal, the transmission resource through agreement, or reserving, by the network side device, the transmission resource; or in the case that the first wireless transceiver device is a terminal, the second wireless transceiver device is a network side device and the effective time of the target data transmission process is greater than zero, determining, by the second wireless transceiver device, the transmission resource in accordance with the data transmission volume under the target data transmission process.

In a possible embodiment of the present disclosure, the selecting the transmission resource that meets the first condition includes selecting a maximum physical resource that meets a condition on data transmission through the target data transmission process, and/or a physical resource with an optimum channel state.

In a possible embodiment of the present disclosure, the determining, by the terminal, the transmission resource through the agreement includes one of: implicitly indicating the transmission resource through a position of a subframe or symbol where the indication information is located; indicating the transmission resource through information about an agreed physical resource carried in the indication information; or implicitly indicating the transmission resource through information about the target data transmission process carried in the indication information.

In a possible embodiment of the present disclosure, in the case that the first wireless transceiver device is a terminal and the effective time of the target data transmission process is greater than zero, the determining the transmission resource corresponding to the target service data includes: receiving uplink data request information from the first wireless transceiver device, the uplink data request information including a data transmission volume of the target data transmission process; determining the transmission resource corresponding to the target service data in accordance with the data transmission volume; and transmitting feedback information to the first wireless transmission device, the feedback information including information about the transmission resource.

In a possible embodiment of the present disclosure, in the case that the transmission resource is determined by the terminal through agreement, the changing the data transmission process in accordance with the first information includes changing the target data transmission process in accordance with the first information at a time point when relevant information about the transmission resource has been received.

In a possible embodiment of the present disclosure, the processor is further configured to read the computer program in the memory so as to: enable an interference elimination algorithm function at the time point when the relevant information about the transmission resource has been received; and perform the data transmission through the transmission resource in the target data transmission process.

In a possible embodiment of the present disclosure, the processor is further configured to read the computer program in the memory so as to determine available data transmission processes in accordance with terminal capability information, and the available data transmission processes include the target data transmission process.

In a possible embodiment of the present disclosure, the determining the available data transmission processes in accordance with the terminal capability information includes: in the case that the first wireless transceiver device is a network side device and the second wireless transceiver device is a terminal, transmitting the terminal capability information to the first wireless transceiver device; and receiving information about the available data transmission processes from the first wireless transceiver device.

In a possible embodiment of the present disclosure, the determining the available data transmission processes in accordance with the terminal capability information includes: in the case that the first wireless transceiver is a terminal and the second wireless transceiver device is a network side device, receiving the terminal capability information from the first wireless transceiver device; and determining the available data transmission processes in accordance with the terminal capability information and data transmission processes supported by the network side device. Subsequent to determining the available data transmission processes in accordance with the terminal capability information, the method further includes transmitting information about the available data transmission processes to the first wireless transceiver device.

In a possible embodiment of the present disclosure, the available data transmission processes include at least one of a transmission process through which a core network function sinks, a transmission process without any protocol stack layer, a transmission process directly occupied by a physical resource, a transmission process for adding a target function, or a transmission process for protocol stack architecture in a communication system.

In a possible embodiment of the present disclosure, the transceiver is further configured to, in the case that the first information fails to be obtained, transmit second information to the first wireless transceiver device in accordance with the triggering factor corresponding to the transmission service. The second information is used to indicate the first wireless transceiver device to retransmit the first information, or indicate the first wireless transceiver device to perform the data transmission by default.

In still yet another aspect, the present disclosure provides in some embodiments a device for changing a data transmission process for a first wireless transceiver device, including a first transmission unit configured to transmit first information to a second wireless transceiver device through a physical layer. The first information includes indication information indicating a to-be-changed target data transmission process or a triggering factor corresponding to a transmission service.

In a possible embodiment of the present disclosure, the first transmission unit is specifically configured to transmit a target indication channel or a target signal to the second wireless transceiver device directly through the physical layer, and the target indication channel or target signal carries the first information.

In a possible embodiment of the present disclosure, a time point when the target indication channel or target signal is transmitted by the first wireless transceiver device to the second wireless transceiver device through the physical layer includes one of: a latest subframe corresponding to a time point when the triggering factor is obtained by the first wireless transceiver device; a latest subframe corresponding to a time point when the target data transmission process is determined by the first wireless transceiver device; a latest subframe corresponding to a time point when a data transmission process of the first wireless transceiver device is changed; a first subframe agreed by the first wireless transceiver device with the second wireless transceiver device; an $M^{th}$ symbol within the first subframe agreed by the first wireless transceiver device with the second wireless transceiver device; or $M^{th}$ to $N^{th}$ symbols within the first subframe agreed by the first wireless transceiver device with the second wireless transceiver device, where N is greater than M.

In a possible embodiment of the present disclosure, the first information is carried in different frequency sub-domains of a frequency domain of the $M^{th}$ symbol, or the first information is carried in each of the $M^{th}$ to $N^{th}$ symbols.

In a possible embodiment of the present disclosure, the device further includes: a first determination unit configured to determine the to-be-changed target data transmission process in accordance with the triggering factor corresponding to the transmission service; and a first changing unit configured to change the data transmission process into the target data transmission process.

In a possible embodiment of the present disclosure, the device further includes: a first reception unit configured to receive change feedback information from the second wireless transceiver device, the change feedback information including first indication information indicating that the second wireless transceiver device agrees to change the data transmission process into the target data transmission process or second indication information indicating that the second wireless transceiver device rejects to change the data transmission process into the target data transmission process; a second changing unit configured to, in the case that the change feedback information includes the first indication information, change the data transmission process into the target data transmission process; and a second processing unit configured to, in the case that the change feedback information includes the second indication information, perform data transmission through a default transmission process. The first wireless transceiver device is a terminal, and the second wireless transceiver device is a network side device.

In a possible embodiment of the present disclosure, the device further includes: a second reception unit configured to receive indication information from the second wireless transceiver device, the indication information being generated and transmitted by the second wireless transceiver device after the second wireless transceiver device decodes the first information and obtains the triggering factor; a second determination unit configured to determine the to-bechanged target data transmission process in accordance with the indication information; and a third changing unit configured to change the data transmission process into the target data transmission process. The first wireless transceiver device is a terminal, and the second wireless transceiver device is a network side device.

In a possible embodiment of the present disclosure, the indication information includes one of: information about the to-be-changed target data transmission process; or the information about the to-be-changed target data transmission process and information about an effective time of the to-be-changed target data transmission process.

In a possible embodiment of the present disclosure, a time window where a process is effective after the target data transmission process takes effect includes one of: a target time window; a time period from a time point when the target data transmission process takes effect to a time point when indication information other than the first information has been received; or a time period from a time point when the target data transmission process takes effect to a time point when a protocol stack de-configuration instruction has been received.

In a possible embodiment of the present disclosure, the triggering factor includes at least one of a user service feature parameter, slice auxiliary identification information, or information about user's customized demand.

In a possible embodiment of the present disclosure, the indication information is indicated through one of a coding sequence formed through coding with an agreed transmission process identifier, or a state information bitmap formed through coding with the agreed transmission process identifier.

In a possible embodiment of the present disclosure, the device further includes a third determination unit configured to determine a transmission resource corresponding to target service data, and the target service data is to be transmitted through the to-be-changed target data transmission process. The transmission resource is determined through one of: selecting a transmission resource that meets a first condition; in the case that the first wireless transceiver device is a network side device and the second wireless transceiver device is a terminal, determining, by the first wireless transceiver device, the transmission resource in accordance with a data transmission volume through the target data transmission process; in the case that the first wireless transceiver device is a terminal, the second wireless transceiver device is a network side device and an effective time of the target data transmission process is equal to zero, determining, by the terminal, the transmission resource through agreement, or reserving, by the network side device, the transmission resource; in the case that the first wireless transceiver device is a terminal, the second wireless transceiver device is a network side device and the effective time of the target data transmission process fails to be configured, determining, by the terminal, the transmission resource through agreement, or reserving, by the network side device, the transmission resource; or in the case that the first wireless transceiver device is a terminal, the second wireless transceiver device is a network side device and the effective time of the target data transmission process is greater than zero, determining, by the second wireless transceiver device, the transmission resource in accordance with the data transmission volume through the target data transmission process.

In a possible embodiment of the present disclosure, the selecting the transmission resource that meets the first condition includes selecting a maximum physical resource that meets a condition on data transmission through the target data transmission process, and/or a physical resource with an optimum channel state.

In a possible embodiment of the present disclosure, the determining, by the terminal, the transmission resource through the agreement includes one of: implicitly indicating the transmission resource through a position of a subframe or symbol where the indication information is located; indicating the transmission resource through information about an agreed physical resource carried in the indication information; or implicitly indicating the transmission resource through information about the target data transmission process carried in the indication information.

In a possible embodiment of the present disclosure, in the case that the first wireless transceiver device is a terminal and the effective time of the target data transmission process is greater than zero, the third determination unit includes: a first transmission sub-unit configured to transmit uplink data request information to the second wireless transceiver device, the uplink data request information including a data transmission volume of the target data transmission process; and a first reception sub-unit configured to receive feedback information from the second wireless transmission device, the feedback information including information about the transmission resource.

In a possible embodiment of the present disclosure, the device further includes a fourth determination unit configured to determine available data transmission processes in accordance with terminal capability information, and the available data transmission processes include the target data transmission process.

In a possible embodiment of the present disclosure, the fourth determination unit includes: a first obtaining sub-unit configured to, in the case that the first wireless transceiver device is a network side device and the second wireless transceiver device is a terminal, obtain the terminal capability information about the terminal; and a first determination sub-unit configured to determine the available data transmission processes in accordance with the terminal capability information and data transmission processes supported by the network side device. The device further includes a second transmission sub-unit configured to transmit information about the available data transmission processes to the second wireless transceiver device.

In a possible embodiment of the present disclosure, the fourth determination unit includes: a second transmission sub-unit configured to, in the case that the first wireless transceiver is a terminal and the second wireless transceiver device is a network side device, transmit the terminal capability information to the second wireless transceiver device; and a second reception unit configured to receive information about the available data transmission processes from the second wireless transceiver device.

In a possible embodiment of the present disclosure, the available data transmission processes include at least one of a transmission process through which a core network function sinks, a transmission process without any protocol stack layer, a transmission process directly occupied by a physical resource, a transmission process for adding a target function, or a transmission process for protocol stack architecture in a communication system.

In a possible embodiment of the present disclosure, the device further includes: a third reception unit configured to receive second information from the second wireless transceiver device; and a third transmission unit configured to transmit the first information in accordance with the second information. The second information is used to indicate the first wireless transceiver device to retransmit the first information, or indicate the first wireless transceiver device to perform the data transmission by default.

In still yet another aspect, the present disclosure provides in some embodiments a device for changing a data transmission process for a second wireless transceiver device, including: a first obtaining unit configured to obtain first information from the first wireless transceiver device through a physical layer, the first information including indication information indicating a to-be-changed target data transmission process or a triggering factor corresponding to a transmission service; and a first processing unit configured to change the data transmission process in accordance with the first information.

In a possible embodiment of the present disclosure, the first obtaining unit is specifically configured to detect a target indication channel or a target signal transmitted by the first wireless transceiver device on the physical layer so as to obtain the first information, and the first information is carried in the target indication channel or target signal.

In a possible embodiment of the present disclosure, the first obtaining unit is specifically configured to perform one of: detecting the target indication channel or target signal within each subframe so as to obtain the first information; detecting the target indication channel or target signal within a first subframe agreed by the second wireless transceiver device with the first wireless transceiver device so as to obtain the first information; detecting the target indication channel or target signal on an $M^{th}$ symbol within the first subframe agreed by the second wireless transceiver device with the first wireless transceiver device so as to obtain the first information; or detecting the target indication channel or target signal on $M^{th}$ to $N^{th}$ symbols within the first subframe agreed by the second wireless transceiver device with the first wireless transceiver device so as to obtain the first information.

In a possible embodiment of the present disclosure, the first obtaining unit is specifically configured to perform one of: periodically detecting the target indication channel or target signal within a first subframe agreed by the second wireless transceiver device with the first wireless transceiver device so as to obtain the first information; periodically detecting the target indication channel or target signal on an $M^{th}$ symbol within the first subframe agreed by the second wireless transceiver device with the first wireless transceiver device so as to obtain the first information; or periodically detecting the target indication channel or target signal on $M^{th}$ to $N^{th}$ symbols within the first subframe agreed by the second wireless transceiver device with the first wireless transceiver device so as to obtain the first information.

In a possible embodiment of the present disclosure, the first obtaining unit is specifically configured to detect the target indication channel or target signal in different frequency sub-domains of a frequency domain of the $M^{th}$ symbol so as to obtain the first information, or detect the target indication channel or target signal on each of the $M^{th}$ to $N^{th}$ symbols so as to obtain the first information.

In a possible embodiment of the present disclosure, the device further includes: a decoding unit configured to decode the first information so as to obtain the triggering factor; a fifth determination unit configured to determine the to-be-changed target data transmission process in accordance with the triggering factor, and generate the indication information; and a fourth transmission unit configured to transmit the indication information to the first wireless transceiver device. The first wireless transceiver device is a terminal, and the second wireless transceiver device is a network side device.

In a possible embodiment of the present disclosure, in the case that the first information includes the indication information, the device further includes: a sixth determination unit configured to determine whether the second wireless transceiver device agrees to change the data transmission process, and generate change feedback information, the change feedback information including first indication information indicating that the second wireless transceiver device agrees to change the data transmission process into the target data transmission process or second indication information indicating that the second wireless transceiver device rejects to change the data transmission process into the target data transmission process; and a fifth transmission unit configured to transmit the change feedback information to the first wireless transceiver device. The first wireless transceiver device is a terminal, and the second wireless transceiver device is a network side device.

In a possible embodiment of the present disclosure, a time point when the change feedback information is transmitted to the first wireless transceiver device includes one of: a latest subframe corresponding to a time point when the first information is obtained by the second wireless transceiver device; a second subframe agreed by the second wireless transceiver device with the first wireless transceiver device; a $K^{th}$ symbol within the second subframe agreed by the second wireless transceiver device with the first wireless transceiver device; or $K^{th}$ to $L^{th}$ symbols within the second subframe agreed by the second wireless transceiver device with the first wireless transceiver device, where L is greater than K.

In a possible embodiment of the present disclosure, the device further includes a third processing unit configured to, in the case that the data transmission process is rejected to be changed, perform data transmission through a default transmission process.

In a possible embodiment of the present disclosure, the indication information includes at least one of: information about the to-be-changed target data transmission process; or the information about the to-be-changed target data transmission process and information about an effective time of the to-be-changed target data transmission process.

In a possible embodiment of the present disclosure, a time window where a process is effective after the target data transmission process takes effect includes one of: a target time window; a time period from a time point when the target data transmission process takes effect to a time point when indication information other than the first information has been received; or a time period from a time point when the target data transmission process takes effect to a time point when a protocol stack de-configuration instruction has been received.

In a possible embodiment of the present disclosure, the triggering factor includes at least one of a user service feature parameter, slice auxiliary identification information, or information about user's customized demand.

In a possible embodiment of the present disclosure, the device further includes a seventh determination unit configured to determine a transmission resource corresponding to target service data, and the target service data is to be transmitted through the to-be-changed target data transmission process. The transmission resource is determined through one of: selecting a transmission resource that meets a first condition; in the case that the first wireless transceiver device is a network side device and the second wireless transceiver device is a terminal, determining, by the first wireless transceiver device, the transmission resource in accordance with a data transmission volume through the target data transmission process; in the case that the first wireless transceiver device is a terminal, the second wireless transceiver device is a network side device and an effective time of the target data transmission process is equal to zero, determining, by the terminal, the transmission resource through agreement, or reserving, by the network side device, the transmission resource; in the case that the first wireless transceiver device is a terminal, the second wireless transceiver device is a network side device and the effective time of the target data transmission process fails to be configured, determining, by the terminal, the transmission resource through agreement, or reserving, by the network side device, the transmission resource; or in the case that the first wireless transceiver device is a terminal, the second wireless transceiver device is a network side device and the effective time of the target data transmission process is greater than zero, determining, by the second wireless transceiver device, the transmission resource in accordance with the data transmission volume through the target data transmission process.

In a possible embodiment of the present disclosure, the selecting the transmission resource that meets the first condition includes selecting a maximum physical resource that meets a condition on data transmission through the target data transmission process, and/or a physical resource with an optimum channel state.

In a possible embodiment of the present disclosure, the determining, by the terminal, the transmission resource through the agreement includes one of: implicitly indicating the transmission resource through a position of a subframe or symbol where the indication information is located; indicating the transmission resource through information about an agreed physical resource carried in the indication information; or implicitly indicating the transmission resource through information about the target data transmission process carried in the indication information.

In a possible embodiment of the present disclosure, in the case that the first wireless transceiver device is a terminal and the effective time of the target data transmission process is greater than zero, the seventh determination unit includes: a third reception sub-unit configured to receive uplink data request information from the first wireless transceiver device, the uplink data request information including a data transmission volume of the target data transmission process; a second determination sub-unit configured to determine the transmission resource corresponding to the target service data in accordance with the data transmission volume; and a third transmission sub-unit configured to transmit feedback information to the first wireless transmission device, the feedback information including information about the transmission resource.

In a possible embodiment of the present disclosure, in the case that the transmission resource is determined by the terminal through agreement, the first processing unit is specifically configured to change the data transmission process into the target data transmission process in accordance with the first information at a time point when relevant information about the transmission resource is received.

In a possible embodiment of the present disclosure, the device further includes: a fourth processing unit configured to enable an interference elimination algorithm function at the time point when the relevant information about the transmission resource has been received; and a fifth processing unit configured to perform the data transmission through the transmission resource in the target data transmission process.

In a possible embodiment of the present disclosure, the device further includes an eighth determination unit configured to determine available data transmission processes in accordance with terminal capability information, and the available data transmission processes include the target data transmission process.

In a possible embodiment of the present disclosure, the eighth determination unit includes: a fourth transmission sub-unit configured to, in the case that the first wireless transceiver device is a network side device and the second wireless transceiver device is a terminal, transmit the terminal capability information to the first wireless transceiver device; and a fourth reception sub-unit configured to receive information about the available data transmission processes from the first wireless transceiver device.

In a possible embodiment of the present disclosure, the eighth determination unit includes: a fifth reception sub-unit configured to, in the case that the first wireless transceiver is a terminal and the second wireless transceiver device is a network side device, receive the terminal capability information from the first wireless transceiver device; and a third determination sub-unit configured to determine the available data transmission processes in accordance with the terminal capability information and data transmission processes supported by the network side device. The device further includes a fifth transmission sub-unit configured to transmit information about the available data transmission processes to the first wireless transceiver device.

In a possible embodiment of the present disclosure, the available data transmission processes include at least one of a transmission process through which a core network function sinks, a transmission process without any protocol stack layer, a transmission process directly occupied by a physical resource, a transmission process for adding a target function, or a transmission process for protocol stack architecture in a communication system.

In a possible embodiment of the present disclosure, the device further includes a sixth transmission unit configured to, in the case that the first information fails to be obtained, transmit second information to the first wireless transceiver device in accordance with the triggering factor corresponding to the transmission service. The second information is used to indicate the first wireless transceiver device to retransmit the first information, or indicate the first wireless transceiver device to perform the data transmission by default.

In still yet another aspect, the present disclosure provides in some embodiments a processor-readable storage medium storing therein a computer program. The computer program is executed by a processor so as to implement the above-mentioned method.

The present disclosure has the following beneficial effects.

According to the embodiments of the present disclosure, the first wireless transceiver device transmits the first information for triggering the change of the data transmission process to the second wireless transceiver device through the physical layer. The first information is associated with the triggering factor corresponding to the transmission service, and it includes the triggering factor or the indication information. The indication information is used to indicate the to-be-changed target data transmission process, and the to-be-changed target data transmission process is determined in accordance with the triggering factor. In this way, it is able to rapidly change the data transmission process agreed by the second wireless transceiver device, thereby to perform the data transmission. For a future communication system, when there is a sudden new service or a service having a new user demand in conventional service transmission, a rapid triggering and changing operation is performed on the physical layer so that the service is rapidly changed to be transmitted through a matched data transmission process, so as to improve the service transmission performance.

DETAILED DESCRIPTION

In order to make the objects, the technical solutions and the advantages of the present disclosure more apparent, the present disclosure will be described hereinafter in a clear and complete manner in conjunction with the drawings and embodiments. In the following description, specific details of configurations and assemblies are merely provided to facilitate the understanding of the present disclosure. It should be appreciated that, a person skilled in the art may make further modifications and alternations without departing from the spirit of the present disclosure. In addition, for clarification, any known function and structure will not be described hereinafter.

It should be further appreciated that, such phrases as "one embodiment" and "one of the embodiments" intend to indicate that the features, structures or characteristics are contained in at least one embodiment of the present disclosure, rather than referring to a same embodiment. In addition, the features, structures or characteristics may be combined in any embodiment or embodiments in an appropriate manner.

It should be appreciated that, the following serial numbers do not refer to the order of the steps. Actually, the order shall be determined in accordance with functions and internal logic of the steps, but shall not be construed as limiting the implementation in any form.

It should be appreciated that, the expression "and/or" is merely used to describe the relationship between objects, and it includes three relationships. For example, "A and/or B" may represent that, there is only A, there are both A and B, and there is only B. Further, the symbol "/" usually refers to "or".

The expression "a plurality of" refers to two or more, and the other quantifiers are similar.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Some concepts involved in the embodiments of the present disclosure will be described at first.

Mode for Transmitting User Data Through a User Plane Protocol Stack

Figures 1, 2:
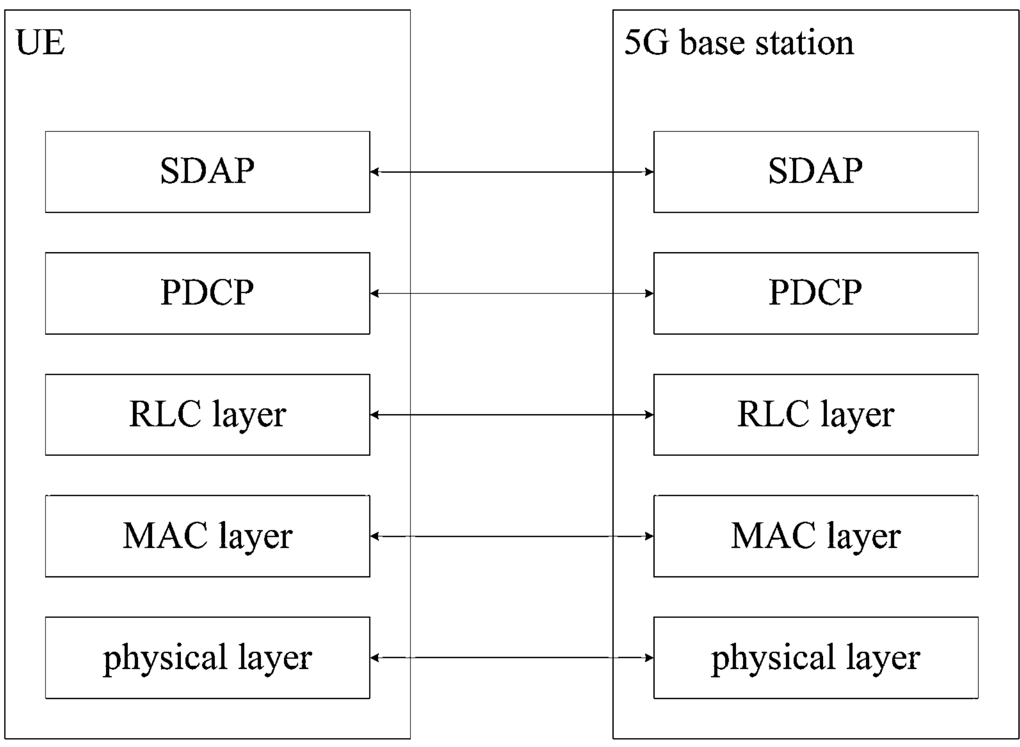
FIG. 1 is a schematic view showing a user plane protocol stack.
FIG. 2 is a flow chart of a method for changing a data transmission process according to one embodiment of the present disclosure.

In a current $5^{th}$-Generation (5G) system, the user plane protocol stack is shown in FIG. 1. A mapping from a Quality of Service (QoS) flow to a Data Radio Bearer (DRB) is completed by a Service Data Adaptation Protocol (SDAP). Header compression, encryption and integrity protection of a data packet are completed by a Packet Data Convergence Protocol (PDCP). There are three transmission modes at a Radio Link Control (RLC) layer, i.e., a Transparent Mode (TM), an Unacknowledged Mode (UM) and an Acknowledged Mode (AM), so as to achieve such functions as the transmission of upper-layer Protocol Data Unit (PDU) data, the numbering of transmission sequences, the correction of an Automatic Repeat reQuest (ARQ), the segmentation and concatenation of Service Data Unit (SDU) data, and the error-detection and retransmission of the data.

The mapping between a logic channel and a transmission channel is mainly completed at an MAC layer, and such functions as correction, priority-level processing between User Equipments (UEs) and dynamic scheduling of resources are completed through a Hybrid Automatic Repeat reQuest (HARQ). Such link layer transmission functions as encoding/decoding, modulation, demodulation and multi-antenna mapping are completed at a physical layer, and services are provided to the MAC layer in the form of transmission channel.

In the communication system, user data is transmitted through the above-mentioned user plane protocol stacks, and different transmission modes, types or relevant parameter configurations are selected for different service types and application scenarios. During the data transmission, the MAC layer calculates a user data priority level in accordance with user service feature parameters (e.g., a service type, a delay budget or a maximum tolerable packet loss), so as to schedule and allocate resources. For example, for a new service which is sudden or time-sensitive or which has a very high priority level (the service has a transmission delay at a sub-millisecond level), in a current transmission process, the transmission configuration needs to be performed in accordance with a QoS feature parameter, and resource contention needs to be performed between the new service and a currently-transmitted conventional service. In the process of scheduling the resources through the MAC layer, calculating a scheduling priority level in accordance with the QoS parameter and waiting for the allocation of the resources and the scheduled transmission, a queuing delay of the new service increases due to a data volume or a high priority level of the conventional service, so it is impossible to meet the requirement on the delay of the new service. Hence, during the transmission of the conventional service, a corresponding transmission process matching the new service which is sudden should be taken into consideration, and meanwhile the transmission process should be changed rapidly, so as to ensure the transmission performance.

Various new services will be introduced into a future communication network, different users have various demands on the new services, and these demands and the conventional service may occur concurrently, or occur alternately and rapidly. For example, for a $6^{th}$-Generation (6G)-oriented holographic communication service and an augmented extended reality service, an immersive, interactive experience is achieved through the deep fusion of virtuality and reality. In order to achieve accurate operation, errorless display and security warning, an end-to-end delay should be smaller than 1 ms, and meanwhile high-reliability transmission of a big data packet needs to be supported. For another example, for a digital twin service in the field of manufacturing, medicine, agriculture or city, a super low delay and a data processing function (e.g., big-data analysis and artificial intelligence) need to be provided for real-time control and prediction. In addition, for such a service as intelligent factory, a super strong computing power and a super low delay are required. Moreover, for a private network or a special network in vertical industry, the adaptability of the entire network needs to be enhanced. Hence, for the transmission in different vertical industries, different users and different services, a current protocol stack data processing process cannot necessarily meet the requirement on the new service or the user's new demand in future. Especially, during the transmission of the conventional service or any other device, the current process needs to be rapidly replaced with a transmission process adapted to the new service or the user's new demand. When a plurality of transmission processes needs to be taken into consideration for different services, in order to transmit the data for the new service or the user's new demand on a specific process meeting the transmission characteristics, it is necessary to provide a method for rapidly changing the data transmission process in accordance with the transmission service characteristics or demand.

An object of the present disclosure is to provide a method and a device for changing a data transmission process, and a processor-readable storage medium, so as to solve the problem in the related art where it is impossible for the service processing process of the protocol stack in the communication system to meet the service transmission demand.

As shown in FIG. 2, the present disclosure provides in some embodiments a method for changing a data transmission process for a first wireless transceiver device, which includes Step 21 of transmitting, by a first wireless transceiver device, first information to a second wireless transceiver device through a physical layer. The first information is used to trigger the second wireless transceiver device to change the data transmission process, and it includes indication information indicating a to-be-changed target data transmission process or a triggering factor corresponding to a transmission service.

The first wireless transceiver device and the second wireless transceiver device are each a terminal or a network side device, and the second wireless transceiver device is at an opposite end of the first wireless transceiver device. The first wireless transceiver device is a device for service data, and the second wireless transceiver device is a device for service data. The network side device is a base station, a relay, an Integrated Access and Backhaul (IAB) donor, an IAB node, a Centralized Unit (CU), or a Distributed Unit (DU).

The first wireless transceiver device transmits the first information for triggering the change of the data transmission process to the second wireless transceiver device through the physical layer, and the first information is related to a transmission service. For example, the transmission device includes an intelligent, cross-domain, new service which is sudden or time-sensitive or which has a very high transmission characteristic or a very high priority level, or a transmission service having a new user demand. The first information includes the indication information or the triggering factor. The triggering factor is a triggering factor for a sudden transmission service during the transmission of a conventional service, and it is used to reflect characteristics of the sudden new service or information about the new user demand. The indication information is related to the triggering factor. The indication information is information corresponding to the data transmission process matched in accordance with the triggering factor, and it is used to indicate the to-be-changed target data transmission process.

After the first wireless transceiver device has transmitted the first information to the second wireless transceiver device, the second wireless transceiver device changes the data transmission process in accordance with the first information, so as to perform the data transmission through the changed target data transmission process.

The first wireless transceiver device determines a to-be-changed data transmission process in accordance with the triggering factor, or in accordance with the indication information from the second wireless transceiver device, so as to change the data transmission process. The to-be-changed data transmission process is one of at least one data transmission processes corresponding to the transmission service and agreed by the first wireless transceiver device with the second wireless transceiver device in advance.

In the embodiments of the present disclosure, the first wireless transceiver device transmits the first information for triggering the change of the data transmission process to the second wireless transceiver device through the physical layer. The first information is associated with the triggering factor corresponding to the transmission service, and it includes the triggering factor or the indication information. The indication information is used to indicate the to-be-changed target data transmission process, and the to-be-changed target data transmission process is determined in accordance with the triggering factor, so as to rapidly change the data transmission process agreed by the second wireless transceiver device for the data transmission. For a future communication system (e.g., 6G), when there is a sudden new service (e.g., an urgent/time-sensitive service) or a service having a new user demand in the conventional service, the service is changed to be transmitted on a matched data transmission process through a rapid triggering and changing operation on the physical layer, so as to improve the service transmission performance and the user experience.

To be specific, the indication information includes one of the followings.

a. Information about the to-be-changed target data transmission process. The target data transmission process is agreed by the first wireless transceiver device with the second wireless transceiver device, and the information includes a specific identifier corresponding to the target data transmission process or a new service identifier carried by the process.

b. Information about the to-be-changed target data transmission process and information about an effective time of the to-be-changed target data transmission process. The information about the effective time is used to indicate that the target data transmission process is effective in an agreed time period. For example, after obtaining the indication information, a time when the data transmission process is changed by the first wireless transceiver device or the second wireless transceiver device is T, the changed data transmission process is effective at T+T1 and the data is transmitted at the effective time, where T1 is the agreed effective time within 0 to Tmax and T1 can be configured.

It should be appreciated that, the information about the effective time may also be obtained by default (i.e., the effective time T1 is agreed in the system) or obtained through indication information from a non-physical layer. When there is no information about the effective time, the first wireless transceiver device transmits the data through dedicated resources agreed for the process while transmitting the indication information.

A time window where a process is effective after the target data transmission process takes effect includes one of: (a) a target time window (i.e., the process is effective in a fixed time window); (b) a time period from a time point when the target data transmission process takes effect to a time point when indication information other than the first information has been received; or (c) a time period from a time point when the target data transmission process takes effect to a time point when a protocol stack de-configuration instruction has been received. In the case of (c), a default transmission process configuration is executed continuously.

It should be appreciated that, the time window where the process is effective after the target data transmission process takes effect refers to a time range where the process is effective after the target data transmission process has been changed and starts to be effective. The time window where the process is effective after the target data transmission process takes effect includes, but not limited to, the above three modes, and it may also be set according to a service transmission demand.

To be specific, the triggering factor includes at least one of the followings.

a). User service feature parameter, e.g., a new type of a user service, an ultra-low latency and high-reliability characteristic, or information about a certain relevant parameter higher than a relevant service characteristic. The matched data transmission process, i.e., the agreed target data transmission process, is selected in accordance with the feature parameter of the service.

b). Slice auxiliary identification information, e.g., network slice auxiliary identification information determined by the network side device in accordance with a service transmission characteristic. Different slice identities correspond to different service transmission characteristics, which need to match with different data transmission processes. The agreed data transmission process is selected in accordance with the slice identifier so as to meet a slice type.

c). Information about user's customized demand, e.g., the demand of the user on such functions as big-data analysis or artificial intelligence. The agreed data transmission process is selected in accordance with a specific demand of the user, and the agreed data transmission process corresponds to the specific demand of the user.

The triggering factor includes one or more of the above-mentioned parameter information. Each of the first wireless transceiver device and the second wireless transceiver device determines the to-be-changed data transmission process in accordance with the triggering factor, so as to be rapidly changed to the matched data transmission process in accordance with the transmission service for the data transmission, thereby to improve the service transmission performance.

In a possible embodiment of the present disclosure, the transmitting, by the first wireless transceiver device, the first information to the second wireless transceiver device through the physical layer includes transmitting, by the first wireless transceiver device, a target indication channel or a target signal to the second wireless transceiver device directly through the physical layer, and the target indication channel or target signal carries the first information.

In the embodiments of the present disclosure, when transmitting the first information to the second wireless transceiver device, the first wireless transceiver device transmits a dedicated channel or a dedicated signal carrying the first information to the second wireless transceiver device. The dedicated channel is just the target channel, e.g., a dedicated channel for transmitting the first information or a channel having any other transmission function, and the first information is carried in the channel. The dedicated signal is just the target signal, e.g., a dedicated signal for transmitting the first information or a signal having any other transmission function, and the first information is carried in the signal.

It should be appreciated that, when the first wireless transceiver device transmits the target indication channel or target signal, a specific symbol is directly set on a physical resource at the physical layer for transmitting the first information, i.e., the first information is transmitted without being forwarded through any other high-layer signaling. In a possible embodiment of the present disclosure, there is a predefined timing relationship between the target indication channel and a channel carrying to-be-transmitted information, and the timing relationship is set in accordance with an information transmission demand.

The first wireless transceiver device selects the agreed data transmission process in accordance with the triggering factor (e.g., the sudden new service feature or the new user demand), and transmits the dedicated signal or dedicated channel to the second wireless transceiver device through the physical layer, so as to rapidly change the data transmission process for the data transmission, and respond to the first information directly and rapidly.

Further, a time point when the target indication channel or target signal is transmitted by the first wireless transceiver device to the second wireless transceiver device through the physical layer includes one of the followings.

(1) A latest subframe corresponding to a time point when the triggering factor is obtained by the first wireless transceiver device. This scheme is suitable for a circumstance where the first information includes the triggering factor, i.e., the first wireless transceiver device directly transmits the triggering factor to the second wireless transceiver device. For example, the first wireless transceiver device obtains the triggering factor corresponding to the transmission service in accordance with the sudden new service characteristic or the new user demand, and then transmits the triggering factor to the second wireless transceiver device within the latest subframe corresponding to the time point when the triggering factor is obtained.

(2) A latest subframe corresponding to a time point when the target data transmission process is determined by the first wireless transceiver device. This scheme is suitable for a circumstance where the first information includes the indication information and the second wireless transceiver device needs to agree to change the data transmission process. The first wireless transceiver device transmits the indication information to the second wireless transceiver device in accordance with the triggering factor within the latest subframe corresponding to the time point when the target data transmission process is determined.

(3) A latest subframe corresponding to a time point when a data transmission process of the first wireless transceiver device is changed. This scheme is suitable for a circumstance where the first information includes the indication information and the first wireless transceiver device determines the to-be-changed target data transmission process in accordance with the triggering factor. When determining the target data transmission process in accordance with the triggering factor, the first wireless transceiver device transmits the first information to the second wireless transceiver device within the latest subframe corresponding to the time point when the data transmission process agreed by the first wireless transceiver device itself is changed.

(4) A first subframe agreed by the first wireless transceiver device with the second wireless transceiver device. A time for transmitting the first information is agreed by the first wireless transceiver device with the second wireless transceiver device in advance, e.g., a subframe with a subframe index K for transmitting/receiving the first information is set as the first subframe in advance, and the first information is carried in the first subframe. In this case, the first information includes the indication information or the triggering factor.

(5) An $M^{th}$ symbol within the first subframe agreed by the first wireless transceiver device with the second wireless transceiver device. A time for transmitting the first information is agreed by the first wireless transceiver device with the second wireless transceiver device in advance, e.g., the time for transmitting/receiving the first information is set as the $M^{th}$ symbol within the first subframe in advance, and the first information is carried in the $M^{th}$ symbol. In this case, the first information includes the indication information or the triggering factor. For example, one or more of the user service feature parameter, the slice auxiliary identification information or the information about the user's customized demand is carried in the $M^{th}$ symbol within the first subframe.

(6) $M^{th}$ to $N^{th}$ symbols within the first subframe agreed by the first wireless transceiver device with the second wireless transceiver device, where N is greater than M. A time for transmitting the first information is agreed by the first wireless transceiver device with the second wireless transceiver device in advance, e.g., the time for transmitting/receiving the first information is set as the $M^{th}$ to $N^{th}$ symbols within the first subframe in advance, and the first information is carried in the $M^{th}$ to $N^{th}$ symbols. It should be appreciated that, the first information is carried in a part of, or all of, the $M^{th}$ to $N^{th}$ symbols. In this case, the first information includes the indication information or the triggering factor.

In a possible embodiment of the present disclosure, a part of information in the triggering factor is carried in a part of the $M^{th}$ to $N^{th}$ symbols, and the remaining information in the triggering factor is carried in the other part of the $M^{th}$ to $N^{th}$ symbols. For example, when the first information includes the triggering factor, the user service feature parameter is carried in a first symbol in the $M^{th}$ to $N^{th}$ symbols, the slice auxiliary identification information is carried in a second symbol in the $M^{th}$ to $N^{th}$ symbols, and the information about the user's customized demand is carried in a third symbol in the $M^{th}$ to $N^{th}$ symbols.

When the triggering factors are transmitted through one or more symbols within the first subframe and too much information content is contained in the triggering factors, there may exist such a circumstance where it is impossible to transmit all the triggering factors through one symbol. At this time, other transmission mode may be selected. For example, the triggering factors are transmitted within the first subframe when a data volume of the triggering factor is greater than a threshold.

When the first wireless transceiver device transmits the first information at the above-mentioned time point, the second wireless transceiver device obtains the first information at a corresponding time point. When obtaining the first information, the second wireless transceiver device periodically detects the first information at the time point when the first information is transmitted. To be specific, the second wireless transceiver device may perform the detection on each symbol.

In a possible embodiment of the present disclosure, the first information is carried in different frequency sub-domains of a frequency domain of the $M^{th}$ symbol, or the first information is carried in each of the $M^{th}$ to $N^{th}$ symbols. The second wireless transceiver device needs to perform detection in different frequency sub-domains of the frequency domain of the $M^{th}$ symbol or on each of the $M^{th}$ to $N^{th}$ symbols, so as to obtain the first information.

In the embodiments of the present disclosure, in order to receive the first information reliably and timely, the first information is retransmitted. For example, same information is carried in different frequency sub-domains of the frequency domain of the $M^{th}$ symbol or carried in each of the $M^{th}$ to $N^{th}$ symbols.

In the embodiments of the present disclosure, the first wireless transceiver device or the second wireless transceiver device changes the data transmission process in the following ways.

In a first way, the first wireless transceiver device transmits the indication information to the second wireless transceiver device, and then each of the second wireless transceiver device and the first wireless transceiver device changes the data transmission process directly in accordance with the target data transmission process indicated through the indication information. The first wireless transceiver device is a terminal or a network side device. In other words, the terminal transmits the first information to the network side device, and the terminal is just the first wireless transceiver device; or the network side device transmits the first information to the terminal, and the network side device is just the first wireless transceiver device.

In a second way, the first wireless transceiver device transmits the indication information to the second wireless transceiver device, and changes the data transmission process in accordance with the target data transmission process indicated through the indication information with permission from the second wireless transceiver device. In this case, the first wireless transceiver device is a terminal and the second wireless transceiver device is a network side device.

In a third way, the first wireless transceiver device transmits the triggering factor to the second wireless transceiver device. The second wireless transceiver device determines the to-be-changed target data transmission process in accordance with the triggering factor, generates the indication information, and transmits the indication information to the first wireless transceiver device. The indication information includes information about the target data transmission process. Then, the first wireless transceiver device determines the target data transmission process in accordance with the indication information, and changes the data transmission process. In this case, the first wireless transceiver device is a terminal and the second wireless transceiver device is a network side device.

The change ways of the data transmission process will be described hereinafter in more details.

In the first way, in a possible embodiment of the present disclosure, in the case that the first information includes the indication information, prior to transmitting, by the first wireless transceiver device, the first information to the second wireless transceiver device through the physical layer, the method further includes: determining the to-be-changed target data transmission process in accordance with the triggering factor corresponding to the transmission service; and changing the data transmission process into the target data transmission process.

The first wireless transceiver device determines the target data transmission process matching the transmission service in accordance with the triggering factor, and then changes the data transmission process into the target data transmission process. The second wireless transceiver device detects the first information on a corresponding physical layer channel or signal, and decodes the first information to obtain the indication information. After detecting the indication information from the first wireless transceiver device successfully, the second wireless transceiver device rapidly changes the data transmission process into the target data transmission process in accordance with the indication information (including the information about the agreed target data transmission process and the information about the agreed effective time), and receives data through the changed target data transmission process.

In the embodiments of the present disclosure, the first wireless transceiver device is a terminal or a network side device, i.e., this way is suitable for a circumstance where the network side device directly changes the data transmission process into the target data transmission process and notifies the terminal to change the data transmission process into the target data transmission process, or a circumstance where the terminal directly changes the data transmission process into the target data transmission process and notifies the network side device to change the data transmission process into the target data transmission process.

In the second way, in a possible embodiment of the present disclosure, in the case that the first information includes the indication information, subsequent to transmitting the first information to the second wireless transceiver device through the physical layer, the method further includes: receiving change feedback information from the second wireless transceiver device, the change feedback information including first indication information indicating that the second wireless transceiver device agrees to change the data transmission process into the target data transmission process or second indication information indicating that the second wireless transceiver device rejects to change the data transmission process into the target data transmission process; in the case that the change feedback information includes the first indication information, changing the data transmission process into the target data transmission process; and in the case that the change feedback information includes the second indication information, performing data transmission through a default transmission process. The first wireless transceiver device is a terminal, and the second wireless transceiver device is a network side device.

In the embodiments of the present disclosure, the first wireless transceiver device determines the to-be-changed target data transmission process in accordance with the triggering factor corresponding to the transmission service, generates the indication information indicating the target data transmission process, and transmits the indication information to the second wireless transceiver device. Upon the receipt of the indication information, the second wireless transceiver device determines whether to agree to change the data transmission process, generates the change feedback information, and transmits the change feedback information to the first wireless transceiver device. The change feedback information includes the first indication information indicating that the second wireless transceiver device agrees to change the data transmission process into the target data transmission process or the second indication information indicating that the second wireless transceiver device rejects to change the data transmission process into the target data transmission process.

In the case that the first wireless transceiver device has received the first indication information, it means that the second wireless transceiver device agrees to change the data transmission process into the target data transmission process, and the first wireless transceiver device changes the data transmission process into the target data transmission process. In the case that the first wireless transceiver device has received the second indication information, it means that the second wireless transceiver device rejects to change the data transmission process into the target data transmission process, and the first wireless transceiver device performs the data transmission through a default transmission process.

This way is suitable for a circumstance where the first wireless transceiver device is a terminal and the second wireless transceiver device is a network side device, i.e., the data transmission process needs to be changed after the network side device agrees to change the data transmission process into the target data transmission process. In a possible embodiment of the present disclosure, the second wireless transceiver device transmits a change allowance identifier (e.g., 0 represents "agree" and 1 represents "reject") within a latest downlink subframe where the indication information is detected. When the second wireless transceiver device rejects to change the data transmission process into the target data transmission process, the first wireless transceiver device and the second wireless transceiver device perform the data transmission through the default transmission process. When the second wireless transceiver device agrees to change the data transmission process into the target data transmission process, each of the first wireless transceiver device and the second wireless transceiver device rapidly changes the data transmission process into the target data transmission process in accordance with the indication information. In terms of timeliness, as a better scheme, the first wireless transceiver device selects a subframe having uplink/downlink transmission symbols, or uplink and downlink subframes adjacent to each other.

In the third way, in a possible embodiment of the present disclosure, in the case that the first information includes the triggering factor, subsequent to transmitting the first information to the second wireless transceiver device through the physical layer, the method further includes: receiving indication information from the second wireless transceiver device, the indication information being generated and transmitted by the second wireless transceiver device after the second wireless transceiver device decodes the first information and obtains the triggering factor; determining the to-be-changed target data transmission process in accordance with the indication information; and changing the data transmission process into the target data transmission process. The first wireless transceiver device is a terminal, and the second wireless transceiver device is a network side device.

In the embodiments of the present disclosure, the first wireless transceiver device directly transmits the triggering factor corresponding to the transmission service to the second wireless transceiver device. Upon the receipt of the triggering factor, the second wireless transceiver device determines the to-be-changed target data transmission process in accordance with the triggering factor, generates the indication information, and transmits the indication information to the first wireless transceiver device. Then, the first wireless transceiver device determines the target data transmission process in accordance with the indication information, changes the data transmission process into the target data transmission process, and performs the data transmission through the target data transmission process.

This way is suitable for a circumstance where the first wireless transceiver device is a terminal and the second wireless transceiver device is a network side device, i.e., the terminal directly transmits the triggering factor corresponding to the sudden new service to the network side device through the physical layer. The network side device determines the agreed data transmission process as well as an agreed physical resource in accordance with the triggering factor. The network side device transmits the indication information to the terminal within a latest subframe where the triggering factor is decoded successfully and obtained. The terminal transmits uplink data in accordance with the target data transmission process and the physical resource agreed in the indication information.

In the above-mentioned ways of changing the data transmission process, the agreed data transmission process is selected by the first wireless transceiver device or the second wireless transceiver device in accordance with the triggering factor (e.g., the sudden new service characteristic or the new user demand), and the data transmission process is rapidly changed into the target data transmission process through transmitting the dedicated signal or channel at the physical layer for the data transmission.

To be specific, when the first transmission is transmitted by the first wireless transceiver device to the second wireless transceiver device, the indication information is indicated through one of the followings.

1) A coding sequence formed through coding with an agreed transmission process identifier. The coding sequence is a specific coding sequence. The coding sequence is formed through scrambling with an identification code of an agreed target data transmission process Y, and it is carried in the dedicated channel or dedicated signal.
2) A state information bitmap formed through coding with the agreed transmission process identifier. For example, the data transmission process is indicated through two bits, e.g., 00 represents the default transmission process, 01 represents a transmission process 1, 10 represents a transmission process 2, and 11 represents a transmission process 3. This mode may be used for the dedicated channel.

In a possible embodiment of the present disclosure, there may exist such a circumstance where the second wireless transmission device fails to obtain the first information. To be specific, the method further includes: receiving second information from the second wireless transceiver device; and transmitting the first information in accordance with the second information. The second information is used to indicate the first wireless transceiver device to retransmit the first information, or indicate the first wireless transceiver device and the second wireless transceiver device to perform the data transmission by default.

In the case that the second wireless transceiver device fails to detect the first information from the first wireless transceiver device and has received a sudden new service through the physical layer, the second wireless transceiver device transmits the second information to the first wireless transceiver device in accordance with the triggering factor, e.g., the sudden new service characteristic or the new user demand obtained through decoding, so as to indicate the first wireless transceiver device to transmit the first information. To be specific, the second information is used to indicate the first wireless transceiver device to retransmit the first information within a latest subframe upon the receipt of the second indication, until the second wireless transceiver device receives the first information successfully. Alternatively, the second information is used to indicate the first wireless transceiver device to perform the data transmission by default. In a possible embodiment of the present disclosure, the second wireless transceiver device transmits the second information (e.g., a specific identifier or signaling indicating that the first information is decoded unsuccessfully) to the first wireless transceiver device within a latest subframe. Upon the receipt of the second information, the first wireless transceiver device retransmits the first information within a latest subframe, or performs the data transmission by default.

It should be appreciated that, when the second wireless transceiver device fails to obtain the first information, it means that the second wireless transceiver device decodes the first information unsuccessfully or the first wireless transceiver device does not transmit the first information to the second wireless transceiver device. In the case that the first information is not transmitted by the first wireless transceiver device, the first wireless transceiver device indicates the second wireless transceiver device to perform the data transmission by default upon the receipt of the identifier or signaling.

In a possible embodiment of the present disclosure, a plurality of data transmission processes is set by the first wireless transceiver device and the second wireless transceiver device in accordance with a hardware condition. In order to ensure the consistency in the available data transmission processes, the first wireless transceiver device and the second wireless transceiver device may determine the available data transmission processes through negotiation. Prior to transmitting, by the first wireless transceiver device, the first information to the second wireless transceiver device through the physical layer, the method further includes determining available data transmission processes in accordance with terminal capability information, and the available data transmission processes include the target data transmission process. The available data transmission processes may be changed in accordance with the new service characteristic or the user's new demand.

To be specific, the available data transmission processes include at least one of the followings.

(i) A transmission process through which a core network function sinks. A part of functions of a core network are sunk so as to be achieved locally. In this way, it is able to prevent the occurrence of long-distance data transmission, and reduce the delay. The part of functions of the core network include a User Plane Function (UPF), an Access and Mobility Management Function (AMF), a Session Management Function (SMF), policy management, edge computing, local caching, a gateway function module, etc.

(ii) A transmission process without any protocol stack layer. This transmission process has no fixed protocol stack layer, but it has a desired data processing procedure from an application layer to radio frequency.

(iii) A transmission process directly occupied by a physical resource. There is no resource allocation and contention in the transmission process. When the data transmission is performed through this transmission process, the user service is directly transmitted through the physical resource, so as to reduce the delay caused by scheduling congestion.

(iv) A transmission process for adding a target function, e.g., a big-data analysis module, an endogenous intelligence module or a digital twin module. These modules are used to meet the user's customized demand, e.g., collecting user data characteristics, performing intelligent analysis, and transmitting an analysis result to the other module, or flexibly selecting the transmission process. A protocol stack matches such configurations as modulation and coding for air interface transmission, multiple access, frame structure and beam management.

(v) A transmission process for protocol stack architecture in a communication system, e.g., a complete transmission process for protocol stack architecture in a current communication system. The conventional user service is transmitted through the protocol stack configuration, and the transmission process corresponding to the protocol stack architecture is set as the default transmission process.

The available data transmission process is an entire data processing procedure for the terminal or network side device. Specific functions or relevant configurations of techniques/algorithms under each agreed transmission process may be set in accordance with each refined service characteristic. The to-be-changed target data transmission process is one of the above-mentioned available data transmission processes.

Implementation modes for determining the available data transmission processes in accordance with the terminal capability information will be described hereinafter in more details.

In a first mode, the determining the available data transmission processes in accordance with the terminal capability information includes: in the case that the first wireless transceiver device is a network side device and the second wireless transceiver device is a terminal, obtaining the terminal capability information about the terminal; and determining the available data transmission processes in accordance with the terminal capability information and data transmission processes supported by the network side device. Subsequent to determining the available data transmission processes in accordance with the terminal capability information, the method further includes transmitting information about the available data transmission processes to the second wireless transceiver device.

In the embodiments of the present disclosure, the first wireless transceiver device is the network side device, the second wireless transceiver device is the terminal, and the terminal capability information is reported by the terminal or detected by the network side device. In the case that the terminal capability information is reported by the terminal, the information about the transmission processes supported by the terminal is carried in the terminal capability information, e.g., a specific identifier of the supported transmission process or a new service identifier carried through the transmission process.

The network side device determines the available data transmission processes in accordance with the terminal capability information, and then determines the data transmission processes available for both the terminal and the network side device in accordance with the data transmission processes supported by the network side device itself. To be specific, in the case that the quantity of available data transmission processes for the terminal is smaller than that for the network side device, the network side device obtains the available data transmission processes in accordance with the terminal capability information, and transmits signaling information to the terminal so as to indicate that all the data transmission processes are available. In the case that the quantity of available data transmission processes for the terminal is greater than that for the network side device, the network side device obtains the available data transmission processes in accordance with the terminal capability information, and transmits signaling information to the terminal so as to indicate the data transmission processes available for the network side device. In this way, the first wireless transceiver device and the second wireless transceiver device determine the available data transmission processes through negotiation, so as to ensure the consistency in the data transmission processes.

In a second mode, the determining the available data transmission processes in accordance with the terminal capability information includes: in the case that the first wireless transceiver is a terminal and the second wireless transceiver device is a network side device, transmitting the terminal capability information to the second wireless transceiver device; and receiving information about the available data transmission processes from the second wireless transceiver device.

In the embodiments of the present disclosure, in the case that the first wireless transceiver device in the terminal, the terminal reports the terminal capability information to the network side device, so that the network side device determines the data transmission processes available for both the first wireless transceiver device and the second wireless transceiver device in accordance with the terminal capability information and transmits the information about the available data transmission processes to the terminal. To be specific, in the case that the quantity of available data transmission processes for the terminal is smaller than that for the network side device, the second wireless transceiver device (i.e., the network side device) obtains the data transmission processes supported by the terminal in accordance with the terminal capability information, and transmits signaling information to the terminal so as to indicate that all the data transmission processes are available. In the case that the quantity of available data transmission processes for the terminal is greater than that for the network side device, the network side device transmits signaling information to the terminal so as to indicate the data transmission processes supported by the network side device. In this way, the first wireless transceiver device and the second wireless transceiver device determine the available data transmission processes through negotiation, so as to ensure the consistency in the data transmission processes.

In the case that the terminal reports the terminal capability information to the network side device, FIG. 2 shows a method for determining, by the first wireless transceiver device and the second wireless transceiver device, the available data transmission processes. Here, the first wireless transceiver device is the network side device or the terminal. The method includes the following steps.

Step 0: the terminal reports the terminal capability information to the network side device. The terminal capability information includes the data transmission processes supported by the terminal, e.g., a specific identifier of the agreed data transmission process, or a new service identifier carried through the data transmission process.

Step 1: the network side device determines the available data transmission processes for the terminal in accordance with the terminal capability information, and then determines the agreed data transmission processes available for both the terminal and the network side device in accordance with the available data transmission processes for the network side device itself. In the case that the network side device fails to receive the terminal capability information reported by the user, it obtains, through detection, the terminal capability information including the data transmission processes supported by the terminal.

Step 2: after determining the data transmission processes available for both the network side device and the terminal, the network side device transmits the agreed data transmission processes available for the network side device to the terminal.

In the case that the quantity of data transmission processes available for the terminal is smaller than that for the network side device, the network side device transmits signaling information to the terminal so as to indicate the terminal that all the data transmission processes are available. In the case that the quantity of data transmission processes available for the terminal is greater than that for the network side device, the network side device transmits the information about the data transmission processes available for the network side device to the terminal.

Step 3: during the change of the data transmission process, in order to ensure consistency in the data transmission process used by the network side device and the terminal, the network side device or the terminal transmits indication information triggering the change of the data transmission process to the opposite entity, and the indication information includes information about the target data transmission process selected by the first wireless transceiver device and the information about the effective time of the target data transmission process.

Step 4: the uplink/downlink data transmission is completed through the consistent data transmission process for the network side device and the terminal.

In the embodiments of the present disclosure, the first wireless transceiver device and the second wireless transceiver device determines the available data transmission processes through negotiation, so as to ensure the consistency in the available data transmission processes.

In a possible embodiment of the present disclosure, after the first wireless transceiver device and the second wireless transceiver device have determined the to-be-changed target data transmission process, it is necessary to determine a transmission resource for transmitting the data through the target data transmission process. The method further includes determining a transmission resource corresponding to target service data, and the target service data is to be transmitted through the to-be-changed target data transmission process.

The transmission resource is determined through one of the followings.

(A) Selecting a transmission resource that meets a first condition. The selecting the transmission resource that meets the first condition includes selecting a physical resource that meets a condition on data transmission through the target data transmission process, and/or a physical resource with an optimum channel state.

In the embodiments of the present disclosure, the target data transmission process is a transmission process directly occupied by the physical resource, i.e., the physical resource is directly occupied in accordance with the target data transmission process, and there is no resource allocation and contention in the target data transmission process. In the case that the data transmission is performed through the target data transmission process, the user service is directly transmitted through the physical resource, so as to reduce the delay caused by a scheduling congestion. The first wireless transceiver device directly uses a best physical resource and/or a physical resource with an optimum channel state, and the channel state is determined in accordance with channel quality or reference signal quality.

(B) In the case that the first wireless transceiver device is a network side device and the second wireless transceiver device is a terminal, determining, by the first wireless transceiver device, the transmission resource in accordance with a data transmission volume through the target data transmission process.

In the case that the first wireless transceiver device is the network side device and the second wireless transceiver device is the terminal, the network side device performs the downlink data transmission. At this time, the effective time of the target data transmission process is greater than or equal to zero (i.e., $T1 \geq 0$). The network side device records the data transmission volume through different data transmission processes, allocates the physical resources for the user data through different data transmission processes in accordance with the data transmission volume and a channel environment, and performs the downlink data transmission through the agreed target data transmission process.

Figure 3:
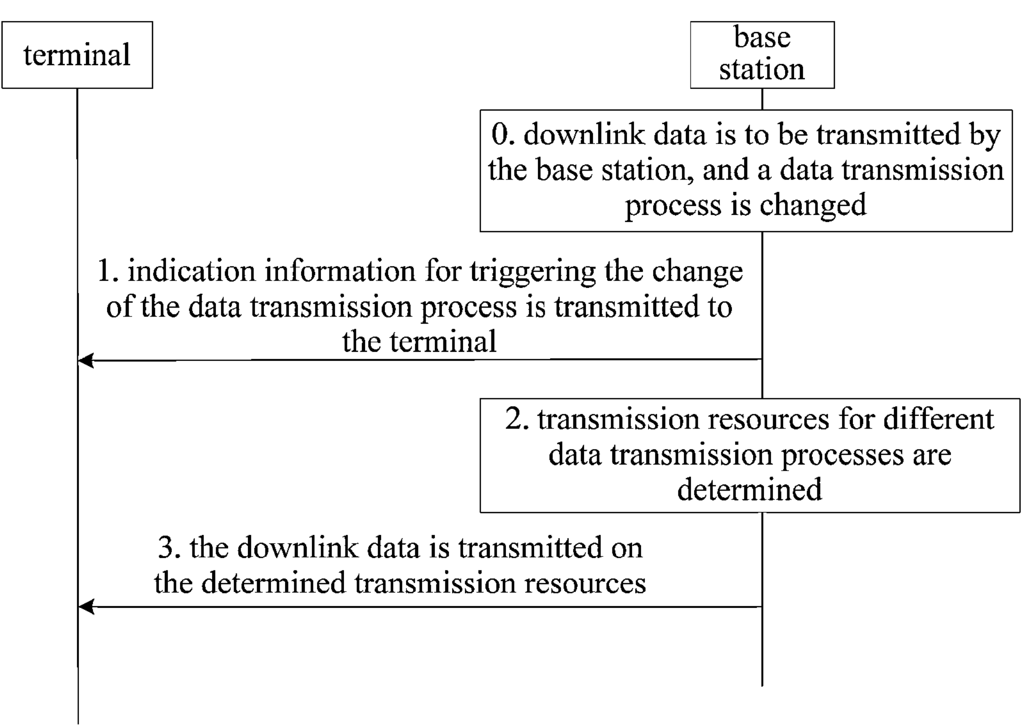
FIG. 3 is a flow chart of a process for determining a transmission resource according to one embodiment of the present disclosure.

In the case that the network side device is a base station which transmits downlink data to the terminal ($T1 \geq 0$), FIG. 3 shows a procedure of determining, by the first wireless transceiver device, the transmission resource in accordance with the data transmission volume.

Step 0: at first, the base station and the terminal have determined the available transmission processes through negotiation. In the case that the service data arrives at the base station, i.e., downlink data is to be transmitted by the base station, the available data transmission process is selected in accordance with the indication information, so as to change the data transmission process.

Step 1: the base station transmits the indication information for triggering the change of the data transmission process to the terminal. The indication information includes the information about the identifier of the selected target data transmission process and the information about the effective time of the target data transmission process, so that the terminal selects a same target data transmission process in accordance with the indication information. When the terminal detects the indication information successfully, it changes the data transmission process into the target data transmission process, and enables an interface technique corresponding to the target data transmission process.

Step 2: the base station records the data transmission volume through different data transmission processes, and allocates the physical resources for the user data through different data transmission processes in accordance with the data transmission volume and the channel environment, so as to determine the transmission resources for different data transmission processes.

Step 3: performing downlink data transmission through the determined transmission resource.

It should be appreciated that, an order of Step 1 and Step 2 will not be particularly defined herein, and Step 1 and Step 2 may be performed concurrently.

(C) In the case that the first wireless transceiver device is a terminal, the second wireless transceiver device is a network side device and the effective time of the target data transmission process is equal to zero, determining, by the terminal, the transmission resource through agreement, or reserving, by the network side device, the transmission resource.

In the case that the first wireless transceiver device is the terminal and the second wireless transceiver device is the network side device, the terminal performs uplink data transmission. In the case that the effective time of the target data transmission process is equal to zero (i.e., T1=0), it means that the data transmission process is to be changed immediately. In this case, the transmission resource is agreed by the terminal with the network side device (e.g., the terminal transmits indication information to the network side device so as to indicate that the user data is to be transmitted through an agreed physical resource), or a resource pool is reserved by the network side device.

To be specific, the determining, by the terminal, the transmission resource through the agreement includes one of: implicitly indicating the transmission resource through a position of a subframe or symbol where the indication information is located; indicating the transmission resource through information about an agreed physical resource carried in the indication information; or implicitly indicating the transmission resource through information about the target data transmission process carried in the indication information.

After the network side device has detected and obtained the indication information at the physical layer, the data transmission process is changed to the target data transmission process immediately (T1=0), a corresponding interface technique is used, and an interference elimination/inhibition algorithm is enabled, so as to prevent the occurrence of any resource collision due to the contention of uplink resources, and transmit the uplink data through the agreed physical resource.

In the case that the transmission resource is reserved by the networks ide device, the network side device reserves a dedicated resource pool for the sudden new service. After the network side device has detected and obtained the indication information at the physical layer, the data transmission process is changed to the agreed target data transmission process immediately, a corresponding interface technique is adopted, and the uplink data is transmitted through physical resources in the reserved resource pool.

Figure 4:
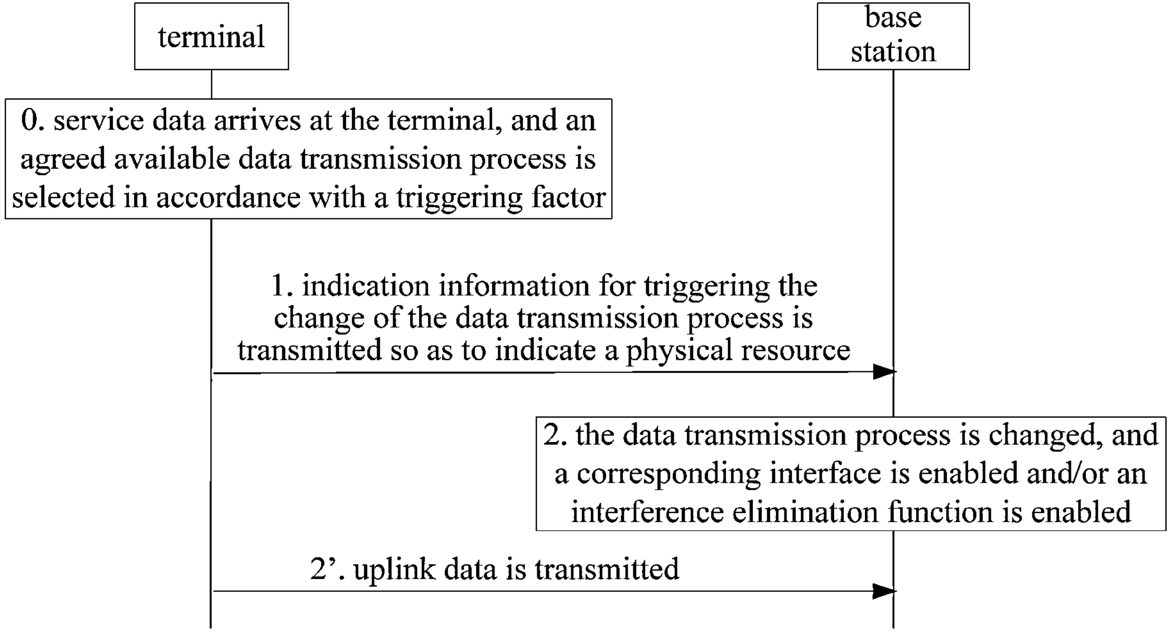
FIG. 4 is another flow chart of the process for determining the transmission resource according to one embodiment of the present disclosure.

In the case that the network side device is a base station and the transmission resource is agreed by the terminal with the network side device (i.e., the terminal transmits uplink data to the network side device (T1=0)), the terminal transmits the uplink data through the agreed data transmission process immediately upon the receipt of the service data. The data transmission is performed in a grant-free manner. FIG. 4 shows a specific procedure of determining, by the terminal, the physical resource through agreement.

Step 0: at first, the base station and the terminal have determined the available transmission processes through negotiation. In the case that uplink data is to be transmitted by the terminal, i.e., the service data arrives at the terminal, the available data transmission process is selected in accordance with the triggering factor.

Step 1: the terminal transmits the indication information for triggering the base station to change the data transmission process through the physical layer, so as to indicate the agreed physical resource for transmitting the user service. The determining the physical resource for the uplink transmission includes, but not limited to, the followings.

a) Implicitly indicating the physical resource through a position of a subframe or symbol where the indication information is located. In other words, when the base station has detected and obtained the indication information, the position of the subframe or symbol where the indication information is located directly corresponds to the agreed physical resource, and this correspondence is configured by the network side device.

b) Indicating the physical resource through information about the agreed physical resource carried in the indication information. Apart from the information about the agreed target data transmission process and/or the information about the effective time of the target data transmission process, the agreed physical resource for the service transmission is further carried in the indication information, so as to indicate the second wireless transceiver device to transmit the data through the agreed physical resource.

c) Implicitly indicating the physical resource through information about the target data transmission process carried in the indication information. In other words, the agreed target data transmission process directly matches the physical resource for the uplink transmission, so as to indicate the base station to transmit the uplink data through the agreed physical resource. This correspondence is configured by the network side device.

Step 2-2': after the base station has detected the indication information for triggering the changed of the data transmission process at the physical layer (i.e., before a high-layer protocol stack) and obtained the agreed physical resource, it immediately performs the steps of: immediately changing the data transmission process as agreed, and enabling the agreed data transmission process and a corresponding L1/L2 interface technique; and/or enabling the interference elimination/inhibition algorithm to prevent the occurrence of any resource collision due to the contention of uplink resources, and transmitting the uplink data through the agreed physical resource in the data transmission process agreed by the terminal with the base station.

In the case that the network side device is a base station and the transmission resource is reserved by the base station, the terminal transmits uplink data to the network side device (T1=0).

In the case that the resource pool is reserved by the base station, at first the base station reserve the physical resources for the sudden new service or a service having a new demand, so as to rapidly transmit the service directly through the reserved resource. In addition, in the case that the second wireless transceiver device has detected and obtained the indication information, it immediately changes the data transmission process into the agreed data transmission process in the indication information, and enables the L1/L2 interface technique corresponding to the agreed data transmission process, so as to transmit the uplink data through the reserved physical resource.

(D) In the case that the first wireless transceiver device is a terminal, the second wireless transceiver device is a network side device and the effective time of the target data transmission process fails to be configured, determining, by the terminal, the transmission resource through agreement, or reserving, by the network side device, the transmission resource. When the effective time of the target data transmission process fails to be configured, it means that the indication information does not include the information about the effective time of the target data transmission process. In this case, the implementation of determining, by the terminal, the transmission resource through agreement or reserving, by the network side device, the transmission resource is similar to that in (C), and thus will not be particularly defined herein.

(E) In the case that the first wireless transceiver device is a terminal, the second wireless transceiver device is a network side device and the effective time of the target data transmission process is greater than zero, determining, by the second wireless transceiver device, the transmission resource in accordance with the data transmission volume through the target data transmission process.

To be specific, in the case that the first wireless transceiver device is a terminal and the effective time of the target data transmission process is greater than zero, the determining the transmission resource corresponding to the target service data includes: transmitting uplink data request information to the second wireless transceiver device, the uplink data request information including a data transmission volume of the target data transmission process; and receiving feedback information from the second wireless transmission device, the feedback information including information about the transmission resource.

In the case that the first wireless transceiver device is the terminal and the second wireless transceiver device is the network side device, the terminal performs the uplink data transmission. In the case that the effective time of the target data transmission process is greater than zero (i.e., T1>0), it means that the network side device changes the data transmission process into the target data transmission process within a time window T1 upon the receipt of the information for triggering the change of the data transmission process. The terminal reports the data transmission volume to the network side device, and the network side device selects the transmission resource in accordance with the data transmission volume.

For example, the terminal transmits an uplink data request (including the data transmission volume) to the network side device. After obtaining and parsing the information for triggering the change of the data transmission process at the physical layer (i.e., before the high-layer protocol stack), within the time window T1, the network side device changes the data transmission process into the agreed data transmission process, enables the interface technique corresponding to the agreed data transmission process, selects the corresponding physical resource, and transmits scheduling grant to the terminal.

Figure 5:
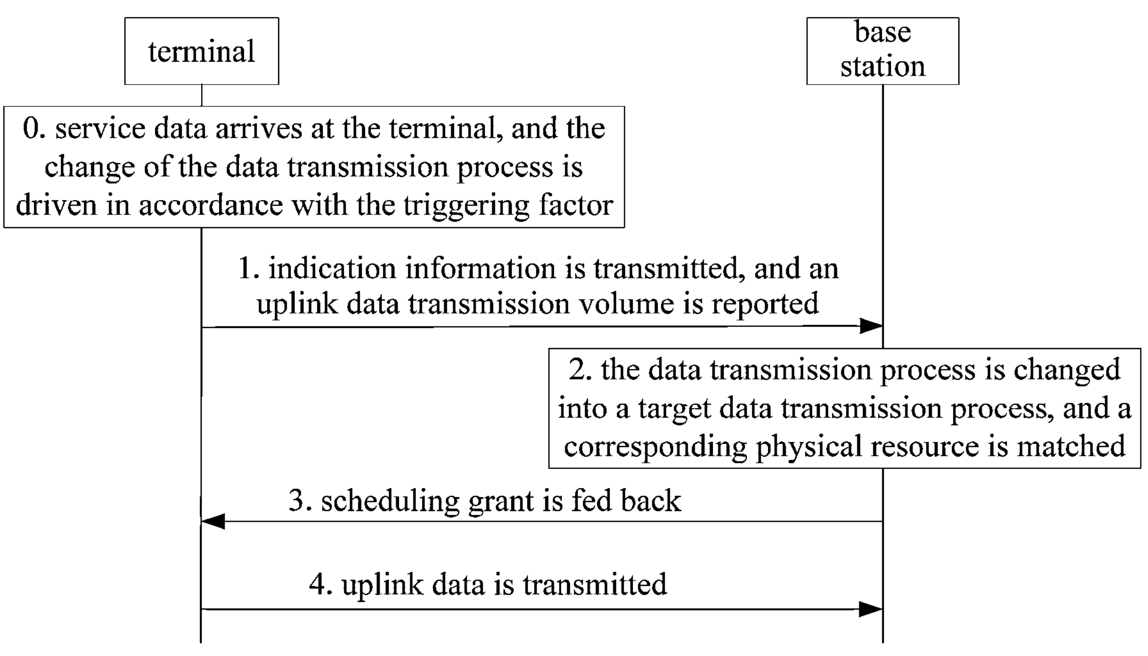
FIG. 5 is yet another flow chart of the process for determining the transmission resource according to one embodiment of the present disclosure.

In the case that the network side device is the base station and the transmission resource is determined by the base station in accordance with the data transmission volume, the terminal transmits uplink data to the network side device (and T1>0), i.e., the agreed data transmission process takes effect at T+T1 (an agreed time) after the base station has received the service data, as shown in FIG. 5.

Step 0: the service data arrives at the terminal, and the first wireless transceiver device is driven to change the data transmission process into the agreed data transmission process in accordance with the triggering factor. In order to ensure the consistency in the transmission process between the terminal and the network side device, the information or signaling for triggering the change of the data transmission process is notified by the terminal to the base station through a dedicated signal or channel through the physical layer.

Step 1: the terminal transmits the indication information for triggering the base station to change the data transmission process through the physical layer, and reports the uplink data transmission volume.

Step 2: after the base station has successfully detected the indication information for triggering the change of the data transmission process at the physical layer (i.e., before the high-layer protocol stack), the base station performs the following operations within the time window T1: changing the data transmission process into the agreed target data transmission process, and enabling the interface technique corresponding to the target data transmission process; and allocating the physical resources for the user data through different data transmission processes in accordance with the data transmission volume and the channel environment.

Step 3-4: the base station transmits the scheduling grant to the terminal, and indicates the available physical resources for the transmission of the uplink data. Then the terminal carries out the transmission of the uplink data.

Figure 6:
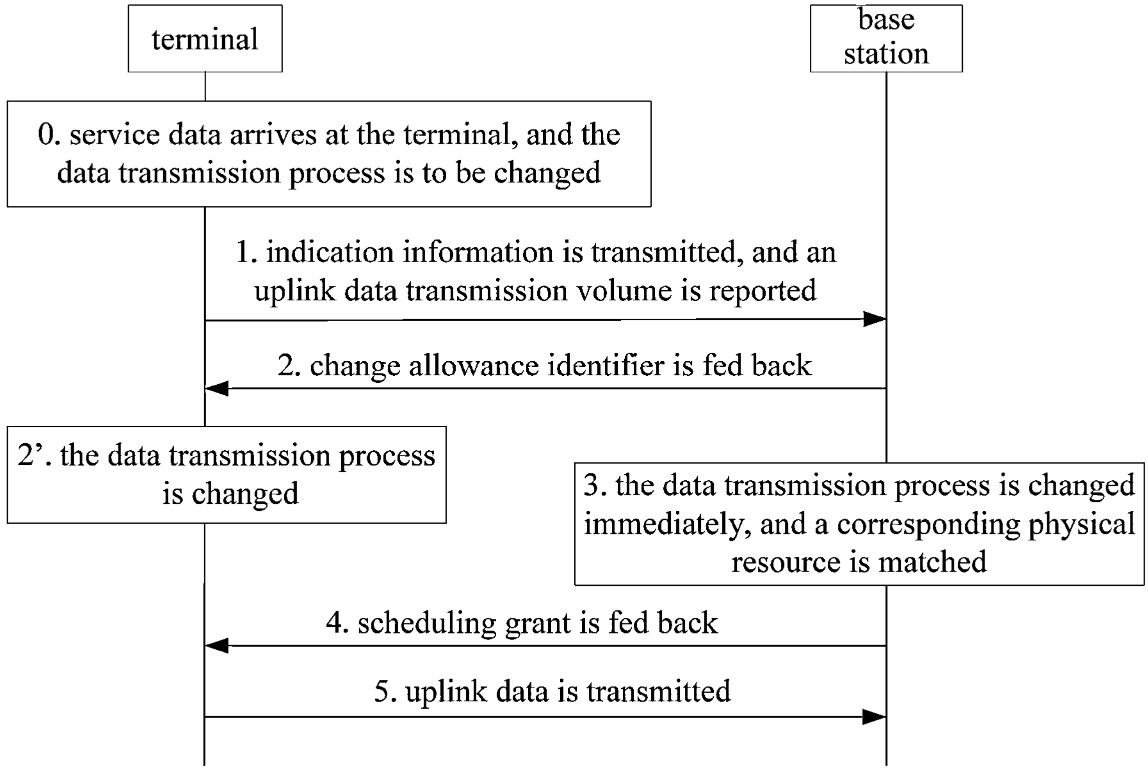
FIG. 6 is still yet another flow chart of the process for determining the transmission resource according to one embodiment of the present disclosure.

In the case that the network side device is the base station, the transmission resource is determined by the base station in accordance with the data transmission volume, and the terminal transmits the indication information for triggering the change of the data transmission process to the base station and changes the data transmission process with permission from the base station, FIG. 6 shows a method for changing the data transmission process, which includes the following steps.

Step 0: the service data arrives at the terminal, and the first wireless transceiver device is driven to change the data transmission process into the agreed data transmission process in accordance with the triggering factor. In order to ensure the consistency in the transmission process between the terminal and the network side device, the information or signaling for triggering the change of the data transmission process is notified by the terminal to the base station through a dedicated signal or channel through the physical layer.

Step 1: the terminal transmits the indication information for triggering the base station to change the data transmission process through the physical layer, and reports the uplink data transmission volume.

Steps 2-2': after the base state has successfully detected the indication information indicating the change of the data transmission process at the physical layer (i.e., before the high-layer protocol stack), the base station transmits a change allowance identifier to the terminal. When the base station rejects to change the data transmission process, the terminal transmits the data through a default protocol stack. When the base station agrees to change the data transmission process, the scheduling grant is fed back to the terminal, the data transmission process is changed by the terminal into the target data transmission process, the interface technique corresponding to the target data transmission process is enabled, and Step 3 is performed.

Step 3: within the time window T1, the base station performs the steps of: immediately changing the data transmission process into the agreed data transmission process, and enabling the interface technique corresponding to the agreed data transmission process; and allocating the physical resources for the user data through different data transmission processes in accordance with the data transmission volume and the channel environment.

Step 4: the base station transmits scheduling grant to the terminal, and indicates the available physical resource.

Step 5: the terminal transmits the uplink data.

The implementation of determining the transmission resource corresponding to the target service data has been described hereinabove in conjunction with the embodiments.

With respect to the agreed data transmission processes for different services at a same transmission time point, the network side device has a unified resource management function. For the data transmission process in the agreed data transmission processes directly occupying the physical resource, sufficient physical resources with an optimum channel state are directly occupied. For the agreed data transmission process in the other mode, the above-mentioned physical resource allocation modes may be adopted in accordance with the effective time T1 of the agreed data transmission process and specific conditions about the uplink/downlink transmission, so as to allocate the transmission resources for the first wireless transceiver device and the second wireless transceiver device.

Figure 7:
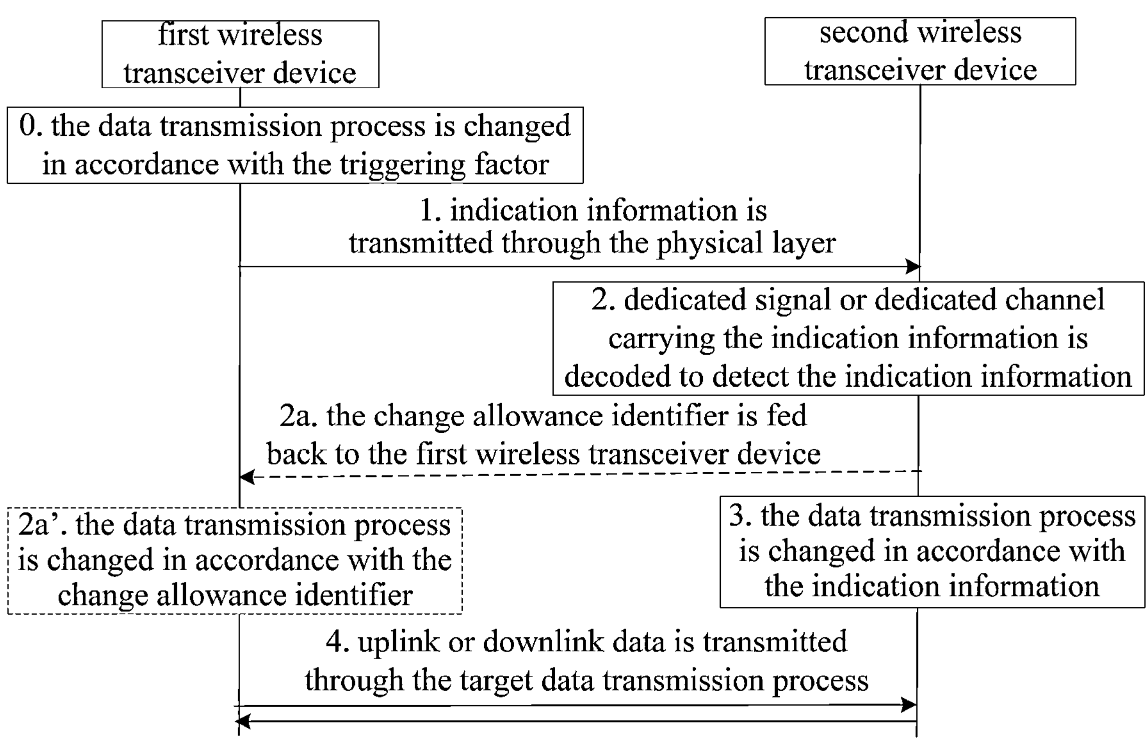
FIG. 7 is another flow chart of the method for changing the data transmission process according to one embodiment of the present disclosure.

The method of changing, by the first wireless transceiver device, the data transmission process will be described hereinafter in more details. In the case that the first information includes the indication information, as shown in FIG. 7, the method includes the following steps.

Step 0: at first the default data transmission process and the available data transmission processes are determined. The available data transmission processes include, but not limited to, the followings.

a) A transmission process through which a core network function sinks. For example, for a mobile edge application service (e.g., video integration or Virtual Reality (VR) rendering), data computing is locally completed directly through the agreed data transmission process, so as to reduce the data volume between the interfaces as well as the data transmission delay.

b) An agreed transmission process without any protocol stack layer, e.g., a data transmission process which has service-based access network architecture, where a user plane is completely separated from a control plane and which supports the fusion with a research and development platform. This transmission process is remarkably adapted to a private network service or a special network in the vertical industry (e.g., intelligent factory or cloud-native), and it is used to improve the entire network performance.

c) An agreed protocol stack-specific process, i.e., an agreed data transmission process directly occupied by the physical resource. The agreed transmission process matches such configurations as modulation and coding for air interface transmission, multiple access, frame structure and beam management. For example, for the time-sensitive or emergency service whose delay is required to be at a millisecond level or lower (e.g., holographic communication, digital twin and manned platform in future system services), it may directly occupy the physical resource without any scheduling or resource allocation, i.e., it is directly transmitted through the resource best matching the agreed data transmission process.

d) A transmission process with an additional specific functional module, e.g., a big-data analysis module, an endogenous intelligence module or a digital twin module. For example, for a digital twin service or a user-specific big-data analysis service, the data analysis and characteristic prediction need to be performed during the data transmission. In this architecture mode, the user demand is met through the data analysis at various layers.

e) A complete transmission process for protocol stack architecture in a current communication system. A conventional user service is transmitted through the protocol stack configuration, and the transmission process corresponding to the protocol stack architecture is set as the default transmission process.

It should be appreciated that, the available data transmission processes include, but not limited to, the above data transmission processes, and new data transmission processes may be added or the existing data transmission processes may be updated to meet the requirement on the subsequent development or software customization.

After the first wireless transceiver device and the second wireless transceiver device have determined the available data transmission processes for both of them in accordance with the terminal capability information, the first wireless transceiver device (the terminal or the network side device) changes the data transmission process in accordance with the triggering factor (e.g., the sudden new service characteristic or the new user demand). The triggering factor includes, but not limited to, one or more of the followings.

a) User service feature parameter. For example, in the case that the delay in QoS is required to be at a sub-millisecond level, the agreed transmission process directly occupied by the physical resource is selected. In the case that the service is a service for an intelligent factory or a private network, the data transmission process is rapidly changed into the agreed data transmission process without any protocol stack (e.g., a data transmission process corresponding to service-based protocol stack architecture).

b) Slice auxiliary identification information. For example, when a slice auxiliary identifier represents a service type of a mobile edge application, the agreed data transmission process through which the core network function sinks is selected. When the slice auxiliary identifier indicates that the service is a time-sensitive or emergency service, the data transmission process is rapidly changed into the data transmission process directly occupied by the physical resource. When the slice auxiliary identifier indicates that the service is a big-data analysis service, the data transmission process is rapidly changed into a data transmission process with an additional specific function (e.g., a protocol stack including big-data analysis and artificial intelligence).

c) Information about user's customized demand. For example, in the case of quantified transmission demand with an ultra-low delay, the data transmission process is rapidly changed into the agreed data transmission process directly occupied by the physical layer, so as to reduce the transmission delay to the greatest extent. When the customized demand is a transmission service for the intelligent factor or private network, the data transmission process is rapidly changed into the agreed data transmission process without any protocol stack (e.g., in a service-based mode).

It should be appreciated that, the sudden new service or the new user demand service is not limited to a new service different from a relevant service characteristic or a service having a new user demand, and it may further include a new (Usually higher) transmission demand derived from the relevant service in different transmission scenarios (in a sudden or specific scenario). The triggering factor includes parameter information configured by a core network for the user service.

Step 1: the first wireless transceiver device transmits the indication information to the second wireless transceiver device through the physical layer so that the second wireless transceiver device receives the indication information through the physical layer. For example, a) the base station notifies the user and changes the data transmission process directly in accordance with the agreement, and at this time, the first wireless transceiver device is the base station and the second wireless transceiver device is the terminal. b) The terminal notifies the base station and changes the data transmission process directly in accordance with the agreement, and at this time, the first wireless transceiver device is the terminal and the second wireless transceiver device is the base station. c) The terminal notifies the base station, and then changes the data transmission process with permission from the base station.

The indication information includes the information about the to-be-changed target data transmission process, and the information about the effective time of the target data transmission process. The indication information is transmitted through a dedicated signal or a dedicated channel carried on a subframe or symbol at the physical layer.

The information about the effective time may also be obtained by default (i.e., the effective time T is agreed in the system) or obtained through indication information from the non-physical layer. When there is no information about the effective time, the first wireless transceiver device transmits the data through dedicated resources agreed for the process while transmitting the indication information.

The information about the target data transmission process in the indication information transmitted by the first wireless transceiver device through the physical layer is coded through, but not limited to: i) a specific coding sequence, i.e., coding sequence formed through coding with an agreed transmission process identifier; and ii) a state information bitmap, i.e., a state information bitmap formed through coding with the agreed transmission process identifier. The agreed time in the indication information is transmitted through a dedicated signal or a dedicated channel in a compression-coding manner.

Specifically, in order to receive the indication information reliably and timely, the indication information is retransmitted. For example, same indication information is carried in different frequency sub-domains of the frequency domain of the $M^{th}$ symbol or carried in each of the $M^{th}$ to $N^{th}$ symbols, so as to enable the second wireless transceiver device to successfully decode the dedicated signal or dedicated channel to detect the indication information without any additional transmission delay.

Step 2: The second wireless transceiver device decodes the dedicated signal or dedicated channel carrying the indication information within a corresponding subframe so as to detect the indication information. The dedicated signal is the target signal, and the dedicated channel is the target channel.

Steps 2*a* and 2*a*': these steps are adapted to a scenario where the terminal notifies the network side device and then changes the data transmission process with permission from the network side device. The first wireless transceiver device needs to obtain the change allowance identifier from the second wireless transceiver device and then change the data transmission process. After the second wireless transceiver device successfully decodes the dedicated signal or dedicated channel, it transmits the change allowance identifier to the first wireless transceiver device, and the first wireless transceiver device changes the data transmission process in accordance with the change allowance identifier. When the second wireless transceiver device rejects to change the data transmission process, both the first wireless transceiver device and the second wireless transceiver device perform the data transmission through the default transmission process. When the second wireless transceiver device agrees to change the data transmission process, each of the second wireless transceiver device and the first wireless transceiver device rapidly changes the data transmission process in accordance with the indication information.

Step 3: in the scenario where the network side device notifies the terminal to change the data transmission process and the scenario where the terminal notifies the network side device to change the data transmission process, Steps 2*a* and 2*a*' are omitted, and the second wireless transceiver device rapidly changes the data transmission process at the agreed time in accordance with the indication information.

Step 4: in the case that there is a sudden new service or a service having a new user demand during the transmission of a conventional service, the first wireless transceiver device and the second wireless transceiver device rapidly change the data transmission process as mentioned hereinabove, so as to transmit the uplink data or downlink data through the matched target data transmission process.

Figure 8:
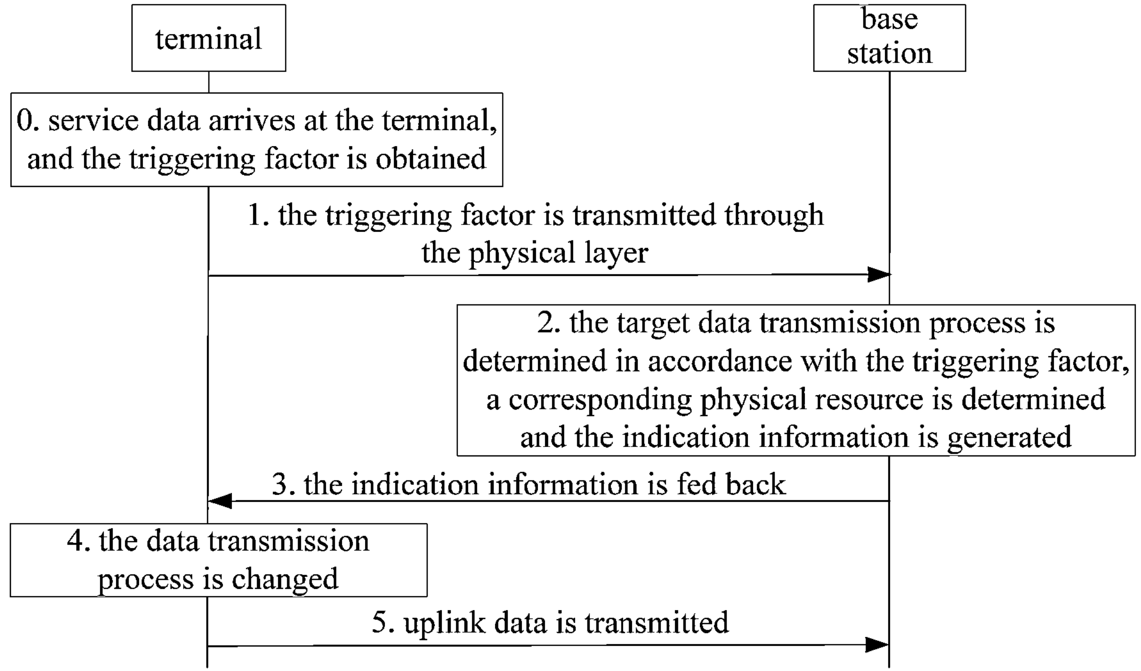
FIG. 8 is yet another flow chart of the method for changing the data transmission process according to one embodiment of the present disclosure.

The method for changing, by the first wireless transceiver device, the data transmission process will be described hereinafter in more details. In the case that the first information includes the triggering factor, the first wireless transceiver device is a terminal, and the second wireless transceiver device is a network side device, e.g., a base station. As shown in FIG. 8, the method includes the following steps.

Step 0: the service data arrives at the terminal, and the triggering factor related to the sudden new service or the new user demand is obtained.

Step 1: the terminal transmits the triggering factor to the base station directly through the physical layer.

The triggering factor includes, but not limited to, one or more of a) a user service feature parameter, b) slice auxiliary identification information, or c) information about user's customized demand.

It should be appreciated that, the sudden new service or the new user demand service is not limited to a new service different from a relevant service characteristic or a service having a new user demand, and it may further include a new (usually higher) transmission demand derived from the relevant service in different transmission scenarios (in a sudden or specific scenario). The triggering factor includes parameter information configured by a core network for the user service.

Step 2: the base station determines the to-be-changed target data transmission process and the physical resource corresponding to the service data transmitted through the target data transmission process in accordance with the triggering factor, and generates the indication information.

Step 3: the base station transmits the indication information to the terminal within a latest subframe where the triggering factor is successfully decoded and obtained.

Step 4: the terminal changes the data transmission process in accordance with the target data transmission process in the indication information and the physical resource.

Step 5: the terminal transmits the uplink data on the physical resource through the changed data transmission process.

According to the embodiments of the present disclosure, the first wireless transceiver device transmits the first information for triggering the change of the data transmission process to the second wireless transceiver device through the physical layer. The first information is associated with the triggering factor corresponding to the transmission service, and it includes the triggering factor or the indication information. The indication information is used to indicate the to-be-changed target data transmission process, and the to-be-changed target data transmission process is determined in accordance with the triggering factor, so as to rapidly change the data transmission process agreed by the second wireless transceiver device for the data transmission. For a future communication system, when there is a sudden new service (e.g., an urgent/time-sensitive service) or a service having a new user demand in the conventional service, the service is changed to be transmitted on a matched data transmission process through a rapid triggering and changing operation on the physical layer, so as to improve the service transmission performance and the user experience.

Figure 9:
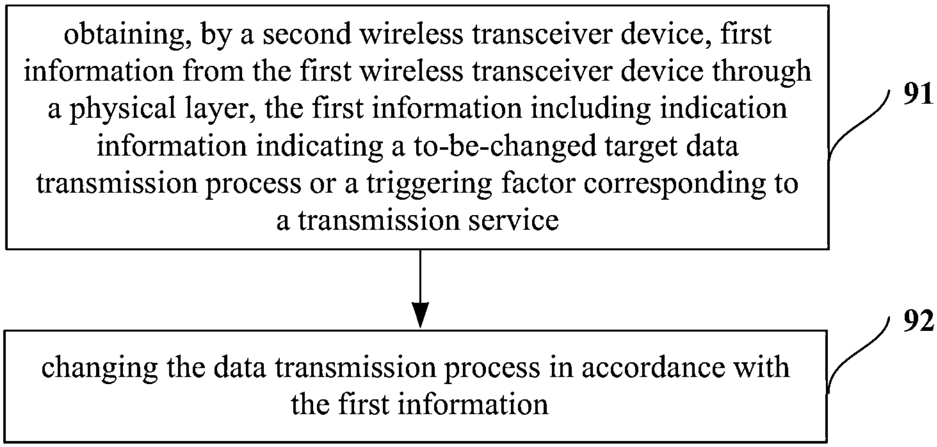
FIG. 9 is still yet another flow chart of the method for changing the data transmission process according to one embodiment of the present disclosure.

As shown in FIG. 9, the present disclosure provides in some embodiments a method for changing a data transmission process for a second wireless transceiver device, which includes: Step 91 of obtaining, by the second wireless transceiver device, first information from the first wireless transceiver device through a physical layer, the first information including indication information indicating a to-be-changed target data transmission process or a triggering factor corresponding to a transmission service; and Step 92 of changing the data transmission process in accordance with the first information.

In the embodiments of the present disclosure, the first wireless transceiver device transmits the first information for triggering the change of the data transmission process to the second wireless transceiver device through the physical layer. The second wireless transceiver device detects the first information at a corresponding position at the physical layer, and rapidly changes the data transmission process into the target data transmission process as agreed in accordance with the first information.

The first information is associated with the transmission service, and it includes the triggering factor or the indication information. The transmission device includes an intelligent, cross-domain, new service which is sudden or time-sensitive or which has a very high priority level. The first information includes the indication information or the triggering factor, and the triggering factor is used to reflect characteristics of the sudden new service or information about the new user demand. The indication information is information corresponding to the data transmission process matched in accordance with the triggering factor, and it is used to indicate the to-be-changed target data transmission process.

The second wireless transceiver device determines the to-be-changed target data transmission process in accordance with the indication information or the triggering factor from the first wireless transceiver device, and transmits the information about the determined target data transmission process to the first wireless transceiver device, so that the first wireless transceiver device changes the data transmission process into the target data transmission process and transmits data through the target data transmission process.

In the embodiments of the present disclosure, the second wireless transceiver device obtains the first information from the first wireless transceiver device through the physical layer. The first information is associated with the triggering factor corresponding to the transmission service, and it includes the triggering factor or the indication information. The indication information is used to indicate the to-be-changed target data transmission process. The second wireless transceiver device determines the to-be-changed target data transmission process in accordance with the indication information or the triggering factor from the first wireless transceiver device, so as to rapidly change the data transmission process for the data transmission. For a future communication system, when there is a sudden new service (e.g., an urgent/time-sensitive service) or a service having a new user demand in the conventional service, the service is changed to be transmitted on a matched data transmission process through a rapid triggering and changing operation on the physical layer, so as to improve the service transmission performance and the user experience.

To be specific, the indication information includes one of: information about the to-be-changed target data transmission process; or the information about the to-be-changed target data transmission process and information about an effective time of the to-be-changed target data transmission process. The information about the effective time is used to indicate that the target data transmission process is effective in an agreed time period.

A time window where a process is effective after the target data transmission process takes effect includes one of: a target time window; a time period from a time point when the target data transmission process takes effect to a time point when indication information other than the first information has been received; or a time period from a time point when the target data transmission process takes effect to a time point when a protocol stack de-configuration instruction has been received.

It should be appreciated that, the time window where the process is effective after the target data transmission process takes effect refers to a time range where the process is effective after the target data transmission process has been changed and starts to be effective. The time window where the process is effective after the target data transmission process takes effect includes, but not limited to, the above three modes, and it may also be set according to a service transmission demand.

To be specific, the triggering factor includes at least one of the followings.

a). User service feature parameter, e.g., a new type of a user service, an ultra-low latency and high-reliability characteristic, or information about a certain relevant parameter higher than a relevant service characteristic. The matched data transmission process, i.e., the agreed target data transmission process, is selected in accordance with the feature parameter of the service.

b). Slice auxiliary identification information, e.g., network slice auxiliary identification information determined by the network side device in accordance with a service transmission characteristic. Different slice identities correspond to different service transmission characteristics and different data transmission processes. The agreed data transmission process is selected in accordance with the slice identifier so as to meet a slice type.

c). Information about user's customized demand, e.g., the demand of the user on such functions as big-data analysis and artificial intelligence. The agreed data transmission process is selected in accordance with a specific demand of the user.

The triggering factor includes one or more of the above-mentioned parameter information. Each of the first wireless transceiver device and the second wireless transceiver device determines the to-be-changed data transmission process in accordance with the triggering factor, so as to be rapidly changed to the matched data transmission process in accordance with the transmission service for the data transmission, thereby to improve the service transmission performance.

Further, the obtaining, by the second wireless transceiver device, the first information from the first wireless transceiver device through the physical layer includes detecting a target indication channel or a target signal transmitted by the first wireless transceiver device on the physical layer so as to obtain the first information, and the first information is carried in the target indication channel or target signal.

When the first wireless transceiver device transmits the first information through the dedicated channel or dedicated signal, the second wireless transceiver device detects the dedicated channel or the dedicated signal to obtain the first information. The dedicated channel is just the target channel, e.g., a dedicated channel for transmitting the first information or a channel having any other transmission function, and the first information is carried in the channel. The dedicated signal is just the target signal, e.g., a dedicated signal for transmitting the first information or a signal having any other transmission function, and the first information is carried in the signal.

It should be appreciated that, when the first wireless transceiver device transmits the target indication channel or target signal, a specific symbol is directly set on a physical resource at the physical layer for transmitting the first information, i.e., the first information is transmitted without being forwarded through any other high-layer signaling. In a possible embodiment of the present disclosure, there is a predefined timing relationship between the target indication channel and a channel carrying to-be-transmitted information, and the timing relationship is set in accordance with an information transmission demand.

To be specific, the second wireless transceiver device obtains the first information at a time point when the first wireless transceiver device transmits the first information. The detecting the target indication channel or target signal transmitted by the first wireless transceiver device on the physical layer is carried out, so as to obtain the first information includes one of the followings.

(A). Detecting the target indication channel or target signal within each subframe so as to obtain the first information. This scheme is suitable for a circumstance where the first information including the triggering factor, or a circumstance where the first wireless transceiver device transmits the first information within a latest subframe corresponding to a time point where the target data transmission process is determined, or a circumstance where the second wireless transceiver device transmits the first information within a latest subframe corresponding to a time point when the data transmission process is changed. It is impossible for the second wireless transceiver device to determine the specific time point when the first wireless transceiver device transmits the first information, so in order to obtain the first information successfully, the second wireless transceiver device detects the target indication channel or target signal within each subframe.

(B). Detecting the target indication channel or target signal within a first subframe agreed by the second wireless transceiver device with the first wireless transceiver device so as to obtain the first information. A time for transmitting the first information is agreed by the first wireless transceiver device with the second wireless transceiver device in advance, e.g., a subframe with a subframe index K for transmitting/receiving the first information is set as the first subframe in advance, and the first information is carried in the first subframe. The agreed first subframe is configured by the network side device.

(C). Detecting the target indication channel or target signal on an $M^{th}$ symbol within the first subframe agreed by the second wireless transceiver device with the first wireless transceiver device so as to obtain the first information. A time for transmitting the first information is agreed by the first wireless transceiver device with the second wireless transceiver device in advance, e.g., the time for transmitting/receiving the first information is set as the $M^{th}$ symbol within the first subframe in advance, and the first information is carried in the $M^{th}$ symbol. The agreed first subframe and the symbol are configured by the network side device.

(D). Detecting the target indication channel or target signal on $M^{th}$ to $N^{th}$ symbols within the first subframe agreed by the second wireless transceiver device with the first wireless transceiver device so as to obtain the first information. A time for transmitting the first information is agreed by the first wireless transceiver device with the second wireless transceiver device in advance, e.g., the time for transmitting/receiving the first information is set as the $M^{th}$ to $N^{th}$ symbols within the first subframe in advance, and the first information is carried in the $M^{th}$ to $N^{th}$ symbols. It should be appreciated that, a part of, or all of, the $M^{th}$ to $N^{th}$ symbols are detected. The agreed first subframe and symbols are configured by the network side device.

It should be appreciated that, the first information is carried in a part of, or all of, the $M^{th}$ to $N^{th}$ symbols. In this case, the first information includes the indication information or the triggering factor.

In a possible embodiment of the present disclosure, a part of information in the triggering factor is carried in a part of the $M^{th}$ to $N^{th}$ symbols, and the remaining information in the triggering factor is carried in the other part of the $M^{th}$ to $N^{th}$ symbols. For example, when the first information includes the triggering factor, the user service feature parameter is carried in a first symbol in the $M^{th}$ to $N^{th}$ symbols, the slice auxiliary identification information is carried in a second symbol in the $M^{th}$ to $N^{th}$ symbols, and the information about the user's customized demand is carried in a third symbol in the $M^{th}$ to $N^{th}$ symbols.

To be specific, when obtaining the first information, the second wireless transceiver device periodically detects the target indication channel or target signal at the time point when the first information is obtained. The second wireless transceiver device detects the target indication channel or target signal on each symbol.

In a possible embodiment of the present disclosure, the detecting the target indication channel or target signal transmitted by the first wireless transceiver device on the physical layer so as to obtain the first information includes one of: periodically detecting the target indication channel or target signal within a first subframe agreed by the second wireless transceiver device with the first wireless transceiver device so as to obtain the first information; periodically detecting the target indication channel or target signal on an $M^{th}$ symbol within the first subframe agreed by the second wireless transceiver device with the first wireless transceiver device so as to obtain the first information; or periodically detecting the target indication channel or target signal on $M^{th}$ to $N^{th}$ symbols within the first subframe agreed by the second wireless transceiver device with the first wireless transceiver device so as to obtain the first information.

In the embodiments of the present disclosure, when the second wireless transceiver device periodically detects the first information, a detection period is configured by the network side device. Through the detection, it is able to reduce the power consumption in the case that the conventional service is predicted to be a long-term or stable one. For example, when a new service or a service having a new user demand occurs periodically or alternately during the stable transmission of the conventional service, through the periodical detection, it is able to reduce the power consumption of the second wireless transceiver device.

To be specific, the detecting the target indication channel or target signal transmitted by the first wireless transceiver device on the physical layer so as to obtain the first information includes detecting the target indication channel or target signal in different frequency sub-domains of a frequency domain of the $M^{th}$ symbol so as to obtain the first information, or detecting the target indication channel or target signal on each of the $M^{th}$ to $N^{th}$ symbols so as to obtain the first information.

In the embodiments of the present disclosure, in order to receive the first information reliably and timely, when the first wireless transceiver device transmits the first information, the first information is carried in different frequency sub-domains of the frequency domain of the $M^{th}$ symbol. At this time, the second wireless transceiver device needs to detect the target indication channel or target signal in different frequency sub-domains of the frequency domain of the $M^{th}$ symbol so as to obtain the first information. Alternatively, when the first wireless transceiver device transmits the first information, the first information is carried in each of the $M^{th}$ to $N^{th}$ symbols. At this time, the second wireless transceiver device needs to detect the target indication channel or target signal on each of the $M^{th}$ to $N^{th}$ symbols so as to obtain the first information.

In the embodiments of the present disclosure, the first wireless transceiver device or the second wireless transceiver device changes the data transmission process in the following ways.

In a first way, the second wireless transceiver device receives the indication information from the first wireless transceiver device, and each of the second wireless transceiver device and the first wireless transceiver device changes the data transmission process directly in accordance with the target data transmission process indicated through the indication information. The first wireless transceiver device is a terminal or a network side device, and the second wireless transceiver device is an opposite end of the first wireless transceiver device. In other words, the terminal transmits the first information to the network side device, and the second wireless transceiver device is the network side device; or the network side device transmits the first information to the terminal, and the second wireless transceiver device is the terminal.

In a second way, the second wireless transceiver device receives the indication information from the first wireless transceiver device, determines whether the data transmission process is allowed to be changed, and transmits change feedback information to the first wireless transceiver device. In the case that the data transmission process is allowed to be changed, the data transmission process is changed into the target data transmission process. In this case, the first wireless transceiver device is a terminal and the second wireless transceiver device is a network side device.

In a third way, the second wireless transceiver device receives the triggering factor from the first wireless transceiver device, determines the to-be-changed target data transmission process in accordance with the triggering factor, generates the indication information, and transmits the indication information to the first wireless transceiver device. The indication information includes information about the target data transmission process. The first wireless transceiver device determines the target data transmission process in accordance with the indication information, and changes the data transmission process into the target data transmission process. In this case, the first wireless transceiver device is a terminal and the second wireless transceiver device is a network side device.

The change ways of the data transmission process will be described hereinafter in more details.

In the first way, in a possible embodiment of the present disclosure, in the case that the first information includes the indication information, the second wireless transceiver device detects the first information on a corresponding physical layer channel or signal, and decodes the first information to obtain the indication information. After detecting the indication information from the first wireless transceiver device successfully, the second wireless transceiver device rapidly changes the data transmission process into the target data transmission process in accordance with the indication information (including the information about the agreed target data transmission process and the information about the agreed effective time), and receives data through the changed target data transmission process.

In the embodiment of the present disclosure, the second wireless transceiver device is a terminal or a network side device, i.e., this way is suitable for a circumstance where the network side device directly changes the data transmission process into the target data transmission process and notifies the terminal to change the data transmission process into the target data transmission process, or a circumstance where the terminal directly changes the data transmission process into the target data transmission process and notifies the network side device to change the data transmission process into the target data transmission process.

In the second way, in a possible embodiment of the present disclosure, in the case that the first information includes the indication information, prior to changing the data transmission process in accordance with the first information, the method further includes: determining whether the second wireless transceiver device agrees to change the data transmission process, and generating change feedback information, the change feedback information including first indication information indicating that the second wireless transceiver device agrees to change the data transmission process into the target data transmission process or second indication information indicating that the second wireless transceiver device rejects to change the data transmission process into the target data transmission process; and transmitting the change feedback information to the first wireless transceiver device. The first wireless transceiver device is a terminal, and the second wireless transceiver device is a network side device.

In a possible embodiment of the present disclosure, the method further includes, in the case that the data transmission process is rejected to be changed, performing data transmission through a default transmission process.

In the embodiment of the present disclosure, upon the receipt of the indication information, the second wireless transceiver device determines whether to agree to change the data transmission process, generates the change feedback information, and transmits the change feedback information to the first wireless transceiver device. The change feedback information includes the first indication information indicating that the second wireless transceiver device agrees to change the data transmission process into the target data transmission process or the second indication information indicating that the second wireless transceiver device rejects to change the data transmission process into the target data transmission process. In the case that the second wireless transceiver device rejects to change the data transmission process, the data transmission is performed through the default transmission process. In the case that the first wireless transceiver device has received the first indication information, it means that the second wireless transceiver device agrees to change the data transmission process into the target data transmission process, and the first wireless transceiver device changes the data transmission process into the target data transmission process. In the case that the first wireless transceiver device has received the second indication information, it means that the second wireless transceiver device rejects to change the data transmission process into the target data transmission process, and the first wireless transceiver device performs the data transmission through a default transmission process.

This way is suitable for a circumstance where the first wireless transceiver device is a terminal and the second wireless transceiver device is a network side device, i.e., the data transmission process needs to be changed after the network side device agrees to change the data transmission process into the target data transmission process. In a possible embodiment of the present disclosure, the second wireless transceiver device transmits a change allowance identifier (e.g., 0 represents "agree" and 1 represents "reject") within a latest downlink subframe where the indication information is detected. When the second wireless transceiver device rejects to change the data transmission process into the target data transmission process, the first wireless transceiver device and the second wireless transceiver device perform the data transmission through the default transmission process. When the second wireless transceiver device agrees to change the data transmission process into the target data transmission process, each of the first wireless transceiver device and the second wireless transceiver device rapidly changes the data transmission process into the target data transmission process in accordance with the indication information. In terms of timeliness, as a better scheme, the first wireless transceiver device selects a subframe having uplink/downlink transmission symbols, or uplink and downlink subframes adjacent to each other.

To be specific, a time point when the change feedback information is transmitted to the first wireless transceiver device includes one of the followings.

1) A latest subframe corresponding to a time point when the first information is obtained by the second wireless transceiver device. After obtaining the first information, the second wireless transceiver device determines whether it agrees to change the data transmission process in accordance with the indication information in the first information, generates the change feedback information, and transmits the change feedback information to the first wireless transceiver device within the latest subframe corresponding to a time point when the first information is obtained by the second wireless transceiver device. The first wireless transceiver device detects the change feedback information within each subframe.
2) A second subframe agreed by the second wireless transceiver device with the first wireless transceiver device. A subframe having uplink/downlink transmission symbols for transmitting the change feedback information is agreed by the second wireless transceiver device with the first wireless transceiver device in advance, e.g., the second subframe. The first wireless transceiver device receives the change feedback information within the agreed subframe.
3) A $K^{th}$ symbol within the second subframe agreed by the second wireless transceiver device with the first wireless transceiver device. A time point for transmitting the change feedback information is agreed by the second wireless transceiver device with the first wireless transceiver device in advance, e.g., the $K^{th}$ symbol within the second subframe. The first wireless transceiver device receives the change feedback information on the $K^{th}$ symbol within the second subframe.
4) $K^{th}$ to $L^{th}$ symbols within the second subframe agreed by the second wireless transceiver device with the first wireless transceiver device, where L is greater than K. A time point for transmitting the change feedback information is agreed by the second wireless transceiver device with the first wireless transceiver device in advance, e.g., the $K^{th}$ to $L^{th}$ symbols within the second subframe. It should be appreciated that, the change feedback information is transmitted on a part of, or all of, the $K^{th}$ to $L^{th}$ symbols within the second subframe.

In the third way, in a possible embodiment of the present disclosure, in the case that the first information includes the triggering factor, subsequent to obtaining the first information from the first wireless transceiver device through the physical layer, the method further includes: decoding the first information so as to obtain the triggering factor; determining the to-be-changed target data transmission process in accordance with the triggering factor, and generating the indication information; and transmitting the indication information to the first wireless transceiver device. The first wireless transceiver device is a terminal, and the second wireless transceiver device is a network side device.

In the embodiments of the present disclosure, the first wireless transceiver device directly transmits the triggering factor corresponding to the transmission service to the second wireless transceiver device. Upon the receipt of the triggering factor, the second wireless transceiver device determines the to-be-changed target data transmission process in accordance with the triggering factor, generates the indication information, changes the data transmission process into the target data transmission process, and transmits the indication information to the first wireless transceiver device. Then, the first wireless transceiver device determines the target data transmission process in accordance with the indication information, changes the data transmission process into the target data transmission process, and performs the data transmission through the target data transmission process.

This way is suitable for a circumstance where the first wireless transceiver device is a terminal and the second wireless transceiver device is a network side device, i.e., the terminal directly transmits the triggering factor corresponding to the sudden new service to the network side device through the physical layer. The network side device determines the agreed data transmission process as well as an agreed physical resource in accordance with the triggering factor. The network side device transmits the indication information to the terminal within a latest subframe where the triggering factor is decoded successfully and obtained. The terminal transmits uplink data in accordance with the target data transmission process and the physical resource agreed in the indication information.

To be specific, upon the receipt of the indication information, the second wireless transceiver device needs to decode the indication information in accordance with a coding mode of the indication information. The indication information is indicated through one of: a coding sequence formed through coding with an agreed transmission process identifier; or a state information bitmap formed through coding with the agreed transmission process identifier.

After decoding the indication information, the second wireless transceiver device obtains the information about the to-be-changed data transmission process, and the information about the effective time of the target data transmission process.

In a possible embodiment of the present disclosure, there may exist such a circumstance where the second wireless transmission device fails to obtain the first information. To be specific, the method further includes, in the case that the first information fails to be obtained, transmitting second information to the first wireless transceiver device in accordance with the triggering factor corresponding to the transmission service. The second information is used to indicate the first wireless transceiver device to retransmit the first information, or indicate the first wireless transceiver device to perform the data transmission by default.

In the embodiment of the present disclosure, in the case that the second wireless transceiver device fails to detect the first information from the first wireless transceiver device and has received a sudden new service through the physical layer, the second wireless transceiver device transmits the second information to the first wireless transceiver device in accordance with the triggering factor, e.g., the sudden new service characteristic or the new user demand obtained through decoding, so as to indicate the first wireless transceiver device to transmit the first information. To be specific, the second information is used to indicate the first wireless transceiver device to retransmit the first information within a latest subframe upon the receipt of the second indication, until the second wireless transceiver device receives the first information successfully. Alternatively, the second information is used to indicate the first wireless transceiver device to perform the data transmission by default. In a possible embodiment of the present disclosure, the second wireless transceiver device transmits the second information (e.g., a specific identifier or signaling indicating that the first information is decoded unsuccessfully) to the first wireless transceiver device within a latest subframe. Upon the receipt of the second information, the first wireless transceiver device retransmits the first information within a latest subframe, or performs the data transmission by default.

It should be appreciated that, when the second wireless transceiver device fails to obtain the first information, it means that the second wireless transceiver device decodes the first information unsuccessfully or the first wireless transceiver device does not transmit the first information to the second wireless transceiver device. In the case that the first information is not transmitted by the first wireless transceiver device, the first wireless transceiver device indicates the second wireless transceiver device to perform the data transmission by default upon the receipt of the identifier or signaling.

In a possible embodiment of the present disclosure, a plurality of data transmission processes is set by the first wireless transceiver device and the second wireless transceiver device in accordance with a hardware condition. In order to ensure the consistency in the available data transmission processes, the first wireless transceiver device and the second wireless transceiver device may determine the available data transmission processes through negotiation. The method further includes determining available data transmission processes in accordance with terminal capability information, and the available data transmission processes include the target data transmission process. The available data transmission processes may be changed in accordance with the new service characteristic or the user' new demand.

To be specific, the available data transmission processes include at least one of the followings.

1) A transmission process through which a core network function sinks. A part of functions of a core network are sunk so as to be achieved locally. In this way, it is able to prevent the occurrence of long-distance data transmission, and reduce the delay. The part of functions of the core network include a UPF, an AMF, an SMF, policy management, edge computing, local caching, a gateway function module, etc.
2) A transmission process without any protocol stack layer. This transmission process has no fixed protocol stack layer, but it has a desired data processing procedure from an application layer to radio frequency.
3) A transmission process directly occupied by a physical resource. There is no resource allocation and contention in the transmission process. When the data transmission is performed through this transmission process, the user service is directly transmitted through the physical resource, so as to reduce the delay caused by scheduling congestion.
4) A transmission process for adding a target function, e.g., a big-data analysis module, an endogenous intelligence module or a digital twin module. These modules are used to meet the user's customized demand, e.g., collecting user data characteristics, performing intelligent analysis, and transmitting an analysis result to the other module, or flexibly selecting the transmission process. A protocol stack matches such configurations as modulation and coding for air interface transmission, multiple access, frame structure and beam management.
5) A transmission process for protocol stack architecture in a communication system, e.g., a complete transmission process for protocol stack architecture in a current communication system. The conventional user service is transmitted through the protocol stack configuration, and the transmission process corresponding to the protocol stack architecture is set as the default transmission process.

The available data transmission process is an entire data processing procedure for the terminal or network side device. Specific functions or relevant configurations of techniques/algorithms under each agreed transmission process may be set in accordance with each refined service characteristic. The to-be-changed target data transmission process is one of the above-mentioned available data transmission processes.

Implementation modes for determining the available data transmission processes in accordance with the terminal capability information will be described hereinafter in more details.

In a first mode, the determining the available data transmission processes in accordance with the terminal capability information includes: in the case that the first wireless transceiver device is a network side device and the second wireless transceiver device is a terminal, transmitting the terminal capability information to the first wireless transceiver device; and receiving information about the available data transmission processes from the first wireless transceiver device.

In the embodiment of the present disclosure, the first wireless transceiver device is the network side device, the second wireless transceiver device is the terminal, and the terminal capability information is reported by the second wireless transceiver device. The information about the transmission processes supported by the terminal is carried in the terminal capability information, e.g., a specific identifier of the supported transmission process or a new service identifier carried through the transmission process.

The network side device determines the available data transmission processes in accordance with the terminal capability information, and then determines the data transmission processes available for both the terminal and the network side device in accordance with the data transmission processes supported by the network side device itself. To be specific, in the case that the quantity of available data transmission processes for the terminal is smaller than that for the network side device, the network side device obtains the available data transmission processes in accordance with the terminal capability information, and transmits signaling information to the terminal so as to indicate that all the data transmission processes are available. In the case that the quantity of available data transmission processes for the terminal is greater than that for the network side device, the network side device obtains the available data transmission processes in accordance with the terminal capability information, and transmits signaling information to the terminal so as to indicate the data transmission processes available for the network side device. In this way, the first wireless transceiver device and the second wireless transceiver device determine the available data transmission processes through negotiation, so as to ensure the consistency in the data transmission processes.

In a second mode, the determining the available data transmission processes in accordance with the terminal capability information includes: in the case that the first wireless transceiver is a terminal and the second wireless transceiver device is a network side device, receiving the terminal capability information from the first wireless transceiver device; and determining the available data transmission process in accordance with the terminal capability information and the data transmission processes supported by the network side device. Subsequent to determining the available data transmission processes in accordance with the terminal capability information, the method further includes transmitting information about the available data transmission processes to the first wireless transceiver device.

In the embodiment of the present disclosure, the first wireless transceiver device is the terminal, and the second wireless transceiver device is the network side device. The terminal reports the terminal capability information to the network side device. The network side device determines the data transmission processes available for both the terminal and the network side device in accordance with the terminal capability information, and transmits the information about the available data transmission processes to the terminal. In this way, the first wireless transceiver device and the second wireless transceiver device determine the available data transmission processes through negotiation, so as to ensure the consistency in the data transmission processes.

In the case that the terminal reports the terminal capability information to the network side device, a method for determining, by the first wireless transceiver device and the second wireless transceiver device, the available transmission processes is shown in FIG. 2, and thus will not be particularly defined herein.

In a possible embodiment of the present disclosure, after the first wireless transceiver device and the second wireless transceiver device have determined the to-be-changed target data transmission process, it is necessary to determine a transmission resource for transmitting the data through the target data transmission process. To be specific, subsequent to obtaining the first information from the first wireless transceiver device through the physical layer, the method further includes determining a transmission resource corresponding to target service data, and the target service data is to be transmitted through the to-be-changed target data transmission process.

The transmission resource is determined through one of the followings.

(A) Selecting a transmission resource that meets a first condition, i.e., selecting a physical resource that meets a condition on data transmission through the target data transmission process, and/or a physical resource with an optimum channel state.

In the embodiment of the present disclosure, the target data transmission process is a transmission process directly occupied by the physical resource, i.e., the physical resource is directly occupied in accordance with the target data transmission process, and there is no resource allocation and contention in the target data transmission process. In the case that the data transmission is performed through the target data transmission process, the user service is directly transmitted through the physical resource, so as to reduce the delay caused by a scheduling congestion. The first wireless transceiver device directly uses a best physical resource and/or a physical resource with an optimum channel state, and the channel state is determined in accordance with channel quality or reference signal quality.

(B) In the case that the first wireless transceiver device is a network side device and the second wireless transceiver device is a terminal, determining, by the first wireless transceiver device, the transmission resource in accordance with a data transmission volume through the target data transmission process.

In the case that the first wireless transceiver device is the network side device and the second wireless transceiver device is the terminal, the network side device performs the downlink data transmission. At this time, the effective time of the target data transmission process is greater than or equal to zero (i.e., T1≥0). The network side device records the data transmission volume through different data transmission processes, allocates the physical resources for the user data through different data transmission processes in accordance with the data transmission volume and a channel environment, and performs the downlink data transmission through the agreed target data transmission process.

In the case that the network side device is a base station which transmits downlink data to the terminal (T1≥0), a procedure of determining, by the first wireless transceiver device, the transmission resource in accordance with the data transmission volume is shown in FIG. 3, and thus will not be particularly defined herein.

(C) In the case that the first wireless transceiver device is a terminal, the second wireless transceiver device is a network side device and the effective time of the target data transmission process is equal to zero, determining, by the terminal, the transmission resource through agreement, or reserving, by the network side device, the transmission resource.

In the case that the first wireless transceiver device is the terminal and the second wireless transceiver device is the network side device, the terminal performs uplink data transmission. In the case that the effective time of the target data transmission process is equal to zero (i.e., T1=0), it means that the data transmission process is to be changed immediately. In this case, the transmission resource is agreed by the terminal with the network side device (e.g., the terminal transmits indication information to the network side device so as to indicate that the user data is to be transmitted through an agreed physical resource), or a resource pool is reserved by the network side device.

To be specific, the determining, by the terminal, the transmission resource through the agreement includes one of: implicitly indicating the transmission resource through a position of a subframe or symbol where the indication information is located; indicating the transmission resource through information about an agreed physical resource carried in the indication information; or implicitly indicating the transmission resource through information about the target data transmission process carried in the indication information.

In a possible embodiment of the present disclosure, in the case that the transmission resource is determined by the terminal through agreement, the changing the data transmission process in accordance with the first information includes changing the data transmission process into the target data transmission process in accordance with the first information at a time point when relevant information about the agreed transmission resource is received from the terminal. The relevant information includes the indication information or any other information transmitted separately.

In a possible embodiment of the present disclosure, the method further includes: enabling an interference elimination algorithm function at the time point when the relevant information about the agreed transmission resource is received from the terminal; and performing the data transmission on the transmission resource through the target data transmission process.

In the embodiments of the present disclosure, after the network side device (i.e., the second wireless transceiver device) has detected and obtained the indication information at the physical layer, the data transmission process is changed to the target data transmission process immediately (T1=0), a corresponding interface technique is used, and an interference elimination/inhibition algorithm is enabled, so as to prevent the occurrence of any resource collision due to the contention of uplink resources, and transmit the uplink data through the agreed physical resource.

In the case that the transmission resource is reserved by the network side device, the network side device reserves a dedicated resource pool for the sudden new service. After the network side device has detected and obtained the indication information at the physical layer, the data transmission process is changed to the agreed target data transmission process immediately, a corresponding interface technique is adopted, and the uplink data is transmitted through physical resources in the reserved resource pool.

In the case that the network side device is a base station and the transmission resource is agreed by the terminal with the network side device (i.e., the terminal transmits uplink data to the network side device (T1=0)), the terminal transmits the uplink data through the agreed data transmission process immediately upon the receipt of the service data. The data transmission is performed in a grant-free manner. A specific procedure of determining, by the terminal, the physical resource through agreement is shown in FIG. 4, and thus will not be particularly defined herein.

(D) In the case that the first wireless transceiver device is a terminal, the second wireless transceiver device is a network side device and the effective time of the target data transmission process fails to be configured, determining, by the terminal, the transmission resource through agreement, or reserving, by the network side device, the transmission resource.

When the effective time of the target data transmission process fails to be configured, it means that the indication information does not include the information about the effective time of the target data transmission process. In this case, the implementation of determining, by the terminal, the transmission resource through agreement or reserving, by the network side device, the transmission resource is similar to that in (C), and thus will not be particularly defined herein.

(E) In the case that the first wireless transceiver device is a terminal, the second wireless transceiver device is a network side device and the effective time of the target data transmission process is greater than zero, determining, by the second wireless transceiver device, the transmission resource in accordance with the data transmission volume through the target data transmission process.

To be specific, in the case that the first wireless transceiver device is a terminal, the second wireless transceiver device is a network side device and the effective time of the target data transmission process is greater than zero, the determining the transmission resource corresponding to the target service data includes: receiving uplink data request information from the first wireless transceiver device, the uplink data request information including a data transmission volume of the target data transmission process; determining the transmission resource corresponding to the target service data in accordance with the data transmission volume; and transmitting feedback information to the first wireless transmission device, the feedback information including information about the transmission resource.

In the embodiments of the present disclosure, in the case that the first wireless transceiver device is the terminal and the second wireless transceiver device is the network side device, the terminal performs the uplink data transmission. In the case that the effective time of the target data transmission process is greater than zero (i.e., T1>0), it means that the network side device changes the data transmission process into the target data transmission process within a time window T1 upon the receipt of the information for triggering the change of the data transmission process. The terminal reports the data transmission volume to the network side device, and the network side device selects the transmission resource in accordance with the data transmission volume.

For example, the terminal transmits an uplink data request (including the data transmission volume) to the network side device. After obtaining and parsing the information for triggering the change of the data transmission process at the physical layer (i.e., before the high-layer protocol stack), within the time window T1, the network side device changes the data transmission process into the agreed data transmission process, enables the interface technique corresponding to the agreed data transmission process, selects the corresponding physical resource, transmits scheduling grant to the terminal, and notifies the terminal of the information about the transmission resource.

In the case that the network side device is the base station and the transmission resource is determined by the base station in accordance with the data transmission volume, the terminal transmits uplink data to the network side device (and T1>0), and the agreed data transmission process takes effect at T+T1 (an agreed time) after the base station has received the service data, as shown in FIG. 5, which will not be particularly defined herein.

The implementation of determining the transmission resource corresponding to the target service data has been described hereinabove in conjunction with the embodiments.

Figure 10:
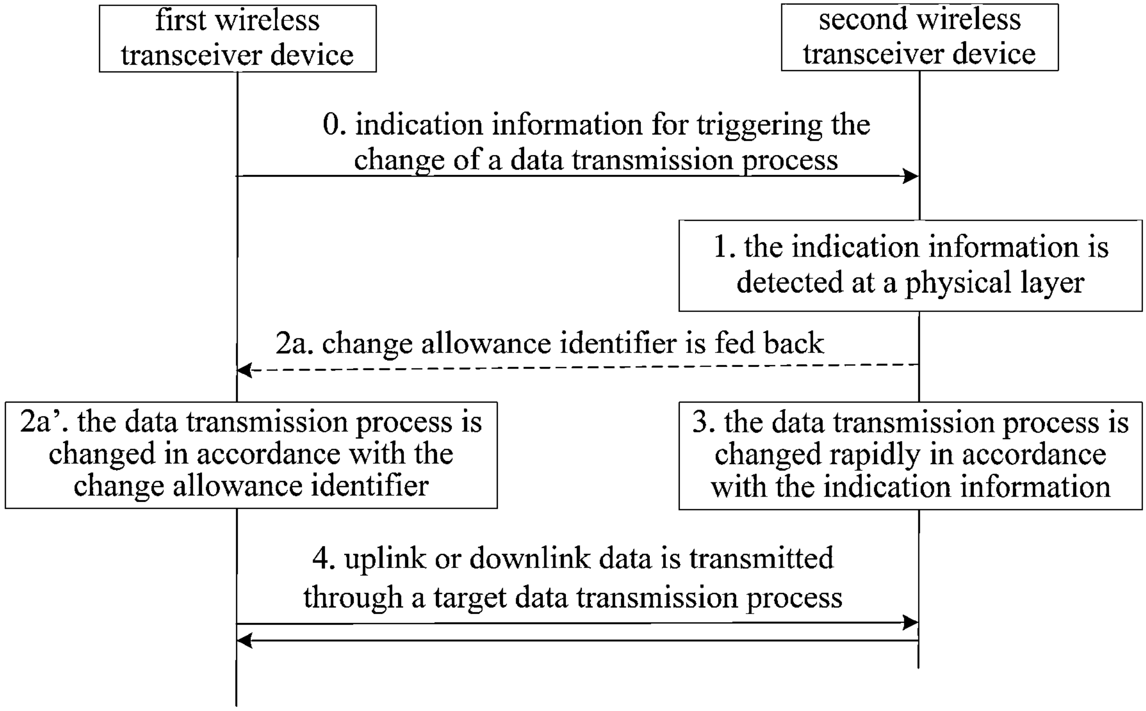
FIG. 10 is still yet another flow chart of the method for changing the data transmission process according to one embodiment of the present disclosure.

The method of changing, by the second wireless transceiver device, the data transmission process will be described hereinafter in more details. The first information includes the indication information, and as shown in FIG. 10, the method includes the following steps.

Step 0: the first wireless transceiver device transmits the indication information for triggering the change of the data transmission process to the second wireless transceiver device through a dedicated signal or channel at the physical layer. The indication information includes the information about the agreed data transmission process and the information about the effective time.

Step 1: the second wireless transceiver device detects the indication information at the physical layer. The detecting the indication information includes, but not limited to, the followings.

i) Continuously detecting, by the second wireless transceiver device, whether there is the indication information transmitted by the first wireless transceiver A detection mode is not preset. The first wireless transceiver transmits the indication information in accordance with a condition about a new service or a new user demand, and the second wireless transceiver device continuously performs the detection so as to prevent the indication information from being undetected.

ii) Periodically detecting the indication information within a subframe A or on $M^{th}$ to $N^{th}$ symbols within the subframe A agreed by the second wireless transceiver device with the first wireless transceiver device in advance. The agreed subframe or symbol and a period are configured by the network side device. Through the detection, it is able to reduce the power consumption in the case that the conventional service is predicted to be a long-term or stable one. For example, when a new service or a service having a new user demand occurs periodically or alternately during the stable transmission of the conventional service, through the periodical detection, it is able to reduce the power consumption of the second wireless transceiver device. Alternatively, the indication information is detected within each subframe A or on all the $M^{th}$ to $N^{th}$ symbols within the subframe A.

Steps 2*a*-2*a*': these steps are adapted to a scenario where the terminal notifies the network side device and then changes the data transmission process with permission from the network side device. The second wireless transceiver device needs to transmit a change allowance identifier (i.e., the change feedback information) within a corresponding downlink subframe, and the first wireless transceiver device changes the data transmission process in accordance with the change allowance identifier. The change allowance identifier is transmitted within a subframe A having uplink/downlink transmission symbols agreed with the first wireless transceiver device, or transmitted on a $K^{th}$ downlink symbol within the subframe A, or on $K^{th}$ to $L^{th}$ downlink symbols within the subframe A. Alternatively, the change allowance identifier is transmitted within a latest subframe where the indication information is detected.

The change allowance identifier is expressed in the form of a binary symbol. For example, 0 indicates that the second wireless transceiver device agrees to change the data transmission process, and 1 indicates that the second wireless transceiver device rejects to change the data transmission process. When the second wireless transceiver device rejects to change the data transmission process, each of the first wireless transceiver and the second wireless transceiver device performs the data transmission through a default transmission process. When the second wireless transceiver device agrees to change the data transmission process, each of the first wireless transceiver and the second wireless transceiver device rapidly changes the data transmission process in accordance with the indication information.

Step 3: in the scenario where the network side device notifies the terminal to change the data transmission process and the scenario where the terminal notifies the network side device to change the data transmission process, Steps 2*a* and 2*a*' are omitted, and the second wireless transceiver device rapidly changes the data transmission process at the agreed time in accordance with the indication information.

Step 4: in the case that there is a sudden new service or a service having a new user demand during the transmission of a conventional service, the first wireless transceiver device and the second wireless transceiver device rapidly change the data transmission process as mentioned hereinabove, so as to transmit the uplink data or downlink data through the matched target data transmission process.

In the case that the second wireless transceiver device fails to detect the indication information from the first wireless transceiver device and has received a sudden new service through the physical layer, the second wireless transceiver device performs, but not limited to, the following operations in accordance with the triggering factor, e.g., the sudden new service characteristic or the new user demand obtained through decoding: i) transmitting a decoding failure identifier within a latest subframe, so as to indicate the first wireless transceiver device to retransmit the indication information within a latest subframe upon the receipt of the decoding failure identifier, until the second wireless transceiver device has successfully received the indication information; and ii) transmitting signaling information within a latest subframe, so as to indicate the first wireless transceiver device to retransmit the data by default.

It should be appreciated that, in the case that the first wireless transceiver device fails to transmit the indication information, the first wireless transceiver device indicates the second wireless transceiver device to normally transmit the data upon the receipt of the identifier or signaling information.

In the case that the first information includes the triggering factor, the first wireless transceiver device is the terminal and the second wireless transceiver is the network side device, the method for changing the data transmission process is shown in FIG. 8, and thus will not be particularly defined herein.

In the case that the network side device is a base station, the transmission resource is determined by the base station in accordance with the data transmission volume, and the terminal transmits the indication information for triggering the change of the data transmission process to the base station and changes the data transmission process with permission from the base station, the method for changing the data transmission process is shown in FIG. 6, and thus will not be particularly defined herein.

According to the embodiments of the present disclosure, the second wireless transceiver device obtains the first information from the first wireless transceiver device through the physical layer. The first information is associated with the triggering factor corresponding to the transmission service, and it includes the triggering factor or the indication information. The indication information is used to indicate the to-be-changed target data transmission process. The second wireless transceiver device determines the to-be-changed target data transmission process in accordance with the indication information or the triggering factor from the first wireless transceiver device, so as to rapidly change the data transmission process for the data transmission. For a future communication system, when there is a sudden new service (e.g., an urgent/time-sensitive service) or a service having a new user demand in the conventional service, the service is changed to be transmitted on a matched data transmission process through a rapid triggering and changing operation on the physical layer, so as to improve the service transmission performance and the user experience.

It should be appreciated that, the implementation of the method for the second wireless transceiver device may refer to the functions and steps implemented by the second wireless transceiver device in the above-mentioned method for changing the data transmission process for the first wireless transceiver device, and thus will not be particularly defined herein.

The method for changing the data transmission process has been described hereinabove, and a corresponding device will be described hereinafter in conjunction with the drawings.

Figure 11:
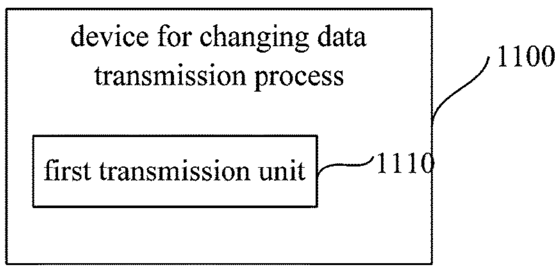
FIG. 11 is a schematic view showing a device for changing a data transmission process according to one embodiment of the present disclosure.

To be specific, as shown in FIG. 11, the present disclosure provides a device 1100 for changing a data transmission process for a first wireless transceiver device, which includes a first transmission unit 1110 configured to transmit first information to a second wireless transceiver device through a physical layer. The first information includes indication information indicating a to-be-changed target data transmission process or a triggering factor corresponding to a transmission service.

In a possible embodiment of the present disclosure, the first transmission unit is specifically configured to transmit a target indication channel or a target signal to the second wireless transceiver device directly through the physical layer, and the target indication channel or target signal carries the first information.

In a possible embodiment of the present disclosure, a time point when the target indication channel or target signal is transmitted by the first wireless transceiver device to the second wireless transceiver device through the physical layer includes one of: a latest subframe corresponding to a time point when the triggering factor is obtained by the first wireless transceiver device; a latest subframe corresponding to a time point when the target data transmission process is determined by the first wireless transceiver device; a latest subframe corresponding to a time point when a data transmission process of the first wireless transceiver device is changed; a first subframe agreed by the first wireless transceiver device with the second wireless transceiver device; an $M^{th}$ symbol within the first subframe agreed by the first wireless transceiver device with the second wireless transceiver device; or $M^{th}$ to $N^{th}$ symbols within the first subframe agreed by the first wireless transceiver device with the second wireless transceiver device, where N is greater than M.

In a possible embodiment of the present disclosure, the first information is carried in different frequency sub-domains of a frequency domain of the $M^{th}$ symbol, or the first information is carried in each of the $M^{th}$ to $N^{th}$ symbols.

In a possible embodiment of the present disclosure, the device further includes: a first determination unit configured to determine the to-be-changed target data transmission process in accordance with the triggering factor corresponding to the transmission service; and a first changing unit configured to change the data transmission process into the target data transmission process.

In a possible embodiment of the present disclosure, the device further includes: a first reception unit configured to receive change feedback information from the second wireless transceiver device, the change feedback information including first indication information indicating that the second wireless transceiver device agrees to change the data transmission process into the target data transmission process or second indication information indicating that the second wireless transceiver device rejects to change the data transmission process into the target data transmission process; a second changing unit configured to, in the case that the change feedback information includes the first indication information, change the data transmission process into the target data transmission process; and a second processing unit configured to, in the case that the change feedback information includes the second indication information, perform data transmission through a default transmission process. The first wireless transceiver device is a terminal, and the second wireless transceiver device is a network side device.

In a possible embodiment of the present disclosure, the device further includes: a second reception unit configured to receive indication information from the second wireless transceiver device, the indication information being generated and transmitted by the second wireless transceiver device after the second wireless transceiver device decodes the first information and obtains the triggering factor; a second determination unit configured to determine the to-be-changed target data transmission process in accordance with the indication information; and a third changing unit configured to change the data transmission process into the target data transmission process. The first wireless transceiver device is a terminal, and the second wireless transceiver device is a network side device.

In a possible embodiment of the present disclosure, the indication information includes one of: information about the to-be-changed target data transmission process; or the information about the to-be-changed target data transmission process and information about an effective time of the to-be-changed target data transmission process.

In a possible embodiment of the present disclosure, a time window where a process is effective after the target data transmission process takes effect includes one of: a target time window; a time period from a time point when the target data transmission process takes effect to a time point when indication information other than the first information has been received; or a time period from a time point when the target data transmission process takes effect to a time point when a protocol stack de-configuration instruction has been received.

In a possible embodiment of the present disclosure, the triggering factor includes at least one of a user service feature parameter, slice auxiliary identification information, or information about user's customized demand.

In a possible embodiment of the present disclosure, the indication information is indicated through one of a coding sequence formed through coding with an agreed transmission process identifier, or a state information bitmap formed through coding with the agreed transmission process identifier.

In a possible embodiment of the present disclosure, the device further includes a third determination unit configured to determine a transmission resource corresponding to target service data, and the target service data is to be transmitted through the to-be-changed target data transmission process. The transmission resource is determined through one of: selecting a transmission resource that meets a first condition; in the case that the first wireless transceiver device is a network side device and the second wireless transceiver device is a terminal, determining, by the first wireless transceiver device, the transmission resource in accordance with a data transmission volume through the target data transmission process; in the case that the first wireless transceiver device is a terminal, the second wireless transceiver device is a network side device and an effective time of the target data transmission process is equal to zero, determining, by the terminal, the transmission resource through agreement, or reserving, by the network side device, the transmission resource; in the case that the first wireless transceiver device is a terminal, the second wireless transceiver device is a network side device and the effective time of the target data transmission process fails to be configured, determining, by the terminal, the transmission resource through agreement, or reserving, by the network side device, the transmission resource; or in the case that the first wireless transceiver device is a terminal, the second wireless transceiver device is a network side device and the effective time of the target data transmission process is greater than zero, determining, by the second wireless transceiver device, the transmission resource in accordance with the data transmission volume through the target data transmission process.

In a possible embodiment of the present disclosure, the selecting the transmission resource that meets the first condition includes selecting a maximum physical resource that meets a condition on data transmission through the target data transmission process, and/or a physical resource with an optimum channel state.

In a possible embodiment of the present disclosure, the determining, by the terminal, the transmission resource through the agreement includes one of: implicitly indicating the transmission resource through a position of a subframe or symbol where the indication information is located; indicating the transmission resource through information about an agreed physical resource carried in the indication information; or implicitly indicating the transmission resource through information about the target data transmission process carried in the indication information.

In a possible embodiment of the present disclosure, in the case that the first wireless transceiver device is a terminal and the effective time of the target data transmission process is greater than zero, the third determination unit includes: a first transmission sub-unit configured to transmit uplink data request information to the second wireless transceiver device, the uplink data request information including a data transmission volume of the target data transmission process; and a first reception sub-unit configured to receive feedback information from the second wireless transmission device, the feedback information including information about the transmission resource.

In a possible embodiment of the present disclosure, the device further includes a fourth determination unit configured to determine available data transmission processes in accordance with terminal capability information, and the available data transmission processes include the target data transmission process.

In a possible embodiment of the present disclosure, the fourth determination unit includes: a first obtaining sub-unit configured to, in the case that the first wireless transceiver device is a network side device and the second wireless transceiver device is a terminal, obtain the terminal capability information about the terminal; and a first determination sub-unit configured to determine the available data transmission processes in accordance with the terminal capability information and data transmission processes supported by the network side device. The device further includes a second transmission sub-unit configured to transmit information about the available data transmission processes to the second wireless transceiver device.

In a possible embodiment of the present disclosure, the fourth determination unit includes: a second transmission sub-unit configured to, in the case that the first wireless transceiver is a terminal and the second wireless transceiver device is a network side device, transmit the terminal capability information to the second wireless transceiver device; and a second reception unit configured to receive information about the available data transmission processes from the second wireless transceiver device.

In a possible embodiment of the present disclosure, the available data transmission processes include at least one of a transmission process through which a core network function sinks, a transmission process without any protocol stack layer, a transmission process directly occupied by a physical resource, a transmission process for adding a target function, or a transmission process for protocol stack architecture in a communication system.

In a possible embodiment of the present disclosure, the device further includes: a third reception unit configured to receive second information from the second wireless transceiver device; and a third transmission unit configured to transmit the first information in accordance with the second information. The second information is used to indicate the first wireless transceiver device to retransmit the first information, or indicate the first wireless transceiver device to perform the data transmission by default.

It should be appreciated that, the above-mentioned device is used to implement all the steps of the method for the first wireless transceiver device with a same technical effect, which will not be particularly defined herein.

Figure 12:
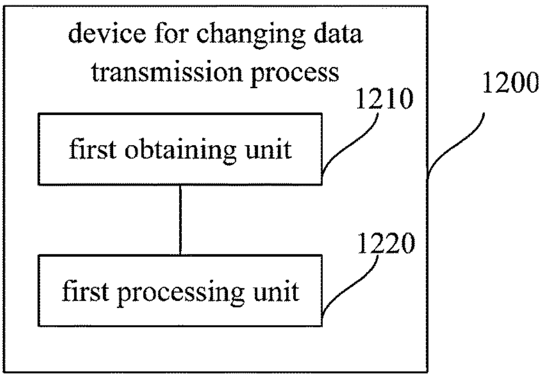
FIG. 12 is another schematic view showing the device for changing the data transmission process according to one embodiment of the present disclosure.

To be specific, as shown in FIG. 12, the present disclosure provides in some embodiments a device 1200 for changing a data transmission process for a second wireless transceiver device, which includes: a first obtaining unit 1210 configured to obtain first information from the first wireless transceiver device through a physical layer, the first information including indication information indicating a to-be-changed target data transmission process or a triggering factor corresponding to a transmission service; and a first processing unit 1220 configured to change the data transmission process in accordance with the first information.

In a possible embodiment of the present disclosure, the first obtaining unit is specifically configured to detect a target indication channel or a target signal transmitted by the first wireless transceiver device on the physical layer so as to obtain the first information, and the first information is carried in the target indication channel or target signal.

In a possible embodiment of the present disclosure, the first obtaining unit is specifically configured to perform one of: detecting the target indication channel or target signal within each subframe so as to obtain the first information; detecting the target indication channel or target signal within a first subframe agreed by the second wireless transceiver device with the first wireless transceiver device so as to obtain the first information; detecting the target indication channel or target signal on an $M^{th}$ symbol within the first subframe agreed by the second wireless transceiver device with the first wireless transceiver device so as to obtain the first information; or detecting the target indication channel or target signal on $M^{th}$ to $N^{th}$ symbols within the first subframe agreed by the second wireless transceiver device with the first wireless transceiver device so as to obtain the first information.

In a possible embodiment of the present disclosure, the first obtaining unit is specifically configured to perform one of: periodically detecting the target indication channel or target signal within a first subframe agreed by the second wireless transceiver device with the first wireless transceiver device so as to obtain the first information; periodically detecting the target indication channel or target signal on an $M^{th}$ symbol within the first subframe agreed by the second wireless transceiver device with the first wireless transceiver device so as to obtain the first information; or periodically detecting the target indication channel or target signal on $M^{th}$ to $N^{th}$ symbols within the first subframe agreed by the second wireless transceiver device with the first wireless transceiver device so as to obtain the first information.

In a possible embodiment of the present disclosure, the first obtaining unit is specifically configured to detect the target indication channel or target signal in different frequency sub-domains of a frequency domain of the $M^{th}$ symbol so as to obtain the first information, or detect the target indication channel or target signal on each of the $M^{th}$ to $N^{th}$ symbols so as to obtain the first information.

In a possible embodiment of the present disclosure, the device further includes: a decoding unit configured to decode the first information so as to obtain the triggering factor; a fifth determination unit configured to determine the to-be-changed target data transmission process in accordance with the triggering factor, and generate the indication information; and a fourth transmission unit configured to transmit the indication information to the first wireless transceiver device. The first wireless transceiver device is a terminal, and the second wireless transceiver device is a network side device.

In a possible embodiment of the present disclosure, in the case that the first information includes the indication information, the device further includes: a sixth determination unit configured to determine whether the second wireless transceiver device agrees to change the data transmission process, and generate change feedback information, the change feedback information including first indication information indicating that the second wireless transceiver device agrees to change the data transmission process into the target data transmission process or second indication information indicating that the second wireless transceiver device rejects to change the data transmission process into the target data transmission process; and a fifth transmission unit configured to transmit the change feedback information to the first wireless transceiver device. The first wireless transceiver device is a terminal, and the second wireless transceiver device is a network side device.

In a possible embodiment of the present disclosure, a time point when the change feedback information is transmitted to the first wireless transceiver device includes one of: a latest subframe corresponding to a time point when the first information is obtained by the second wireless transceiver device; a second subframe agreed by the second wireless transceiver device with the first wireless transceiver device; a $K^{th}$ symbol within the second subframe agreed by the second wireless transceiver device with the first wireless transceiver device; or $K^{th}$ to $L^{th}$ symbols within the second subframe agreed by the second wireless transceiver device with the first wireless transceiver device, where L is greater than K.

In a possible embodiment of the present disclosure, the device further includes a third processing unit configured to, in the case that the data transmission process is rejected to be changed, perform data transmission through a default transmission process.

In a possible embodiment of the present disclosure, the indication information includes at least one of: information about the to-be-changed target data transmission process; or the information about the to-be-changed target data transmission process and information about an effective time of the to-be-changed target data transmission process.

In a possible embodiment of the present disclosure, a time window where a process is effective after the target data transmission process takes effect includes one of: a target time window; a time period from a time point when the target data transmission process takes effect to a time point when indication information other than the first information has been received; or a time period from a time point when the target data transmission process takes effect to a time point when a protocol stack de-configuration instruction has been received.

In a possible embodiment of the present disclosure, the triggering factor includes at least one of a user service feature parameter, slice auxiliary identification information, or information about user's customized demand.

In a possible embodiment of the present disclosure, the device further includes a seventh determination unit configured to determine a transmission resource corresponding to target service data, and the target service data is to be transmitted through the to-be-changed target data transmission process. The transmission resource is determined through one of: selecting a transmission resource that meets a first condition; in the case that the first wireless transceiver device is a network side device and the second wireless transceiver device is a terminal, determining, by the first wireless transceiver device, the transmission resource in accordance with a data transmission volume through the target data transmission process; in the case that the first wireless transceiver device is a terminal, the second wireless transceiver device is a network side device and an effective time of the target data transmission process is equal to zero, determining, by the terminal, the transmission resource through agreement, or reserving, by the network side device, the transmission resource; in the case that the first wireless transceiver device is a terminal, the second wireless transceiver device is a network side device and the effective time of the target data transmission process fails to be configured, determining, by the terminal, the transmission resource through agreement, or reserving, by the network side device, the transmission resource; or in the case that the first wireless transceiver device is a terminal, the second wireless transceiver device is a network side device and the effective time of the target data transmission process is greater than zero, determining, by the second wireless transceiver device, the transmission resource in accordance with the data transmission volume through the target data transmission process.

In a possible embodiment of the present disclosure, the selecting the transmission resource that meets the first condition includes selecting a maximum physical resource that meets a condition on data transmission through the target data transmission process, and/or a physical resource with an optimum channel state.

In a possible embodiment of the present disclosure, the determining, by the terminal, the transmission resource through the agreement includes one of: implicitly indicating the transmission resource through a position of a subframe or symbol where the indication information is located; indicating the transmission resource through information about an agreed physical resource carried in the indication information; or implicitly indicating the transmission resource through information about the target data transmission process carried in the indication information.

In a possible embodiment of the present disclosure, in the case that the first wireless transceiver device is a terminal and the effective time of the target data transmission process is greater than zero, the seventh determination unit includes: a third reception sub-unit configured to receive uplink data request information from the first wireless transceiver device, the uplink data request information including a data transmission volume of the target data transmission process; a second determination sub-unit configured to determine the transmission resource corresponding to the target service data in accordance with the data transmission volume; and a third transmission sub-unit configured to transmit feedback information to the first wireless transmission device, the feedback information including information about the transmission resource.

In a possible embodiment of the present disclosure, in the case that the transmission resource is determined by the terminal through agreement, the first processing unit is specifically configured to change the data transmission process into the target data transmission process in accordance with the first information at a time point when relevant information about the transmission resource is received.

In a possible embodiment of the present disclosure, the device further includes: a fourth processing unit configured to enable an interference elimination algorithm function at the time point when the relevant information about the transmission resource has been received; and a fifth processing unit configured to perform the data transmission through the transmission resource in the target data transmission process.

In a possible embodiment of the present disclosure, the device further includes an eighth determination unit configured to determine available data transmission processes in accordance with terminal capability information, and the available data transmission processes include the target data transmission process.

In a possible embodiment of the present disclosure, the eighth determination unit includes: a fourth transmission sub-unit configured to, in the case that the first wireless transceiver device is a network side device and the second wireless transceiver device is a terminal, transmit the terminal capability information to the first wireless transceiver device; and a fourth reception sub-unit configured to receive information about the available data transmission processes from the first wireless transceiver device.

In a possible embodiment of the present disclosure, the eighth determination unit includes: a fifth reception sub-unit configured to, in the case that the first wireless transceiver is a terminal and the second wireless transceiver device is a network side device, receive the terminal capability information from the first wireless transceiver device; and a third determination sub-unit configured to determine the available data transmission processes in accordance with the terminal capability information and data transmission processes supported by the network side device. The device further includes a fifth transmission sub-unit configured to transmit information about the available data transmission processes to the first wireless transceiver device.

In a possible embodiment of the present disclosure, the available data transmission processes include at least one of a transmission process through which a core network function sinks, a transmission process without any protocol stack layer, a transmission process directly occupied by a physical resource, a transmission process for adding a target function, or a transmission process for protocol stack architecture in a communication system.

In a possible embodiment of the present disclosure, the device further includes a sixth transmission unit configured to, in the case that the first information fails to be obtained, transmit second information to the first wireless transceiver device in accordance with the triggering factor corresponding to the transmission service. The second information is used to indicate the first wireless transceiver device to retransmit the first information, or indicate the first wireless transceiver device to perform the data transmission by default.

It should be appreciated that, the method in the embodiments of the present disclosure is used to implement all the steps of the above-mentioned method for the second wireless transceiver device with a same technical effect, which will not be particularly defined herein.

It should be appreciated that, the units in the embodiments of the present disclosure are for illustrative purposes, and they are provided merely on the basis of their logic functions. The units may be integrated in a processing unit, or physically separated from each other, or two or more units may be integrated in one unit. The integrated units may be implemented in the form of hardware or a software functional unit.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

Figure 13:
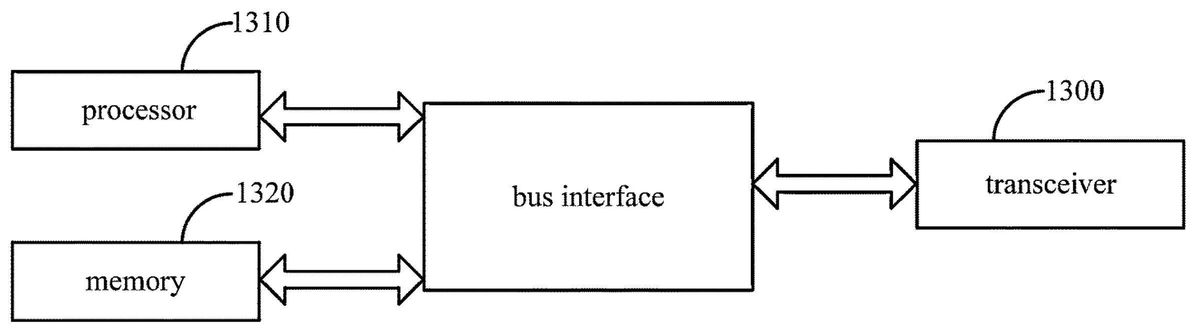
FIG. 13 is yet another schematic view showing the device for changing the data transmission process according to one embodiment of the present disclosure.

As shown in FIG. 13, the present disclosure further provides in some embodiments a device for changing a data transmission process for a first wireless transceiver device, which includes a memory 1320, a transceiver 1300 and a processor 1310. The memory 1320 is configured to store therein a computer program, the transceiver 1300 is configured to transmit and receive data under the control of the processor, the processor 1310 is configured to read the computer program in the memory, and the transceiver 1300 is configured to transmit first information to a second wireless transceiver device through a physical layer. The first information includes indication information indicating a to-be-changed target data transmission process or a triggering factor corresponding to a transmission service.

In a possible embodiment of the present disclosure, the transmitting the first information to the second wireless transceiver device through the physical layer includes transmitting a target indication channel or a target signal to the second wireless transceiver device directly through the physical layer, and the target indication channel or target signal carries the first information.

In a possible embodiment of the present disclosure, a time point when the target indication channel or target signal is transmitted to the second wireless transceiver device through the physical layer includes one of: a latest subframe corresponding to a time point when the triggering factor is obtained by the first wireless transceiver device; a latest subframe corresponding to a time point when the target data transmission process is determined by the first wireless transceiver device; a latest subframe corresponding to a time point when a data transmission process of the first wireless transceiver device is changed; a first subframe agreed by the first wireless transceiver device with the second wireless transceiver device; an $M^{th}$ symbol within the first subframe agreed by the first wireless transceiver device with the second wireless transceiver device; or $M^{th}$ to $N^{th}$ symbols within the first subframe agreed by the first wireless transceiver device with the second wireless transceiver device, where N is greater than M.

In a possible embodiment of the present disclosure, the first information is carried in different frequency sub-domains of a frequency domain of the $M^{th}$ symbol, or the first information is carried in each of the $M^{th}$ to $N^{th}$ symbols.

In a possible embodiment of the present disclosure, in the case that the first information includes the indication information, the processor is further configured to read the computer program in the memory so as to: determine the to-be-changed target data transmission process in accordance with the triggering factor corresponding to the transmission service; and change the data transmission process into the target data transmission process.

In a possible embodiment of the present disclosure, in the case that the first information includes the indication information, the transceiver is further configured to receive change feedback information from the second wireless transceiver device, the change feedback information including first indication information indicating that the second wireless transceiver device agrees to change the data transmission process into the target data transmission process or second indication information indicating that the second wireless transceiver device rejects to change the data transmission process into the target data transmission process. The processor is further configured to read the computer program in the memory, so as to: in the case that the change feedback information includes the first indication information, change the data transmission process into the target data transmission process; and in the case that the change feedback information includes the second indication information, perform data transmission through a default transmission process. The first wireless transceiver device is a terminal, and the second wireless transceiver device is a network side device.

In a possible embodiment of the present disclosure, in the case that the first information includes the triggering factor, the transceiver is further configured to receive indication information from the second wireless transceiver device, and the indication information is generated and transmitted by the second wireless transceiver device after the second wireless transceiver device decodes the first information and obtains the triggering factor. The processor is further configured to read the computer program in the memory, so as to determine the to-be-changed target data transmission process in accordance with the indication information, and change the data transmission process into the target data transmission process. The first wireless transceiver device is a terminal, and the second wireless transceiver device is a network side device.

In a possible embodiment of the present disclosure, the indication information includes one of: information about the to-be-changed target data transmission process; or the information about the to-be-changed target data transmission process and information about an effective time of the to-be-changed target data transmission process.

In a possible embodiment of the present disclosure, a time window where a process is effective after the target data transmission process takes effect includes one of: a target time window; a time period from a time point when the target data transmission process takes effect to a time point when indication information other than the first information has been received; or a time period from a time point when the target data transmission process takes effect to a time point when a protocol stack de-configuration instruction has been received.

In a possible embodiment of the present disclosure, the triggering factor includes at least one of a user service feature parameter, slice auxiliary identification information, or information about user's customized demand.

In a possible embodiment of the present disclosure, the indication information is indicated through one of a coding sequence formed through coding with an agreed transmission process identifier, or a state information bitmap formed through coding with the agreed transmission process identifier.

In a possible embodiment of the present disclosure, the processor is further configured to read the computer program in the memory, so as to determine a transmission resource corresponding to target service data, and the target service data is to be transmitted through the to-be-changed target data transmission process. The transmission resource is determined through one of: selecting a transmission resource that meets a first condition; in the case that the first wireless transceiver device is a network side device and the second wireless transceiver device is a terminal, determining, by the first wireless transceiver device, the transmission resource in accordance with a data transmission volume under the target data transmission process; in the case that the first wireless transceiver device is a terminal, the second wireless transceiver device is a network side device and an effective time of the target data transmission process is equal to zero, determining, by the terminal, the transmission resource through agreement, or reserving, by the network side device, the transmission resource; in the case that the first wireless transceiver device is a terminal, the second wireless transceiver device is a network side device and the effective time of the target data transmission process fails to be configured, determining, by the terminal, the transmission resource through agreement, or reserving, by the network side device, the transmission resource; or in the case that the first wireless transceiver device is a terminal, the second wireless transceiver device is a network side device and the effective time of the target data transmission process is greater than zero, determining, by the second wireless transceiver device, the transmission resource in accordance with the data transmission volume under the target data transmission process.

In a possible embodiment of the present disclosure, the selecting the transmission resource that meets the first condition includes selecting a maximum physical resource that meets a condition on data transmission through the target data transmission process, and/or a physical resource with an optimum channel state.

In a possible embodiment of the present disclosure, the determining, by the terminal, the transmission resource through the agreement includes one of: implicitly indicating the transmission resource through a position of a subframe or symbol where the indication information is located; indicating the transmission resource through information about an agreed physical resource carried in the indication information; or implicitly indicating the transmission resource through information about the target data transmission process carried in the indication information.

In a possible embodiment of the present disclosure, in the case that the first wireless transceiver device is a terminal and the effective time of the target data transmission process is greater than zero, the determining the transmission resource corresponding to the target service data includes: transmitting uplink data request information to the second wireless transceiver device, the uplink data request information including a data transmission volume of the target data transmission process; and receiving feedback information from the second wireless transmission device, the feedback information including information about the transmission resource.

In a possible embodiment of the present disclosure, the processor is further configured to read the computer program in the memory, so as to determine available data transmission processes in accordance with terminal capability information, and the available data transmission processes include the target data transmission process.

In a possible embodiment of the present disclosure, the determining the available data transmission processes in accordance with the terminal capability information includes: in the case that the first wireless transceiver device is a network side device and the second wireless transceiver device is a terminal, obtaining the terminal capability information about the terminal; and determining the available data transmission processes in accordance with the terminal capability information and data transmission processes supported by the network side device. Subsequent to determining the available data transmission processes in accordance with the terminal capability information, the method further includes transmitting information about the available data transmission processes to the second wireless transceiver device.

In a possible embodiment of the present disclosure, the determining the available data transmission processes in accordance with the terminal capability information includes: in the case that the first wireless transceiver is a terminal and the second wireless transceiver device is a network side device, transmitting the terminal capability information to the second wireless transceiver device; and receiving information about the available data transmission processes from the second wireless transceiver device.

In a possible embodiment of the present disclosure, the available data transmission processes include at least one of a transmission process through which a core network function sinks, a transmission process without any protocol stack layer, a transmission process directly occupied by a physical resource, a transmission process for adding a target function, or a transmission process for protocol stack architecture in a communication system.

In a possible embodiment of the present disclosure, the transceiver is further configured to receive second information from the second wireless transceiver device, and transmit the first information in accordance with the second information. The second information is used to indicate the first wireless transceiver device to retransmit the first information, or indicate the first wireless transceiver device to perform the data transmission by default.

In FIG. 13, bus architecture may include a number of buses and bridges connected to each other, so as to connect various circuits for one or more processors 1310 and one or more memories 1320. In addition, as is known in the art, the bus architecture may be used to connect any other circuits, such as a circuit for a peripheral device, a circuit for a voltage stabilizer and a power management circuit. A bus interface may be provided, and the transceiver 1300 may consist of a plurality of elements, i.e., a transmitter and a receiver for communication with any other devices over a transmission medium. The processor 1310 may take charge of managing the bus architecture as well as general processings. The memory 1320 may store therein data for the operation of the processor 1310.

The processor 1310 is a Central Processing Unit (CPU), an Application Specific Integrated Circuit (ASIC), a Field-Programmable Gate Array (FPGA) or a Complex Programmable Logic Device (CPLD). The processor may also use multi-core architecture.

It should be appreciated that, the device in the embodiments of the present disclosure is used to implement all the steps of the above-mentioned method for the first wireless transceiver device with a same technical effect, which will not be particularly defined herein.

Figure 14:
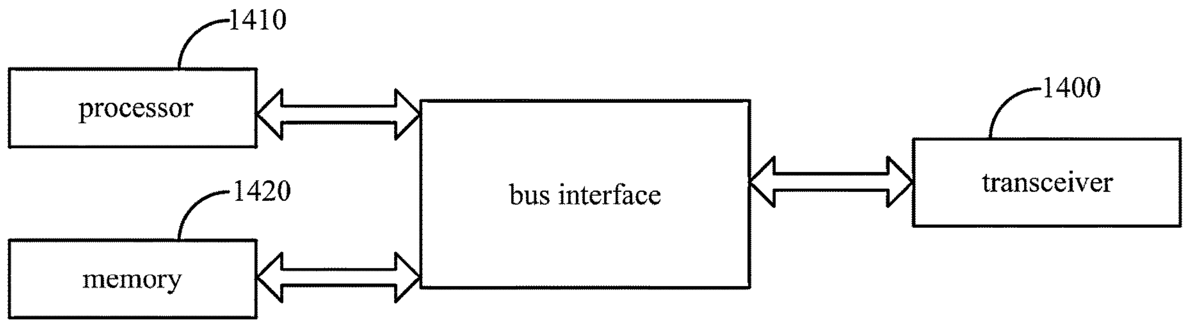
FIG. 14 is still yet schematic view showing the device for changing the data transmission process according to one embodiment of the present disclosure.

As shown in FIG. 14, the present disclosure further provides in some embodiments a device for changing a data transmission process for a second wireless transceiver device, which includes a memory 1420, a transceiver 1400 and a processor 1410. The memory 1420 is configured to store therein a computer program, the transceiver 1400 is configured to transmit and receive data under the control of the processor, and the processor 1410 is configured to read the computer program in the memory. The transceiver 1400 is configured to obtain first information from the first wireless transceiver device through a physical layer, the first information includes indication information indicating a to-be-changed target data transmission process or a triggering factor corresponding to a transmission service, and the processor 1410 is configured to read the computer program in the memory so as to change the data transmission process in accordance with the first information.

In a possible embodiment of the present disclosure, the obtaining the first information from the first wireless transceiver device through the physical layer includes detecting a target indication channel or a target signal transmitted by the first wireless transceiver device on the physical layer so as to obtain the first information, and the first information is carried in the target indication channel or target signal.

In a possible embodiment of the present disclosure, the detecting the target indication channel or target signal transmitted by the first wireless transceiver device on the physical layer so as to obtain the first information includes one of: detecting the target indication channel or target signal within each subframe so as to obtain the first information; detecting the target indication channel or target signal within a first subframe agreed by the second wireless transceiver device with the first wireless transceiver device so as to obtain the first information; detecting the target indication channel or target signal on an $M^{th}$ symbol within the first subframe agreed by the second wireless transceiver device with the first wireless transceiver device so as to obtain the first information; or detecting the target indication channel or target signal on $M^{th}$ to $N^{th}$ symbols within the first subframe agreed by the second wireless transceiver device with the first wireless transceiver device so as to obtain the first information.

In a possible embodiment of the present disclosure, the detecting the target indication channel or target signal transmitted by the first wireless transceiver device on the physical layer so as to obtain the first information includes one of: periodically detecting the target indication channel or target signal within a first subframe agreed by the second wireless transceiver device with the first wireless transceiver device so as to obtain the first information; periodically detecting the target indication channel or target signal on an $M^{th}$ symbol within the first subframe agreed by the second wireless transceiver device with the first wireless transceiver device so as to obtain the first information; or periodically detecting the target indication channel or target signal on $M^{th}$ to $N^{th}$ symbols within the first subframe agreed by the second wireless transceiver device with the first wireless transceiver device so as to obtain the first information.

In a possible embodiment of the present disclosure, the detecting the target indication channel or target signal transmitted by the first wireless transceiver device on the physical layer so as to obtain the first information includes: detecting the target indication channel or target signal in different frequency sub-domains of a frequency domain of the $M^{th}$ symbol so as to obtain the first information, or detecting the target indication channel or target signal on each of the $M^{th}$ to $N^{th}$ symbols so as to obtain the first information.

In a possible embodiment of the present disclosure, in the case that the first information includes the triggering factor, the processor is further configured to read the computer program in the memory so as to decode the first information to obtain the triggering factor, and determine the to-be-changed target data transmission process in accordance with the triggering factor and generate the indication information, the transceiver is further configured to transmit the indication information to the first wireless transceiver device, the first wireless transceiver device is a terminal, and the second wireless transceiver device is a network side device.

In a possible embodiment of the present disclosure, in the case that the first information includes the indication information, the processor is further configured to read the computer program in the memory, so as to determine whether the second wireless transceiver device agrees to change the data transmission process, and generate change feedback information, the change feedback information includes first indication information indicating that the second wireless transceiver device agrees to change the data transmission process into the target data transmission process or second indication information indicating that the second wireless transceiver device rejects to change the data transmission process into the target data transmission process, the transceiver is configured to transmit the change feedback information to the first wireless transceiver device, the first wireless transceiver device is a terminal, and the second wireless transceiver device is a network side device.

In a possible embodiment of the present disclosure, a time point when the change feedback information is transmitted to the first wireless transceiver device includes one of: a latest subframe corresponding to a time point when the first information is obtained by the second wireless transceiver device; a second subframe agreed by the second wireless transceiver device with the first wireless transceiver device; a $K^{th}$ symbol within the second subframe agreed by the second wireless transceiver device with the first wireless transceiver device; or $K^{th}$ to $L^{th}$ symbols within the second subframe agreed by the second wireless transceiver device with the first wireless transceiver device, where L is greater than K.

In a possible embodiment of the present disclosure, the processor is further configured to read the computer program in the memory so as to, in the case that the data transmission process is rejected to be changed, perform data transmission through a default transmission process.

In a possible embodiment of the present disclosure, the indication information includes at least one of: information about the to-be-changed target data transmission process; or the information about the to-be-changed target data transmission process and information about an effective time of the to-be-changed target data transmission process.

In a possible embodiment of the present disclosure, a time window where a process is effective after the target data transmission process takes effect includes one of: a target time window; a time period from a time point when the target data transmission process takes effect to a time point when indication information other than the first information has been received; or a time period from a time point when the target data transmission process takes effect to a time point when a protocol stack de-configuration instruction has been received.

In a possible embodiment of the present disclosure, the triggering factor includes at least one of a user service feature parameter, slice auxiliary identification information, or information about user's customized demand.

In a possible embodiment of the present disclosure, the processor is further configured to read the computer program in the memory so as to determine a transmission resource corresponding to target service data, and the target service data is to be transmitted through the to-be-changed target data transmission process. The transmission resource is determined through one of: selecting a transmission resource that meets a first condition; in the case that the first wireless transceiver device is a network side device and the second wireless transceiver device is a terminal, determining, by the first wireless transceiver device, the transmission resource in accordance with a data transmission volume under the target data transmission process; in the case that the first wireless transceiver device is a terminal, the second wireless transceiver device is a network side device and an effective time of the target data transmission process is equal to zero, determining, by the terminal, the transmission resource through agreement, or reserving, by the network side device, the transmission resource; in the case that the first wireless transceiver device is a terminal, the second wireless transceiver device is a network side device and the effective time of the target data transmission process fails to be configured, determining, by the terminal, the transmission resource through agreement, or reserving, by the network side device, the transmission resource; or in the case that the first wireless transceiver device is a terminal, the second wireless transceiver device is a network side device and the effective time of the target data transmission process is greater than zero, determining, by the second wireless transceiver device, the transmission resource in accordance with the data transmission volume under the target data transmission process.

In a possible embodiment of the present disclosure, the selecting the transmission resource that meets the first condition includes selecting a maximum physical resource that meets a condition on data transmission through the target data transmission process, and/or a physical resource with an optimum channel state.

In a possible embodiment of the present disclosure, the determining, by the terminal, the transmission resource through the agreement includes one of: implicitly indicating the transmission resource through a position of a subframe or symbol where the indication information is located; indicating the transmission resource through information about an agreed physical resource carried in the indication information; or implicitly indicating the transmission resource through information about the target data transmission process carried in the indication information.

In a possible embodiment of the present disclosure, in the case that the first wireless transceiver device is a terminal and the effective time of the target data transmission process is greater than zero, the determining the transmission resource corresponding to the target service data includes: receiving uplink data request information from the first wireless transceiver device, the uplink data request information including a data transmission volume of the target data transmission process; determining the transmission resource corresponding to the target service data in accordance with the data transmission volume; and transmitting feedback information to the first wireless transmission device, the feedback information including information about the transmission resource.

In a possible embodiment of the present disclosure, in the case that the transmission resource is determined by the terminal through agreement, the changing the data transmission process in accordance with the first information includes changing the target data transmission process in accordance with the first information at a time point when relevant information about the transmission resource has been received.

In a possible embodiment of the present disclosure, the processor is further configured to read the computer program in the memory so as to: enable an interference elimination algorithm function at the time point when the relevant information about the transmission resource has been received; and perform the data transmission through the transmission resource in the target data transmission process.

In a possible embodiment of the present disclosure, the processor is further configured to read the computer program in the memory so as to determine available data transmission processes in accordance with terminal capability information, and the available data transmission processes include the target data transmission process.

In a possible embodiment of the present disclosure, the determining the available data transmission processes in accordance with the terminal capability information includes: in the case that the first wireless transceiver device is a network side device and the second wireless transceiver device is a terminal, transmitting the terminal capability information to the first wireless transceiver device; and receiving information about the available data transmission processes from the first wireless transceiver device.

In a possible embodiment of the present disclosure, the determining the available data transmission processes in accordance with the terminal capability information includes: in the case that the first wireless transceiver is a terminal and the second wireless transceiver device is a network side device, receiving the terminal capability information from the first wireless transceiver device; and determining the available data transmission processes in accordance with the terminal capability information and data transmission processes supported by the network side device. Subsequent to determining the available data transmission processes in accordance with the terminal capability information, the method further includes transmitting information about the available data transmission processes to the first wireless transceiver device.

In a possible embodiment of the present disclosure, the available data transmission processes include at least one of a transmission process through which a core network function sinks, a transmission process without any protocol stack layer, a transmission process directly occupied by a physical resource, a transmission process for adding a target function, or a transmission process for protocol stack architecture in a communication system.

In a possible embodiment of the present disclosure, the transceiver is further configured to, in the case that the first information fails to be obtained, transmit second information to the first wireless transceiver device in accordance with the triggering factor corresponding to the transmission service. The second information is used to indicate the first wireless transceiver device to retransmit the first information, or indicate the first wireless transceiver device to perform the data transmission by default.

In FIG. 14, bus architecture may include a number of buses and bridges connected to each other, so as to connect various circuits for one or more processors 1410 and one or more memories 1420. In addition, as is known in the art, the bus architecture may be used to connect any other circuits, such as a circuit for a peripheral device, a circuit for a voltage stabilizer and a power management circuit. A bus interface may be provided, and the transceiver 1400 may consist of a plurality of elements, i.e., a transmitter and a receiver for communication with any other devices over a transmission medium. The processor 1410 may take charge of managing the bus architecture as well as general processings. The memory 1420 may store therein data for the operation of the processor 1410.

The processor 1410 is a CPU, an ASIC, an FPGA or a CPLD. The processor may also use multi-core architecture.

It should be appreciated that, the device in the embodiments of the present disclosure is used to implement all the steps of the above-mentioned method for the second wireless transceiver device with a same technical effect, which will not be particularly defined herein.

In addition, the present disclosure further provides in some embodiments a processor-readable storage medium storing therein a computer program. The computer program is executed by a processor so as to implement the above-mentioned method for changing the data transmission process with a same technical effect, which will thus not be particularly defined herein. The processor-readable storage medium may be any available medium or data storage device capable of being accessed by a processor, which includes, but not limited to, a magnetic memory (e.g., floppy disk, hard disk, magnetic tape, or Magnetic Optical disk (MO)), an optical memory (e.g., Compact Disk (CD), Digital Video Disk (DVD), Blue-ray Disk (BD), or High-definition Versatile Disk (HVD)), or a semiconductor memory (e.g., ROM, Electrically Programmable ROM (EPROM), Electrically Erasable PROM (EEPROM), NAND flash, or Solid-State Disk (SSD)).

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, Compact Disc-Read Only Memory (CD-ROM) and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicated computer, an embedded processor or any other programmable data processing devices to create a machine, so that instructions capable of being executed by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

It should be further appreciated that, the above modules are divided merely on the basis of their logic functions, and in actual use, they may be completely or partially integrated into a physical entity, or physically separated from each other. These modules may be implemented by calling software through a processing element, or implemented in the form of hardware. For example, the determination module may be a processing element arranged separately, or integrated into a chip of the above-mentioned device. In addition, the module may be stored in the memory of the above-mentioned device in the form of a program code, and may be called and executed by a processing element of the above-mentioned device so as to achieve the above functions. The other modules may be implemented in a similar manner. All or parts of the modules may be integrated together or arranged separately. Here, the modules, units or assemblies may each of an Integrated Circuit (IC) having a signal processing capability. During the implementation, the steps of the method or the modules may be implemented through an integrated logic circuit of the processing element in the form of hardware or through instructions in the form of software.

For example, the above modules, units, sub-units or sub-modules may be one or more ICs capable of implementing the above-mentioned method, e.g., one or more Application Specific Integrated Circuits (ASICs), one or more Digital Signal Processors (DSPs), or one or more Field Programmable Gate Array (FPGA). For another example, when a certain module is implemented by calling a program code through a processing element, the processing element may be a general-purpose processor, e.g., a Central Processing Unit (CPU) or any other processor capable of calling the program code. These modules may be integrated together and implemented in the form of system-on-a-chip (SOC).

Such words as "first" and "second" involved in the specification and the appended claims are merely used to differentiate different objects rather than to represent any specific order. It should be appreciated that, the data used in this way may be replaced with each other, so as to implement the embodiments in an order other than that shown in the drawings or described in the specification. In addition, such terms as "include" or "including" or any other variations involved in the present disclosure intend to provide non-exclusive coverage, so that a procedure, method, system, product or device including a series of steps or units may also include any other elements not listed herein, or may include any inherent steps or units of the procedure, method, system, product or device. The expression "and/or" in the description and the appended claims is merely used to represent at least one of the objects before and after the expression. For example, "A and/or B and/or C" represents seven situations, i.e., there is only A, there is only B, there is only C, there are both A and B, there are both B and C, there are both A and C, and there are A, B and C. Similarly, the phrase "at least one of A or B" in the specification and the appended claims shall be understood as "there is only A, there is only B, or there are both A and B".

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method for changing a data transmission process, comprising transmitting, by a first wireless transceiver device, first information to a second wireless transceiver device through a physical layer, wherein the first information comprises indication information indicating a to-be-changed target data transmission process or a triggering factor corresponding to a transmission service;

wherein the indication information is related to the triggering factor, and the target data transmission process comprises at least one of a transmission process through which a core network function sinks, a transmission process without any protocol stack layer, a transmission process directly occupied by a physical resource, a transmission process for adding a target function, or a transmission process for protocol stack architecture in a communication system;

wherein the transmitting, by the first wireless transceiver device, the first information to the second wireless transceiver device through the physical layer comprises transmitting, by the first wireless transceiver device, a target indication channel or a target signal to the second wireless transceiver device directly through the physical layer, and the target indication channel or target signal carries the first information, wherein a time point when the target indication channel or target signal is transmitted by the first wireless transceiver device to the second wireless transceiver device through the physical layer comprises one of:

a latest subframe corresponding to a time point when the triggering factor is obtained by the first wireless transceiver device;

a latest subframe corresponding to a time point when the target data transmission process is determined by the first wireless transceiver device;

a latest subframe corresponding to a time point when a data transmission process of the first wireless transceiver device is changed;

a first subframe agreed by the first wireless transceiver device with the second wireless transceiver device;

an $M^{th}$ symbol within the first subframe agreed by the first wireless transceiver device with the second wireless transceiver device; or $M^{th}$ to $N^{th}$ symbols within the first subframe agreed by the first wireless transceiver device with the second wireless transceiver device, where N is greater than M, wherein the first information is carried in different frequency sub-domains of a frequency domain of the $M^{th}$ symbol, or the first information is carried in each of the $M^{th}$ to $N^{th}$ symbols.

2. The method according to claim 1, wherein in the case that the first information comprises the indication information, prior to transmitting, by the first wireless transceiver device, the first information to the second wireless transceiver device through the physical layer, the method further comprises: determining the to-be-changed target data transmission process in accordance with the triggering factor corresponding to the transmission service; and changing the data transmission process into the target data transmission process, or wherein in the case that the first information comprises the indication information, subsequent to transmitting the first information to the second wireless transceiver device through the physical layer, the method further comprises: receiving change feedback information from the second wireless transceiver device, the change feedback information comprising first indication information indicating that the second wireless transceiver device agrees to change the data transmission process into the target data transmission process or second indication information indicating that the second wireless transceiver device rejects to change the data transmission process into the target data transmission process; in the case that the change feedback information comprises the first indication information, changing the data transmission process into the target data transmission process; and in the case that the change feedback information comprises the second indication information, performing data transmission through a default transmission process, wherein the first wireless transceiver device is a terminal, and the second wireless transceiver device is a network side device, or wherein in the case that the first information comprises the triggering factor, subsequent to transmitting the first information to the second wireless transceiver device through the physical layer, the method further comprises: receiving indication information from the second wireless transceiver device, the indication information being generated and transmitted by the second wireless transceiver device after the second wireless transceiver device decodes the first information and obtains the triggering factor; determining the to-be-changed target data transmission process in accordance with the indication information; and changing the data transmission process into the target data transmission process, wherein the first wireless transceiver device is a terminal, and the second wireless transceiver device is a network side device.

3. The method according to claim 1, wherein the indication information comprises one of:

information about the to-be-changed target data transmission process; or the information about the to-be-changed target data transmission process and information about an effective time of the to-be-changed target data transmission process.

4. The method according to claim 1, wherein a time window where a process is effective after the target data transmission process takes effect comprises one of:

a target time window;

a time period from a time point when the target data transmission process takes effect to a time point when indication information other than the first information has been received; or a time period from a time point when the target data transmission process takes effect to a time point when a protocol stack de-configuration instruction has been received.

5. The method according to claim 1, wherein the triggering factor comprises at least one of a user service feature parameter, slice auxiliary identification information, or information about user's customized demand, wherein the indication information is indicated through one of a coding sequence formed through coding with an agreed transmission process identifier, or a state information bitmap formed through coding with the agreed transmission process identifier.

6. The method according to claim 1, further comprising determining a transmission resource corresponding to target service data, wherein the target service data is to be transmitted through the to-be-changed target data transmission process, wherein the transmission resource is determined through one of:

selecting a transmission resource that meets a first condition;

in the case that the first wireless transceiver device is a network side device and the second wireless transceiver device is a terminal, determining, by the first wireless transceiver device, the transmission resource in accordance with a data transmission volume through the target data transmission process;

in the case that the first wireless transceiver device is a terminal, the second wireless transceiver device is a network side device and an effective time of the target data transmission process is equal to zero, determining, by the terminal, the transmission resource through agreement, or reserving, by the network side device, the transmission resource;

in the case that the first wireless transceiver device is a terminal, the second wireless transceiver device is a network side device and the effective time of the target data transmission process fails to be configured, determining, by the terminal, the transmission resource through agreement, or reserving, by the network side device, the transmission resource; or in the case that the first wireless transceiver device is a terminal, the second wireless transceiver device is a network side device and the effective time of the target data transmission process is greater than zero, determining, by the second wireless transceiver device, the transmission resource in accordance with the data transmission volume through the target data transmission process, wherein in the case that the first wireless transceiver device is a terminal and the effective time of the target data transmission process is greater than zero, the determining the transmission resource corresponding to the target service data comprises:

transmitting uplink data request information to the second wireless transceiver device, the uplink data request information comprising a data transmission volume of the target data transmission process; and receiving feedback information from the second wireless transmission device, the feedback information comprising information about the transmission resource.

7. The method according to claim 1, wherein prior to transmitting, by the first wireless transceiver device, the first information to the second wireless transceiver device through the physical layer, the method further comprises determining available data transmission processes in accordance with terminal capability information, and the available data transmission processes comprise the target data transmission process.

8. The method according to claim 7, wherein the determining the available data transmission processes in accordance with the terminal capability information comprises:

in the case that the first wireless transceiver device is a network side device and the second wireless transceiver device is a terminal, obtaining the terminal capability information about the terminal; and determining the available data transmission processes in accordance with the terminal capability information and data transmission processes supported by the network side device, wherein subsequent to determining the available data transmission processes in accordance with the terminal capability information, the method further comprises transmitting information about the available data transmission processes to the second wireless transceiver device, wherein the determining the available data transmission processes in accordance with the terminal capability information comprises: in the case that the first wireless transceiver is a terminal and the second wireless transceiver device is a network side device, transmitting the terminal capability information to the second wireless transceiver device; and receiving information about the available data transmission processes from the second wireless transceiver device.

9. A method for changing a data transmission process, comprising:

obtaining, by a second wireless transceiver device, first information from the first wireless transceiver device through a physical layer, the first information comprising indication information indicating a to-be-changed target data transmission process or a triggering factor corresponding to a transmission service; and changing the data transmission process in accordance with the first information;

wherein the indication information is related to the triggering factor, and the target data transmission process comprises at least one of a transmission process through which a core network function sinks, a transmission process without any protocol stack layer, a transmission process directly occupied by a physical resource, a transmission process for adding a target function, or a transmission process for protocol stack architecture in a communication system;

wherein the obtaining, by the second wireless transceiver device, the first information from the first wireless transceiver device through the physical layer comprises detecting a target indication channel or a target signal transmitted by the first wireless transceiver device on the physical layer so as to obtain the first information, and the first information is carried in the target indication channel or target signal, wherein the detecting the target indication channel or target signal transmitted by the first wireless transceiver device on the physical layer so as to obtain the first information comprises one of:

detecting the target indication channel or target signal within each subframe so as to obtain the first information;

detecting the target indication channel or target signal within a first subframe agreed by the second wireless transceiver device with the first wireless transceiver device so as to obtain the first information;

detecting the target indication channel or target signal on an $M^{th}$ symbol within the first subframe agreed by the second wireless transceiver device with the first wireless transceiver device so as to obtain the first information; or detecting the target indication channel or target signal on $M^{th}$ to $N^{th}$ symbols within the first subframe agreed by the second wireless transceiver device with the first wireless transceiver device so as to obtain the first information, wherein the detecting the target indication channel or target signal transmitted by the first wireless transceiver device on the physical layer so as to obtain the first information comprises detecting the target indication channel or target signal in different frequency subdomains of a frequency domain of the $M^{th}$ symbol so as to obtain the first information, or detecting the target indication channel or target signal on each of the $M^{th}$ to $N^{th}$ symbols so as to obtain the first information, wherein the detecting the target indication channel or target signal transmitted by the first wireless transceiver device on the physical layer so as to obtain the first information comprises one of:

periodically detecting the target indication channel or target signal within a first subframe agreed by the second wireless transceiver device with the first wireless transceiver device so as to obtain the first information;

periodically detecting the target indication channel or target signal on an $M^{th}$ symbol within the first subframe agreed by the second wireless transceiver device with the first wireless transceiver device so as to obtain the first information; or periodically detecting the target indication channel or target signal on $M^{th}$ to $N^{th}$ symbols within the first subframe agreed by the second wireless transceiver device with the first wireless transceiver device so as to obtain the first information.

10. The method according to claim 9, wherein in the case that the first information comprises the triggering factor, subsequent to obtaining the first information from the first wireless transceiver device through the physical layer, the method further comprises: decoding the first information so as to obtain the triggering factor; determining the to-be-changed target data transmission process in accordance with the triggering factor, and generating the indication information; and transmitting the indication information to the first wireless transceiver device, wherein the first wireless transceiver device is a terminal, and the second wireless transceiver device is a network side device, or wherein in the case that the first information comprises the indication information, prior to changing the data transmission process in accordance with the first information, the method further comprises: determining whether the second wireless transceiver device agrees to change the data transmission process, and generating change feedback information, the change feedback information comprising first indication information indicating that the second wireless transceiver device agrees to change the data transmission process into the target data transmission process or second indication information indicating that the second wireless transceiver device rejects to change the data transmission process into the target data transmission process; and transmitting the change feedback information to the first wireless transceiver device, wherein the first wireless transceiver device is a terminal, and the second wireless transceiver device is a network side device.

11. The method according to claim 10, wherein a time point when the change feedback information is transmitted to the first wireless transceiver device comprises one of:

a latest subframe corresponding to a time point when the first information is obtained by the second wireless transceiver device;

a second subframe agreed by the second wireless transceiver device with the first wireless transceiver device;

a $K^{th}$ symbol within the second subframe agreed by the second wireless transceiver device with the first wireless transceiver device; or $K^{th}$ to $L^{th}$ symbols within the second subframe agreed by the second wireless transceiver device with the first wireless transceiver device, where L is greater than K, wherein the method further comprises, in the case that the data transmission process is rejected to be changed, performing data transmission through a default transmission process.

12. The method according to claim 9, wherein the indication information comprises at least one of: information about the to-be-changed target data transmission process; or the information about the to-be-changed target data transmission process and information about an effective time of the to-be-changed target data transmission process, or wherein a time window where a process is effective after the target data transmission process takes effect comprises one of: a target time window; a time period from a time point when the target data transmission process takes effect to a time point when indication information other than the first information has been received; or a time period from a time point when the target data transmission process takes effect to a time point when a protocol stack de-configuration instruction has been received, or wherein the triggering factor comprises at least one of a user service feature parameter, slice auxiliary identification information, or information about user's customized demand.

13. The method according to claim 9, wherein subsequent to obtain the first information from the first wireless transceiver device through the physical layer, the method further comprises determining a transmission resource corresponding to target service data, and the target service data is to be transmitted through the to-be-changed target data transmission process, wherein the transmission resource is determined through one of:

selecting a transmission resource that meets a first condition;

in the case that the first wireless transceiver device is a network side device and the second wireless transceiver device is a terminal, determining, by the first wireless transceiver device, the transmission resource in accordance with a data transmission volume through the target data transmission process;

in the case that the first wireless transceiver device is a terminal, the second wireless transceiver device is a network side device and an effective time of the target data transmission process is equal to zero, determining, by the terminal, the transmission resource through agreement, or reserving, by the network side device, the transmission resource;

in the case that the first wireless transceiver device is a terminal, the second wireless transceiver device is a network side device and the effective time of the target data transmission process fails to be configured, determining, by the terminal, the transmission resource through agreement, or reserving, by the network side device, the transmission resource; or in the case that the first wireless transceiver device is a terminal, the second wireless transceiver device is a network side device and the effective time of the target data transmission process is greater than zero, determining, by the second wireless transceiver device, the transmission resource in accordance with the data transmission volume through the target data transmission process.

14. The method according to claim 13, wherein in the case that the first wireless transceiver device is a terminal and the effective time of the target data transmission process is greater than zero, the determining the transmission resource corresponding to the target service data comprises:

receiving uplink data request information from the first wireless transceiver device, the uplink data request information comprising a data transmission volume of the target data transmission process;

determining the transmission resource corresponding to the target service data in accordance with the data transmission volume; and transmitting feedback information to the first wireless transmission device, the feedback information comprising information about the transmission resource.

15. The method according to claim 13, wherein in the case that the transmission resource is determined by the terminal through agreement, the changing the data transmission process in accordance with the first information comprises changing the data transmission process into the target data transmission process in accordance with the first information at a time point when relevant information about the transmission resource is received, wherein the method further comprises:

enabling an interference elimination algorithm function at the time point when the relevant information about the transmission resource has been received; and performing the data transmission through the transmission resource in the target data transmission process.

16. The method according to claim 9, further comprising determining available data transmission processes in accordance with terminal capability information, wherein the available data transmission processes comprise the target data transmission process, wherein the determining the available data transmission processes in accordance with the terminal capability information comprises: in the case that the first wireless transceiver device is a network side device and the second wireless transceiver device is a terminal, transmitting the terminal capability information to the first wireless transceiver device; and receiving information about the available data transmission processes from the first wireless transceiver device, or wherein the determining the available data transmission processes in accordance with the terminal capability information comprises: in the case that the first wireless transceiver is a terminal and the second wireless transceiver device is a network side device, receiving the terminal capability information from the first wireless transceiver device; and determining the available data transmission processes in accordance with the terminal capability information and data transmission processes supported by the network side device, wherein subsequent to determining the available data transmission processes in accordance with the terminal capability information, the method further comprises transmitting information about the available data transmission processes to the first wireless transceiver device.

17. A device for changing a data transmission process for a first wireless transceiver device, comprising a non-transitory memory, a transceiver and a processor, wherein the non-transitory memory is configured to store therein a computer program, the transceiver is configured to transmit and receive data under the control of the processor, the processor is configured to read the computer program in the non-transitory memory, and the transceiver is configured to transmit first information to a second wireless transceiver device through a physical layer, wherein the first information comprises indication information indicating a to-be-changed target data transmission process or a triggering factor corresponding to a transmission service;

wherein the indication information is related to the triggering factor, and the target data transmission process comprises at least one of a transmission process through which a core network function sinks, a transmission process without any protocol stack layer, a transmission process directly occupied by a physical resource, a transmission process for adding a target function, or a transmission process for protocol stack architecture in a communication system;

wherein the transmitting, by the first wireless transceiver device, the first information to the second wireless transceiver device through the physical layer comprises transmitting, by the first wireless transceiver device, a target indication channel or a target signal to the second wireless transceiver device directly through the physical layer, and the target indication channel or target signal carries the first information, wherein a time point when the target indication channel or target signal is transmitted by the first wireless transceiver device to the second wireless transceiver device through the physical layer comprises one of:

a latest subframe corresponding to a time point when the triggering factor is obtained by the first wireless transceiver device;

a latest subframe corresponding to a time point when the target data transmission process is determined by the first wireless transceiver device;

a latest subframe corresponding to a time point when a data transmission process of the first wireless transceiver device is changed;

a first subframe agreed by the first wireless transceiver device with the second wireless transceiver device;

an $M^{th}$ symbol within the first subframe agreed by the first wireless transceiver device with the second wireless transceiver device; or $M^{th}$ to $N^{th}$ symbols within the first subframe agreed by the first wireless transceiver device with the second wireless transceiver device, where N is greater than M, wherein the first information is carried in different frequency sub-domains of a frequency domain of the $M^{th}$ symbol, or the first information is carried in each of the $M^{th}$ to $N^{th}$ symbols.

18. A device for changing a data transmission process for a second wireless transceiver device, comprising a non-transitory memory, a transceiver and a processor, wherein the non-transitory memory is configured to store therein a computer program, the transceiver is configured to transmit and receive data under the control of the processor, and the processor is configured to read the computer program in the non-transitory memory, wherein the transceiver is configured to realize a method for changing the data transmission process according to claim 9.

* * * * *